United States Patent [19]

Temma et al.

[11] Patent Number: 5,313,392
[45] Date of Patent: May 17, 1994

[54] METHOD FOR SUPPORTING MERCHANDISE MANAGEMENT OPERATION AND SYSTEM THEREFOR

[75] Inventors: Tadashi Temma, Sagamihara; Kichizo Akashi, Ebina; Tatsumi Nishimoto, Ayase; Tetsuo Kusuzaki, Kawasaki; Isao Tsushima, Yamato, all of Japan

[73] Assignee: Hitachi, Ltd., Tokyo, Japan

[21] Appl. No.: 660,889

[22] Filed: Feb. 26, 1991

[30] Foreign Application Priority Data

Mar. 16, 1990 [JP] Japan ................................. 2-64187
Oct. 24, 1990 [JP] Japan ................................. 2-284233

[51] Int. Cl.$^5$ .................... G06F 15/22; G06F 15/24; G06G 7/52
[52] U.S. Cl. .................... 364/401; 340/825.28; 235/385
[58] Field of Search ................ 364/401, 403; 340/825.28; 235/383, 385, 376

[56] References Cited

U.S. PATENT DOCUMENTS

| | | | |
|---|---|---|---|
| 4,112,598 | 9/1978 | Maass et al. ........................ | 434/430 |
| 4,639,875 | 1/1987 | Abraham et al. ................... | 364/403 |
| 4,642,780 | 2/1987 | Thompson ........................... | 434/72 |
| 4,654,800 | 3/1987 | Hayashi et al. ..................... | 364/403 |
| 4,700,317 | 10/1987 | Watanabe et al. ................. | 364/488 |
| 4,783,740 | 11/1988 | Ishizawa et al. .................... | 364/403 |
| 4,797,819 | 1/1989 | Dechirot ............................. | 364/403 |
| 4,947,322 | 8/1990 | Temma et al. ..................... | 364/401 |
| 5,111,392 | 5/1992 | Malin .................................. | 364/401 |
| 5,166,874 | 11/1992 | Nomaru et al. ..................... | 364/468 |

OTHER PUBLICATIONS

Hitachi Review, vol. 71, No. 2, pp. 67-72.
Measurement and Control, vol. 28, No. 1, 1989, pp. 31-36.

Primary Examiner—Roy N. Envall, Jr.
Assistant Examiner—Laura Brutman
Attorney, Agent, or Firm—Fay, Sharpe, Beall, Fagan, Minnich & McKee

[57] ABSTRACT

From a blank goods layout map of a gondola showing a goods layout on each gondola by contours, a user request is inputted for displaying information of the merchandise management, the information responding to the request is output for the corresponding goods layout map, a user request is inputted for a selected elemental operation, and the inputted request is transferred to the elemental operation for execution.

39 Claims, 44 Drawing Sheets

METHOD FOR SUPPORTING MERCHANDISE MANAGEMENT OPERATION AND SYSTEM THEREFOR

BACKGROUND OF THE INVENTION

The present invention relates to supporting merchandise management by using a computer system for controlling the overall management of the merchandising cycle at a retail store which sells goods by repeating analysis on changes in a trading area caused by changes in the area environment and each of the operational elements from:

a department layout planning; department arrangement planning; goods assortment planning; and planning of goods layout on each gondola to an ordering, delivering, inspection and storage, layout (gondola filling), and sales on the bases of the analytical results.

For the information processing system for retailing stores, gondola filling planning support systems for supporting the planning of a goods layout on each gondola are discussed in Hitachi Review, Vol. 71, No. 2, pp. 67-72 (1989-2) and in U.S. Pat. No. 4,947,322. The systems discussed, first request the user interactively to establish a precondition of goods assortments. Then in accordance with the precondition and data, such as the sales results, standard sales prices, etc., the goods assortments are automatically decided by utilizing a knowledge basis, and the results are output on the terminal display screen of a computer system. If the user is not satisfied with the output goods assortment proposal, the user can modify it by interacting with the system. Then, in accordance with data, such as the result of an assortment, the sizes of the gondola and goods, etc., a goods layout proposal is automatically decided by utilizing the knowledge basis, and the result thereof is displayed as a color image on the screen of the computer terminal. If required, the result is displayed in terms of the goods classifications by different containers, etc., and the goods popularity such as goods of middle profits and sales, goods of low profits and low sales, etc. If the user is not satisfied with the result of the goods layout, the user can modify it interactively.

For some other information processing systems, a vehicle marshal planning support system for supporting plans on consignment arrangement and operational routing for each individual vehicle is discussed in Measurement and Control, Vol. 28, No. 1, pp. 31-36. This system first predicts the following day's delivery volume based on the information on orders received, and decides the kinds and numbers of vehicles to be used in accordance with the result of the prediction and restrictive conditions caused by different destinations and varieties of the consignment. Then, finally, the system decides the vehicle and driver for the delivery. To make these decisions, a knowledge basis is used.

For others, many information processing systems developed for different types of retailing stores are discussed in Measurement and Control, Vol. 28, No. 1, 1989 of the SICE, pp. 31-36.

SUMMARY OF THE INVENTION

An object of the present invention is to provide an easy to use merchandise management.

Another object of the present invention is to provide merchandise management with an image plane interface common to each of the operational elements of the merchandise management operation, so that the user can operate the system more effectively.

The present invention includes consideration of the problems in the prior art.

In a retailing store, the goods are sold by repeating each of the operational elements of a merchandise cycle, namely: analysis on changes in a trading area caused by changes in the area environment, department layout planning, department arrangement planning, goods assortment planning, gondola filling planning, ordering, delivering, inspection and storage, goods layout on each gondola (gondola filling), sales, etc. To carry out an overall control on this merchandising cycle is called merchandise management.

In conventional systems mentioned above, each one of them is an information processing system for optimizing each of the operational elements. However, the result of a specific operational element does not necessarily produce a favorable effect on all the other elements. Therefore, the optimization of each operational element by the prior art does not necessarily lead to that of the overall merchandising cycle. For example, a goods assortment planning for more varieties in smaller volumes allows the sales elemental operation to be more utilized. On the other hand, operations on ordering, delivering, inspection and storage become more complicated. In contrast, a good assortment planning for less varieties in more volumes simplifies the operations of ordering, delivering inspection and storage, but it leads to a slower sales elemental operation. Hence, in order to optimize the overall merchandising cycle, it is a prerequisite to provide a merchandise management execution to gain overall control of the entire merchandising cycle. The necessity of a management operation such as this has not been recognized conventionally. There has been no overall management system available to control the entire merchandising cycle as a matter of course. Further, even if each of the conventional information processing systems is simply combined for the overall management, there still is a problem that the combined system is not easy to operate because each of them has it own man-machine interface.

The above-mentioned objects can be achieved with a blank goods layout map of a gondola showing a goods layout on each gondola by contours, a user inputted request for displaying information of the merchandise management, retrieving and displaying the information responding to the request for the corresponding goods layout map, a user inputted request for the elemental operation system, and the inputted request transferred to the elemental system for execution.

According to the present invention a supporting merchandising management operation is easy to operate because a goods layout map of a gondola is used as an interface between the system and the user and the user can decide the goods layout on each gondola as an image, and input/output can be performed also through the goods layout map of a gondola.

According to the present invention, the goods layout map of a gondola is used as an image plane interface commonly for each operational element of the merchandise management cycle. Hence it is possible to enable user improved operation.

BRIEF DESCRIPTION OF THE DRAWINGS

The objects and features of the invention will best be understood from a detailed description of a preferred embodiment thereof, selected for purposes of illustration and shown in the accompanying drawings in which.

DETAILED DESCRIPTION OF A PREFERRED EMBODIMENT

With reference to the drawings, an embodiment according to the present invention will be described subsequently.

Figure 2:
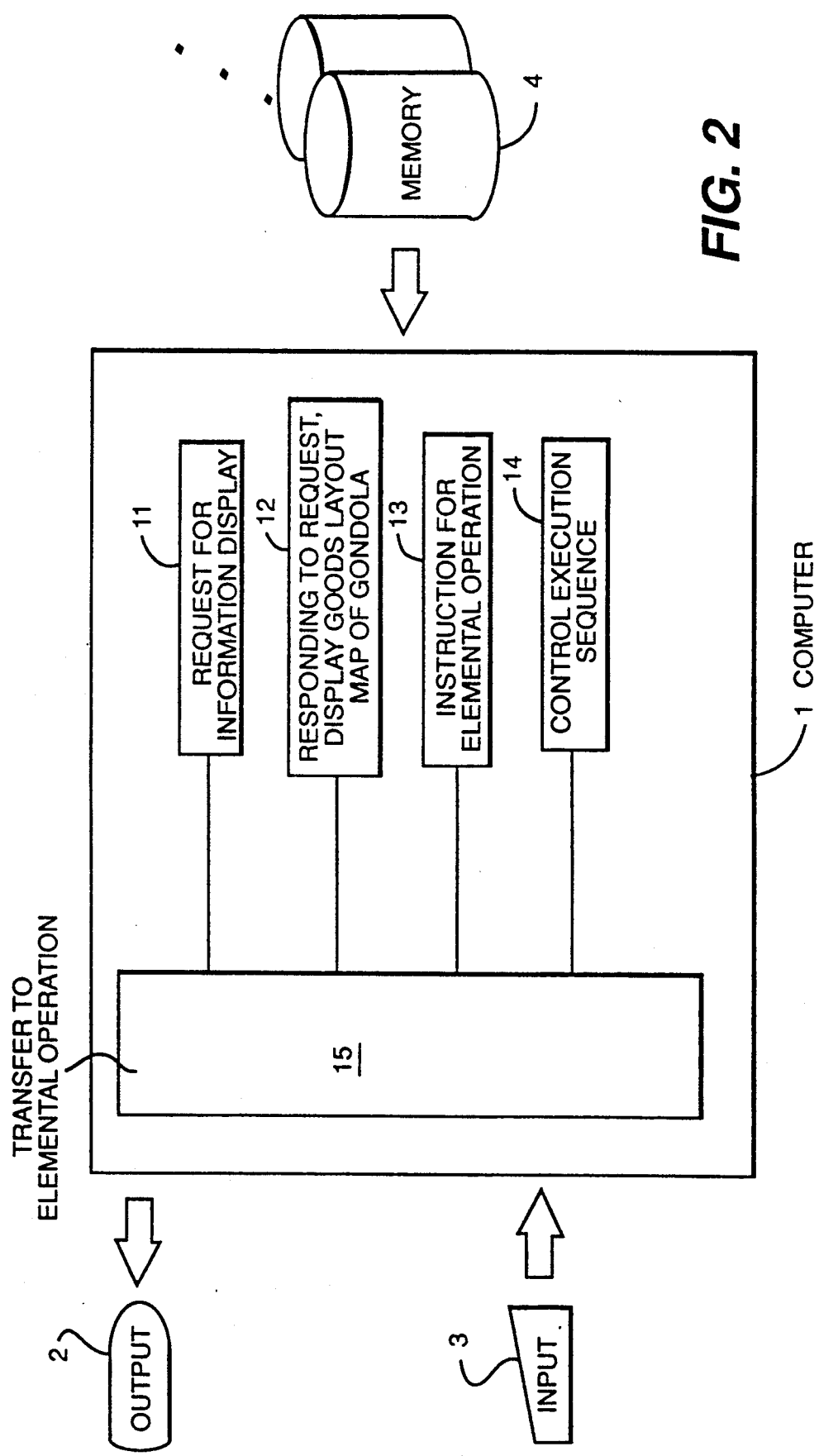
FIG. 2 illustrates the structure of a system for merchandise management.

FIG. 2 illustrates the structure of a system for supporting merchandise management according to the present invention. This system comprises a computer 1, an output unit 2, an input unit 3, and a memory 4. The computer 1 has five functions for supporting merchandise management.

Each function is performed by a program executed by the computer 1. First is a function 11 to receive a user information request for the information to be displayed. Second is a function 12 to show the requested information on a goods layout map of a gondola. Third is a function 13 to receive a user selection request for selecting each elemental operation for supporting merchandise management, all of which elemental operations comprises a merchandising cycle. Fourth is a function 14 to transfer the received selection request to the corresponding elemental operation. Fifth is a function 15 to control the sequence in which these four functions are executed. The elemental operation of each function will be described in detail later.

The output unit 2 outputs from the computer 1 several kinds of screens. First is a screen to prompt the user for the information request. Second is a screen to display a goods layout map of a gondola and information required of the merchandise management. Third is a screen to prompt the user to enter a selection request for each of the elemental operations. Other display screens are prepared as required. Each screen will be described respectively when each function and elemental operation is described.

The input unit 3 comprises a keyboard, a mouse, image scanner, etc. A request as used herein is merely an interface action from the user to the computer system, for example with a mouse, keyboard, a light pen, etc.

The memory 4 stores the information required for the merchandise management. For example, there is stored the goods assortment information, goods layout information, ordering information, delivering information, sales information, etc. The program required for executing each function and the data required for executing which will be described hereunder, are stored in the memory 4.

Before describing each function and elemental operation of the system for merchandise management, the information of the merchandise management dealt with in this embodiment will be described. In this respect, it should be understood that the information described are taken only for the purpose of describing this embodiment and are not those defining the range of the application of the present invention.

Figure 3:
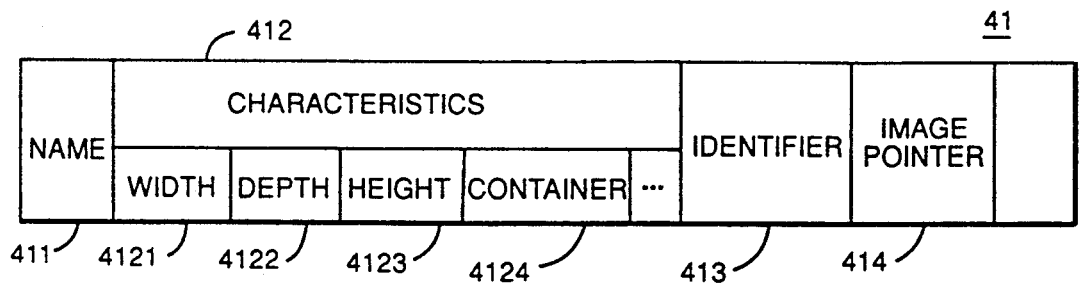
FIG. 3 illustrates the structure of a goods assortment information record.

FIG. 3 illustrates the structure of a record storing the goods assortment information 41, with a record used for each different one of the goods. Here a record means the data for goods, and a file comprises a plurality of records (for a plurality of goods). The goods assortment information 41 includes the name of goods 411. The pictorial image of the goods is a view inputted by the user to show the external contour or front elevation of the goods as an image. In a field 414, is stored the address pointer to the storage of the actual image. In the figure, the blank space is a storage area for information other than those dealt with in this embodiment or a reserved area. As regards this blank space, the status remains the same until the description comes to FIG. 10. The characteristics information 412 of this one kind of goods includes a width dimension 4121 of the corresponding goods, depth dimension 4122, height dimension 4123, a kind of container 4124 holding the goods therein, etc.

The goods included in the goods assortment information records 41 are the goods handled in a store, and they are roughly divided into the kinds given below. One is the goods on a gondola, and the other if those not on a gondola. Those which are on a gondola are further divided into (a) the goods to be removed from the gondola due to the slow sales, etc., and (b) those which should not be removed. Also, those goods which are not on the gondola are divided into (c) those to be put in the gondola for a sales strategy although they are not on the gondola at present, (d) the goods which a person in charge of goods assortment planning should decide whether or not to put in a gondola in accordance with the characteristics of the area where the store is located, and (e) those which should not be put in the gondola. The identifier 413 is an identifier to indicate the class to which the corresponding goods belong, in the classifications (a) to (e). In this respect, based on each of the above classifications, the goods belonging to: (a) are called "goods to be newly added"; (b) are called "goods on a gondola; (c) are called goods to be newly added; (d) are called "goods to be newly selected"; and (e) are called "a goods to be discarded". Any one of them is stored in the identifier 413.

Figure 4:
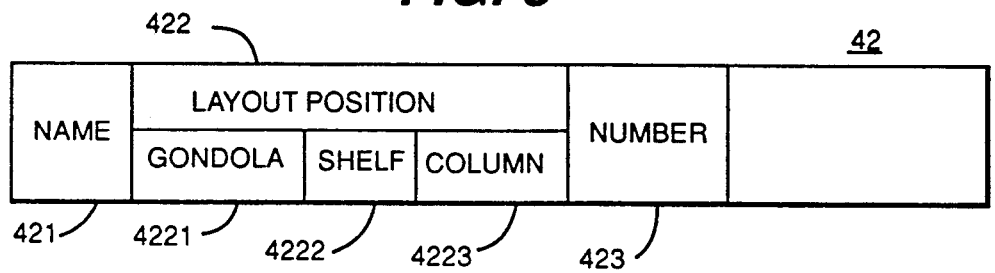
FIG. 4 illustrates the structure of a goods layout information record.

FIG. 4 illustrates the structure of a record storing a goods layout information 42 for one kind of the goods. The goods layout information 42 includes the name of a goods 421, the layout position information of the goods 422 and each number of the goods on a gondola 423. The layout position information 422 includes the number of a gondola 4221 in which the goods are filled, the deck number of a shelf 4222 indicating where the goods are placed, and the column number 4223 indicating in which column the goods are located.

Figure 5:
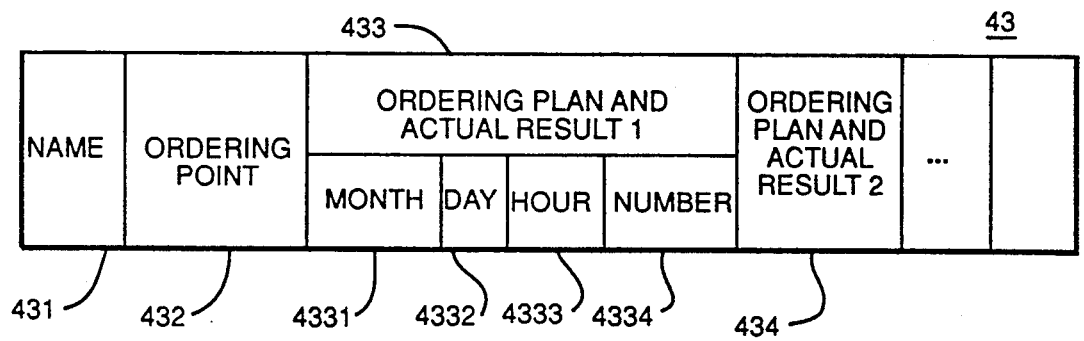
FIG. 5 illustrates the structure of an ordering information record.

FIG. 5 illustrates the structure of a record storing ordering information 43 for one kind of the goods. The ordering information 43 includes the name of a goods 431, the ordering point 432 (a reference point of the stock to be used for ordering the goods. If the stock of the corresponding goods becomes lower than the value shown by the order point, this kind of goods should be ordered), and a plurality of ordering plan and actual result information 433, 434 . . . . This ordering plan and actual result information is specifically shown for information 433 and includes the order month 4331; day, 4332; hour, 4333; and number of goods ordered 4334. The ordering plan and actual result information increases each time an order is planned or an order is actually issued, such as 434 . . . .

Figure 6:
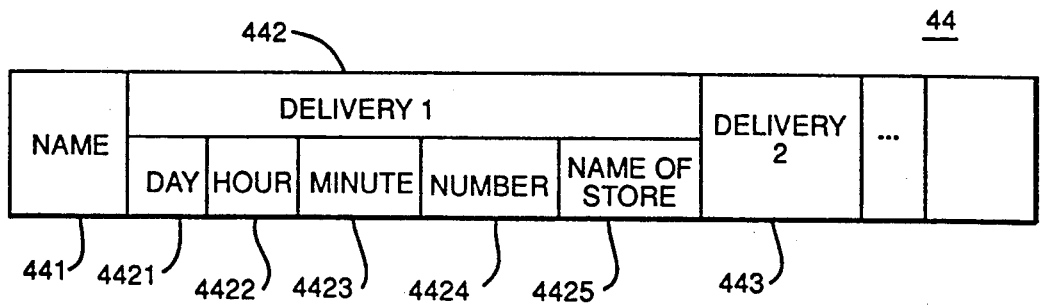
FIG. 6 illustrates a delivering information record.

FIG. 6 illustrated the structure of a record storing delivering information for one of the kinds of goods 44. The delivering information 44 includes the name of the goods 441 and the information of the scheduled delivery data 442. This information includes a delivery day 4421, hour 4422, minute 4423, number of delivered goods 4424, and name of store for receiving the delivery 4425. The information of the scheduled data of delivery is stored as 443 . . . for each store receiving the delivery. As readily understandable from the above description, there is no need for the delivery information 44 if this system is operated only for one store.

Figure 7:
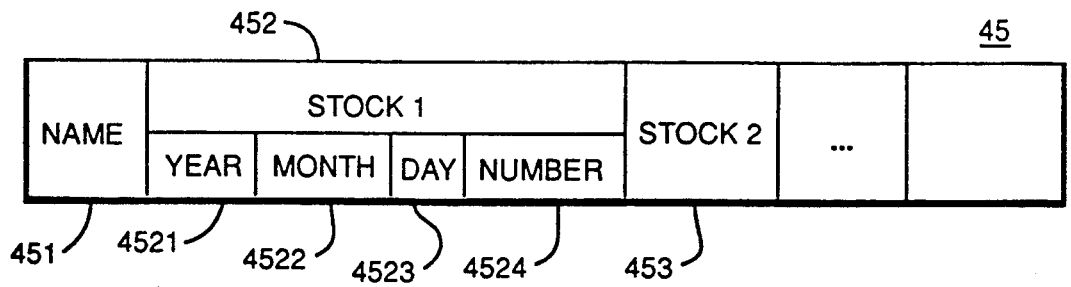
FIG. 7 illustrates the structure of a stock information record.

FIG. 7 illustrates the structure of a record storing stock information 45 for one of the kinds of goods. The stock information 45 includes the name of one of the kinds of goods 451 and the actual stock information 452. This actual stock information 452 includes a year 4521, month 4522 and day 4523 when an inventory was made, and number stocked 4524. The actual stock information increases on each day an inventory is made, such as an actual stock information 453 . . . .

Figure 8:
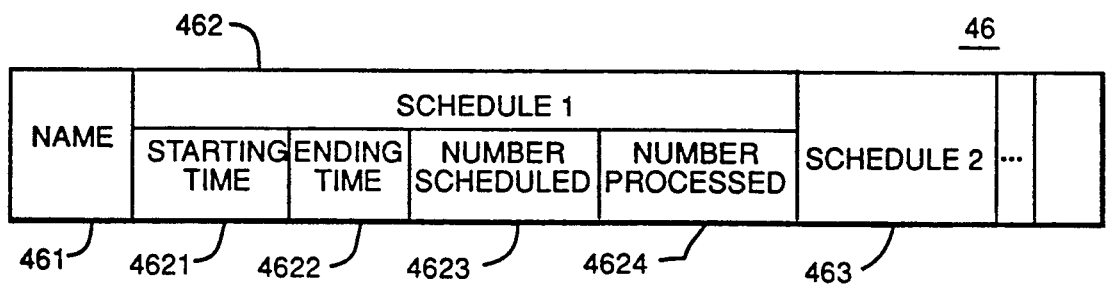
FIG. 8 illustrates the structure of a processing information record.

FIG. 8 illustrates the structure of a record storing processing information 46 for one of the kind of goods. The processing information 46 includes the name of goods 461 and the processing schedule information 462. This processing schedule information 462 includes the starting hour 4621 of the processing, the ending hour 4622 of the processing, the number of a goods scheduled for processing 4623, and the actual number of goods processed 4624. The processing schedule information increases each day processing is planned, such as processing schedule information 463 . . . . In this respect, there is no need of providing any processing information 46 for goods which do not require any processing from the stage of its receipt to the stage of its sales.

Figure 9:
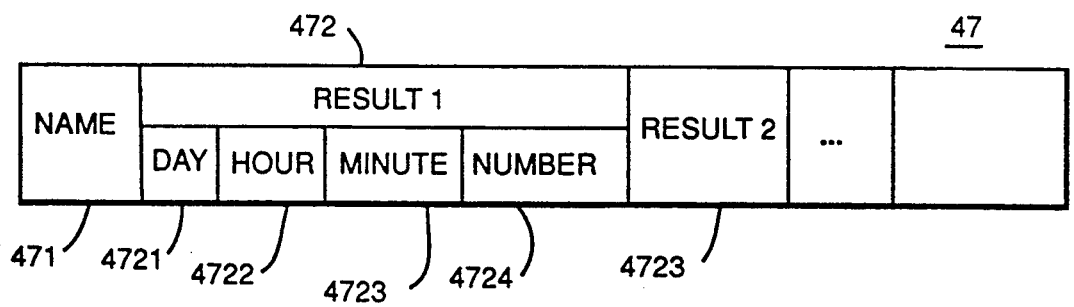
FIG. 9 illustrates the structure of a gondola filling information record.

FIG. 9 illustrates the structure of a record storing gondola filling information 47 one kind of the goods. The gondola filling information 47 includes the name of the one kind of goods 471 and the actual result 472. This actual result 472 includes a day 4721, hour 4722 and minute 4723 for gondola filling (goods layout on each gondola) to be performed or gondola filling performed, and the number 4723 of goods filled in a gondola. The information increases for each new gondola filling information 473 . . . .

Figure 10:
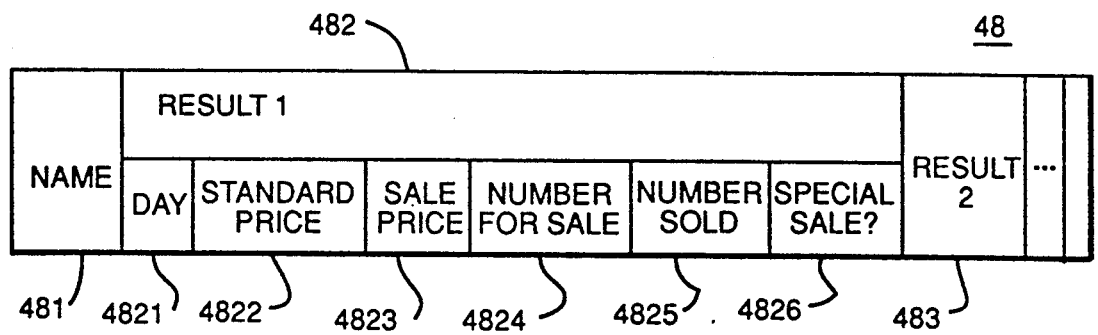
FIG. 10 illustrates the structure if a sales information record.

FIG. 10 illustrates the structure of a record storing sales information 48 for one kind of the goods. The sales information 48 includes the name of a goods 481 and the sales plan result information 482. This sales result information 482 includes a day 4821 for goods to be sold or goods were sold, a standard sales price 4822, a discount sales price 4823 for when the goods are to be sold as special sale goods, the number 4824 of goods in the sales plan, the number actually sold 4825, and information 4826 to indicate the presence or absence of a special sale showing if the goods are a special sale goods. The result information 482 increases for each new sales plan and actual result information 483 . . . .

The above has been the data for a merchandise management operation used in this embodiment. These data comprise a record for each name or kind of goods and comprise a file for each variety of goods, and are stored in a memory 4. Subsequently merchandise management using these data will be described.

Figure 1:
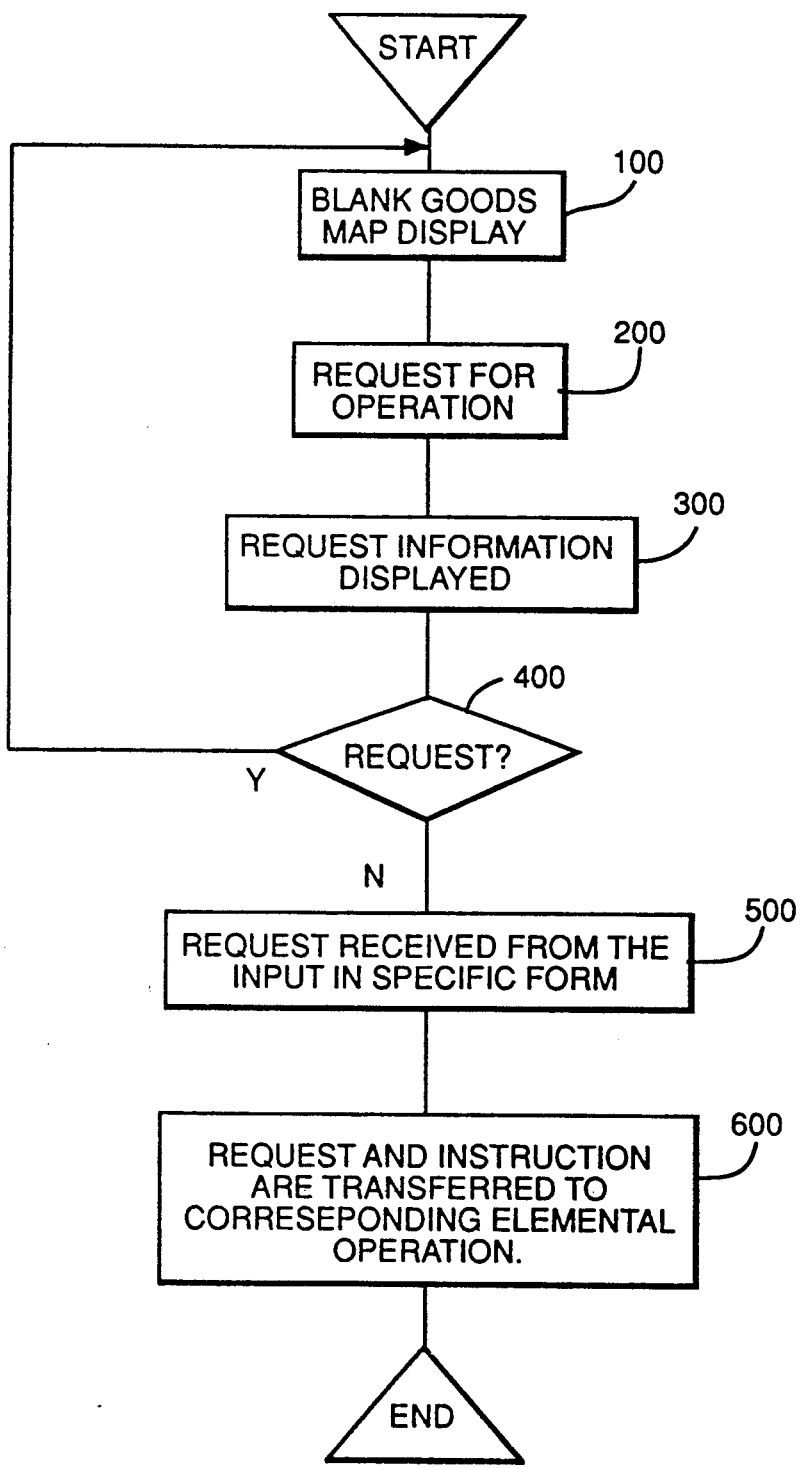
FIG. 1 is a flowchart showing merchandise management according to an embodiment of the present invention.

FIG. 1 is a flowchart showing merchandise management.

Figure 11:
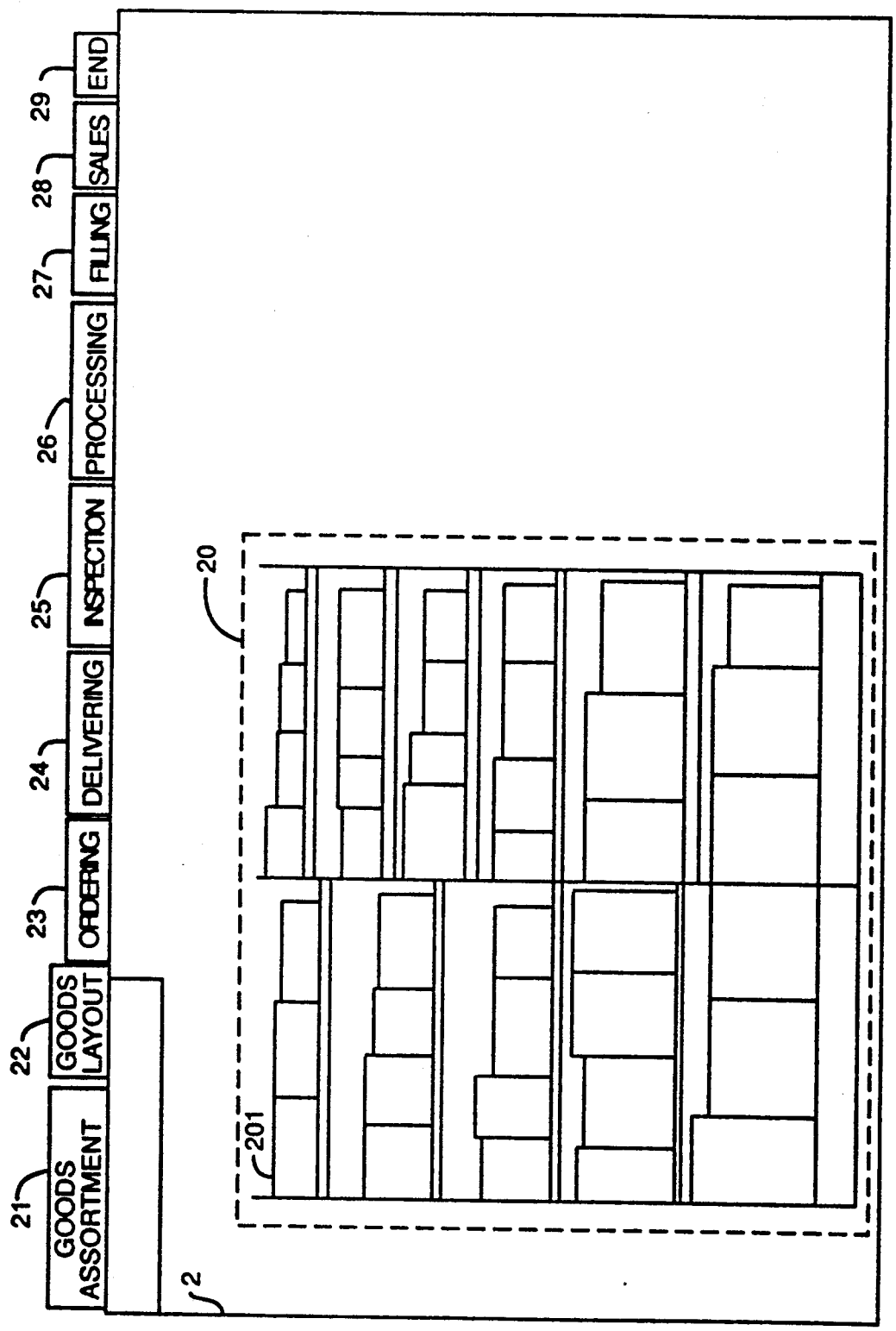
FIG. 11 is an example of the output of a goods layout map of a gondola for a certain gondola.

Step 100: In response to a user request, from the memory 4, the information required for constructing a goods layout map of a gondola according to the request (the goods assortment information 41 in FIG. 3 and a goods layout information 42 in FIG. 4) are read. Using these pieces of information, a goods layout map of a gondola is produced. Then the goods layout map of a gondola is outputted on the output unit 2 as a blank map. FIG. 11 is an output example of a goods layout map of a gondola 20 displayed as a blank map (to be described later).

Step 200: The user is requested to select the information required for a specific elemental operation among all the elemental operations which construct a merchandise management. The user selects with the input unit 3 either one of the elemental operations in a merchandising cycle from a goods assortment plan 21 and a goods layout plan 22 as shown in FIG. 11 to an ordering 23, delivering 24, inspection and storage 25, processing 26, gondola filling 27, and sales 28. Using a mouse as an input unit 3, the user selects the items from the display screen.

The system displays, in response to the selection of step 100, the information of a goods, for an elemental operation, in a form of a table on the output unit 2. Although the details are described later, this output is in the form 211 in the FIG. 12, for example. Using the input unit 3, the user selects the information items required for display from the information items stated in the table.

Step 300: The information for the corresponding information items selected at the step 200 are read from the memory 4. Then the information thus read are written on the goods layout map of a gondola 20 that were output at the step 100.

Step 400: Until a request is decided by the user for an elemental operation to be executed, the information analysis at the above three steps is repeated.

Step 500: The request is inputted from the input unit 3 of the elemental operation decided at the step 400.

Step 600: The request received at the step 500 is transferred to the corresponding operation for the elemental operation. If the destination is an elemental operation itself, the request is output to a printing unit such as a laser printer, etc. If the destination is a system for supporting the elemental operation, the request is transferred to the corresponding system for supporting the elemental operation.

The above has been the method for supporting the merchandise management operation according to the present invention.

Subsequently, the detailed description of a more specific example will be made as to an application of the method for supporting merchandise management operation of the present invention to the goods assortment elemental operation which is one of the major operations constructing the merchandise management. Thereafter, the examples of the application of this method for supporting merchandise management operation will be described respectively for a goods layout planning, ordering, delivering, inspection and storage, processing, gondola filling and sales. This description is made in order to show that the above mentioned method for supporting merchandise management operation can be applied easily and commonly to each of the operations which construct a merchandise management.

Figure 15:
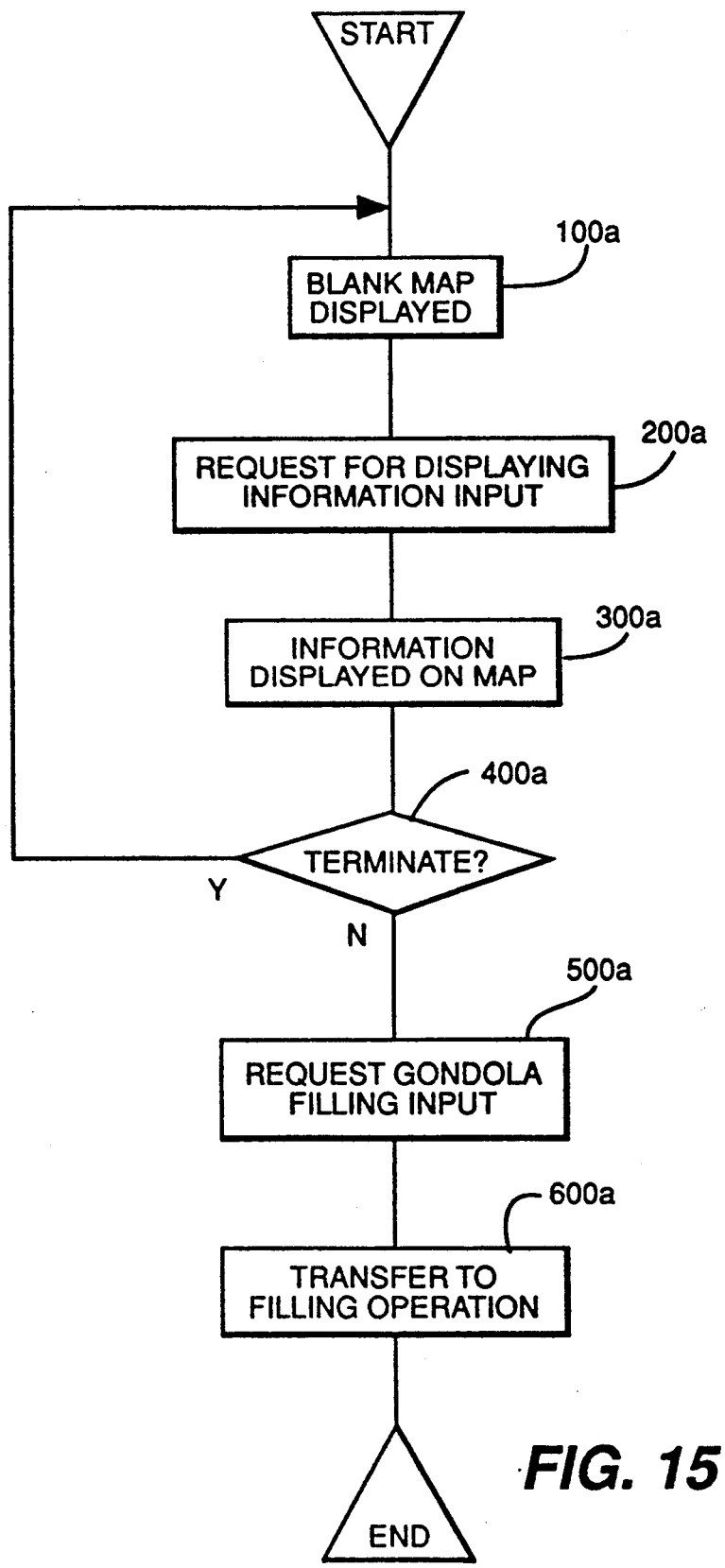
FIG. 15 is a flowchart for the goods assortment planning elemental operation.

FIG. 15 is a flowchart showing a method for supporting a goods assortment planning elemental operation.

Step 100a: This step is common to each of the operations which construct the merchandise management, and is the same as the step 100 shown in FIG. 1. From the memory 4 goods assortment information 41 and goods layout information 42 are read to produce a goods layout map of a gondola. Then, the goods layout map of a gondola is output to the output unit 2 as a blank map. FIG. 11 illustrates an output example of a goods layout map 20 of a certain gondola. One rectangle 201 represents a goods arrangement position in a gondola.

The output layout map of a gondola 20 is produced in a manner given below from the file of the layout information 42. A goods for the same gondola number as gondola number 4221 given to a gondola to be output, is selected. For the selected goods, its width dimension 4121 and other characteristics information 412 are read from the file of the goods assortment information 41, and its number to be arranged 423 is read from the file of the layout information 42. From these pieces of information read, the goods layout dimension (an overall dimension of a certain number of goods on a gondola) is obtained. Based on this layout dimension, an rectangle is drawn at a position to be defined by the contents of a shelf number 4222 and column number 4223 in the file of the layout information 42. For each of the goods of the goods thus arranged on the gondola, an rectangle is being drawn, so that an overall layout map of a gondola 20 is produced. In this respect, the adoption of an rectangle is derived from the fact that goods or containers of such goods are rectangle in their font contour, and that an rectangle is a convenient shape for the computer to process. However, a triangle, oval, etc. for example, can also be adopted for the same purpose. Thus all of the same kind of goods are shown by one closed line only, here a rectangle, which produces the map in blank to speed computer processing as compared to a detailed map.

The rectangle frames 21-28 show the elemental operation of constructing a merchandise management supported by this system.

Step 200a: In a display screen shown in FIG. 11, the user selects what information is to be displayed for which elemental operation constructing a merchandise management. First, the user is requested to select a specific information for a specific elemental operation for display. Specifically, the user selects by the input unit 3 one of the rectangle frames 21-28 for the desired elemental operation. Here, it is assumed that a goods assortment planning represented by an rectangle frame 21 is selected.

Figure 12:
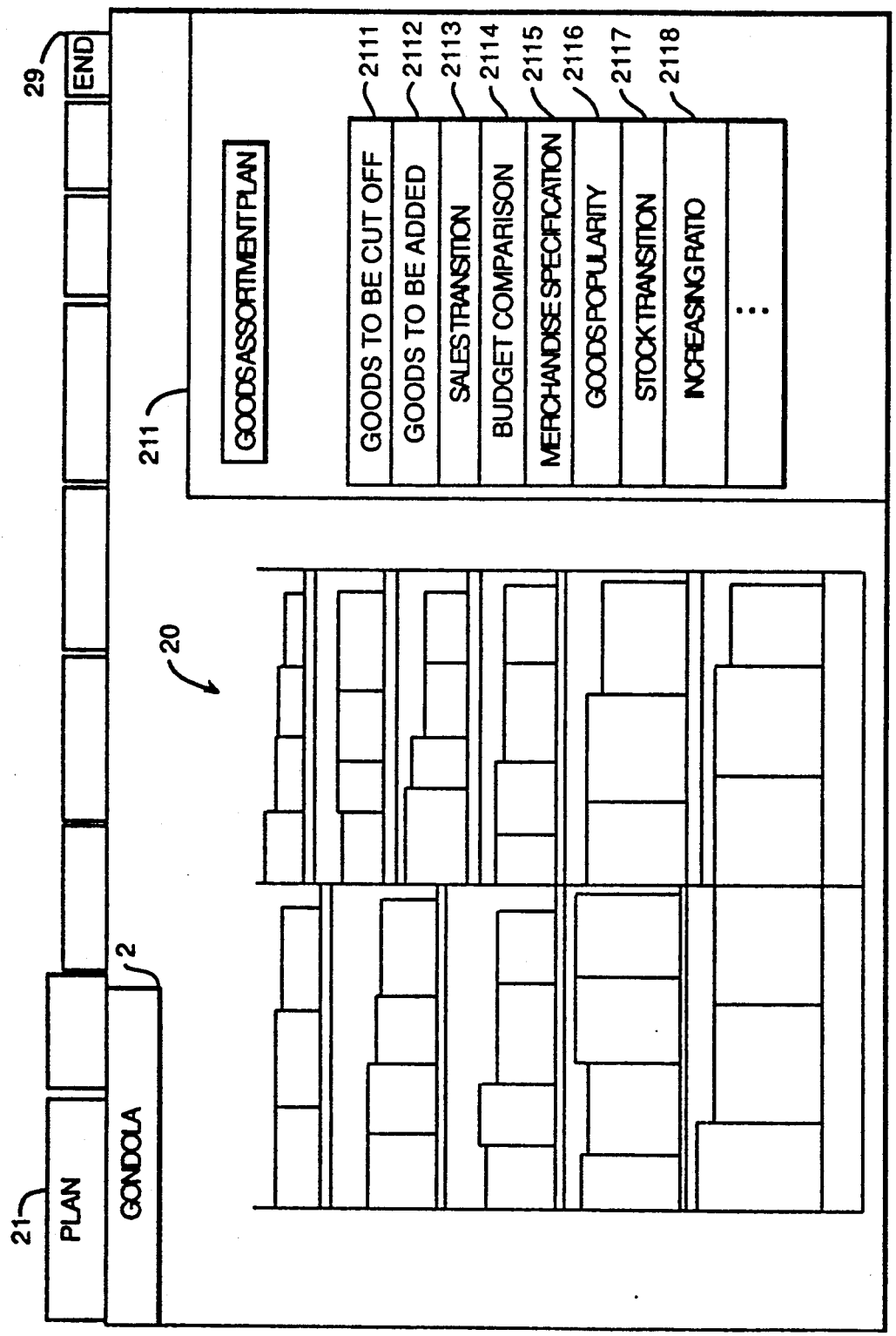
FIG. 12 is an example of the information display for the goods assortment planning.
Figure 16:
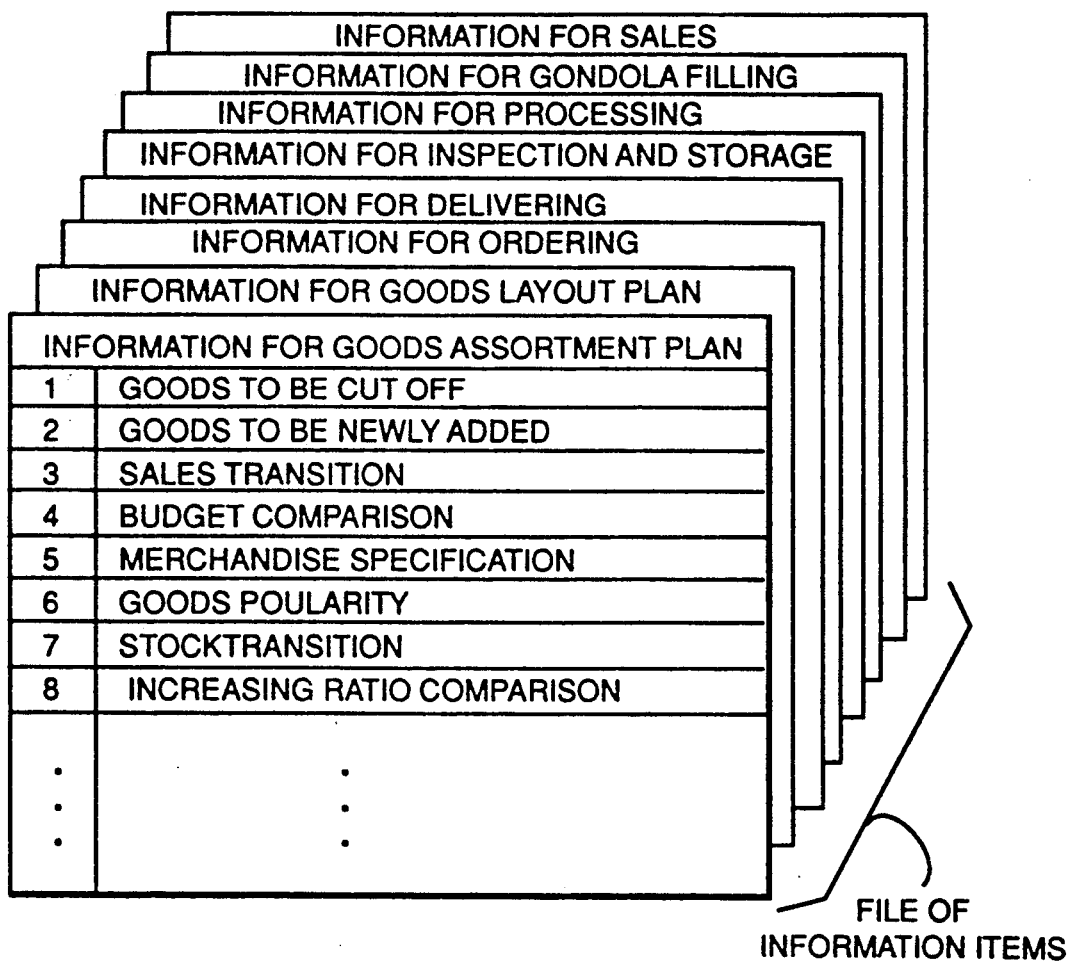
FIG. 16 illustrates a file of character strings for storing the character strings to be displayed.

When the goods assortment planning 21 is selected, a screen shown in FIG. 12 is displayed on the output unit 2. On the screen, information 211 for the goods assortment planning is displayed in the form of a table in addition to the goods layout map of a gondola 20 which has already been on the screen. This table is stored in the memory 4 as a file of character strings shown in FIG. 16. For the information of the goods assortment planning elemental operation, the items given below are displayed. (1) a merchandise table 2111 of the goods to be cut off showing these goods which should be removed from the gondola shelf, (2) a merchandise table 2112 of the goods to be added on a gondola shelf, showing those goods which should be arranged on a gondola shelf in place of the cutoff goods, (3) a sales transition 2113 showing the sales transition of each goods, (4) a budget comparison 2114 showing the sales plan, (5) a merchandise specification 2115 showing the characterised information of each goods, (6) a goods popularity 2116 for each goods (the goods poplurality is a name given to a goods classified by its sales and a profit, etc.. For this classification, a cross ABC analysis is often utilized. Then for example, a goods which sells the most with the highest profit is called a "highly profitable popular goods"), (7) a stock transition 2117 showing the transition of each goods in stock, and (8) an increase ratio comparison 2118 showing the increasing ratio of each management factor (sales, profit, etc.) and some others.

Step 300a: The information for the corresponding items selected at the step 200a is read from the memory 4 and the information thus read is written on the goods layout map of a gondola 20 output at the step 100a.

Figure 13:
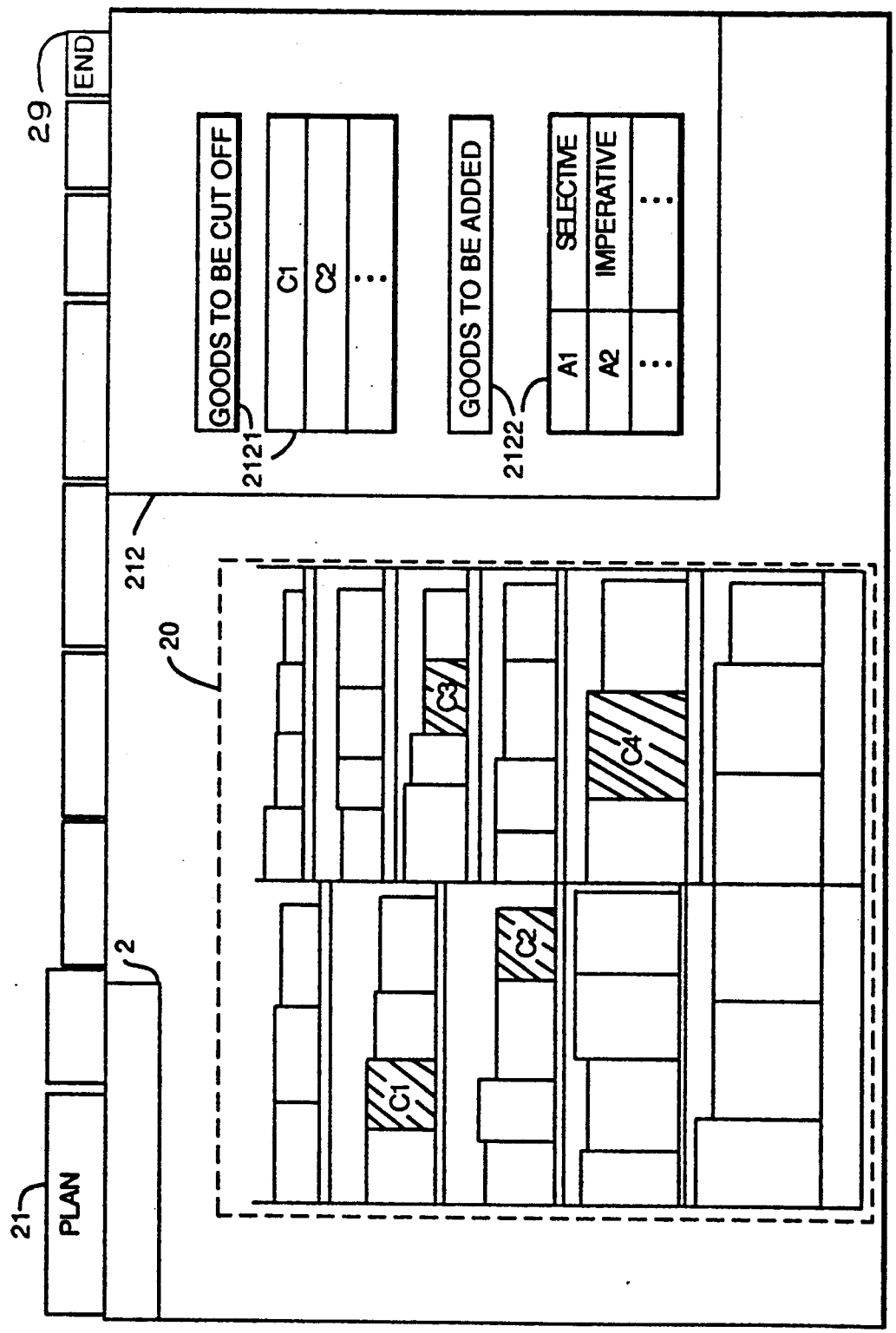
FIG. 13 is an example of an output screen showing a plan of the goods to be cut off and a plan of the goods to be newly added, which are selected in FIG. 12.

FIG. 13 is a screen 212 which is output as a result of the selection in the table 2111 for the goods to be cut off and the table 2112 for the goods to be newly added shown in FIG. 12. On the goods layout map of a gondola 20, the goods to be cut off C1, C2, C3, and C4 are represented in a different manner (such as a different color in blinking, in shading, etc.). In detecting the identifiers for the goods layout on each gondola in the good assortment information 41 on the goods layout map of gondola 20, a goods identified as "cutoff goods" is the one to be cut off. Then, a table 2121 for the goods to be cut off and table 2122 for the goods to be added are further displayed. In table 2121 for the goods to be cut off, the goods to be cut off C1, C2, C3, and C4 are represented in a table. In the table 2122 for the goods to be added, the goods to take place of those cutoff goods A1, A2, ... are represented. In the table 2122, the goods A2 with an identifier "imperative" is a goods which must be arranged on a gondola. A goods A1 with an identifier "selective" is a goods, the layout arrangement of which is entrusted with the judgement of a person in charge of planning (user). In detecting the identifiers for the goods layout on each gondola in the goods assortment information 41 on the goods layout map of a gondola 20, added goods are shown as "added goods", and by "added selective goods" with an identifier "selective".

Step 400a: Until the user describes a request for an elemental operation to be executed, the information analysis by the above mentioned three steps is repeated. In this example, until the user decides its request for the goods assortment planning elemental operation, the information analysis display on the table 2121 for the goods to be cut off, table 2122 for the goods to be added, sales transition 2113, budget comparison 2114, merchandise specification 215, goods increase ratio 2118, etc. is repeated.

Step 500a: The request decided for the elemental operation up to step 400a is inputted.

Figure 14:
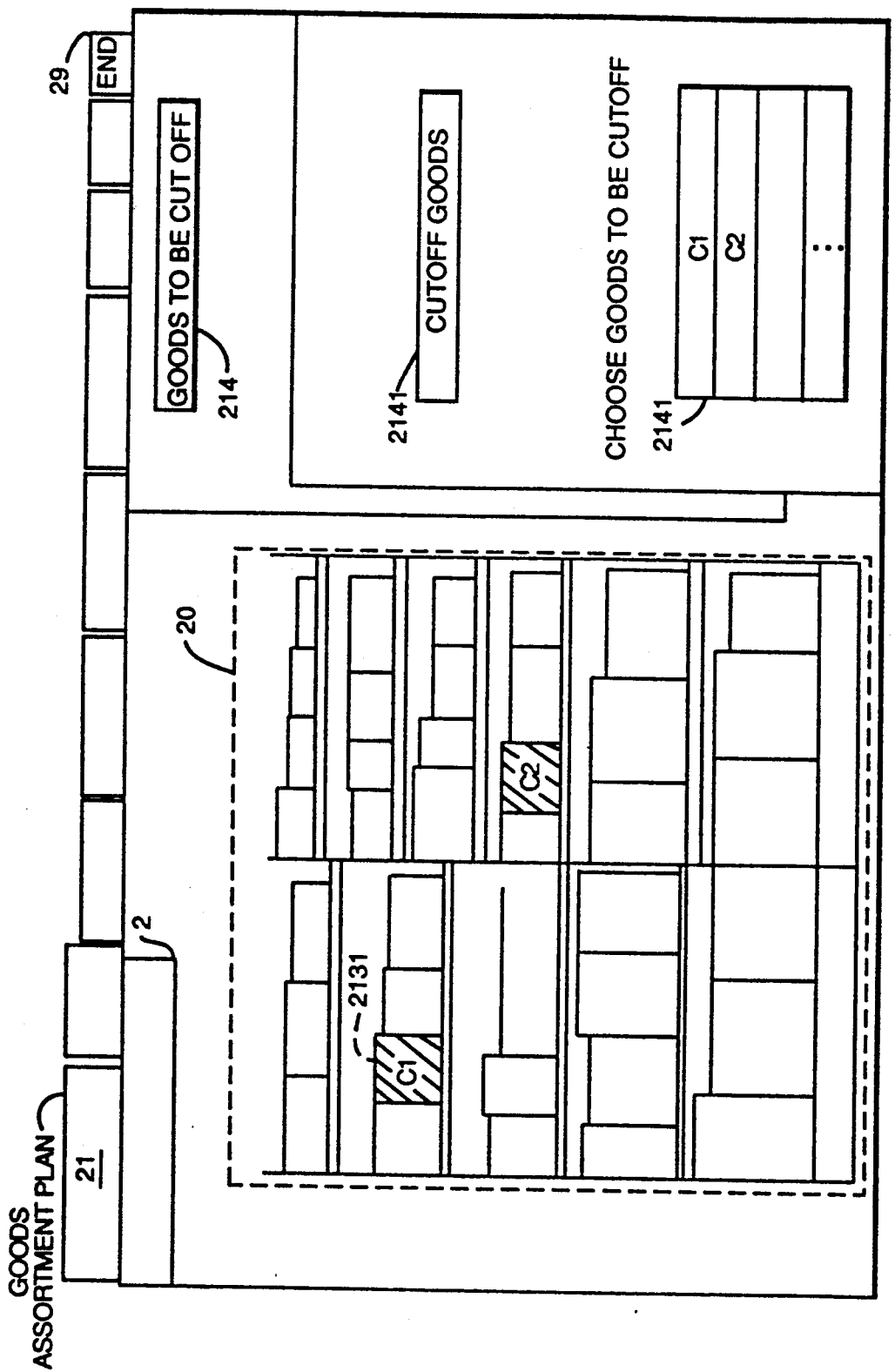
FIG. 14 shows a screen when cutoff goods are designated from the input unit.

FIG. 14 is a screen shown when a cutoff goods is requested from the input unit 3. The instruction of goods cutoff is issued by the user on a goods layout map of a gondola 20. Specifically the user selects (picks up by a mouse) a cutoff goods 2131 by the input unit 3. The selected goods 2131 is additionally written on the table for cutoff goods 2141 in the cutoff goods screen 214 sequentially. Further a record having the name of goods 421 which is identical to the goods 2131 is selected from the records of layout information 42, and the record is removed from the layout information 42. Also, the identifier 413 for the goods layout on each gondola for the goods assortment information 41 of that goods is modified to read "discarded goods".

Step 600a: The request received in step 500a is transferred to the corresponding elemental operation of merchandise management. Here the contents of the request received is a removal of goods C1 and C2. If the destination of this content is an elemental operation, the request is output to a printing unit such as a laser printer, etc.. If the destination is a system for supporting the elemental operation constructing a merchandise management, the request is transferred to the corresponding system for supporting the elemental operation constructing a merchandise management through a communication line or using a memory medium such as a magnetic disk.

With a goods assortment planning elemental operation as an example, a method for supporting merchandise management operation using this system has been described as above. The steps 100a and 300a are executed as part of the function 12 to display information for the corresponding request record on a goods layout map of a gondola. The step 200a is executed as a function 11 to receive an information display request. The step 500a is executed as a function 13 to receive a request for each of the elemental operations comprising a merchandising cycle or a system for supporting each of the operations constructing a merchandise management. The step 600a is executed as a function 14 to transfer the request to the corresponding elemental operation of merchandise management. The control of the execution sequence of the step 400a and each of the steps is performed as a function 15 for controlling the execution sequence of the functions.

For the other operations (each operations of the goods layout planning 22, ordering 23, delivering 24, inspection and storage 25, processing 26, gondola filling 27 and sales 28), a supporting method by this system is the same. Therefore, by repeating the steps 100 to 600 shown in FIG. 1 for each of the operations, the overall merchandising cycle (the repetition of the goods assortment planning 21, goods layout planning 22, ordering 23, delivering 24, inspection and storage 25, processing 26 gondola filling 27 and sales 28) can integrally be managed.

Subsequently, an example of the elemental operation supporting will be described for each elemental operation of the goods layout planning 22, ordering 23, delivering 24, inspection and storage 25, processing 26, gondola filling 27 and sales 28.

Figure 17:
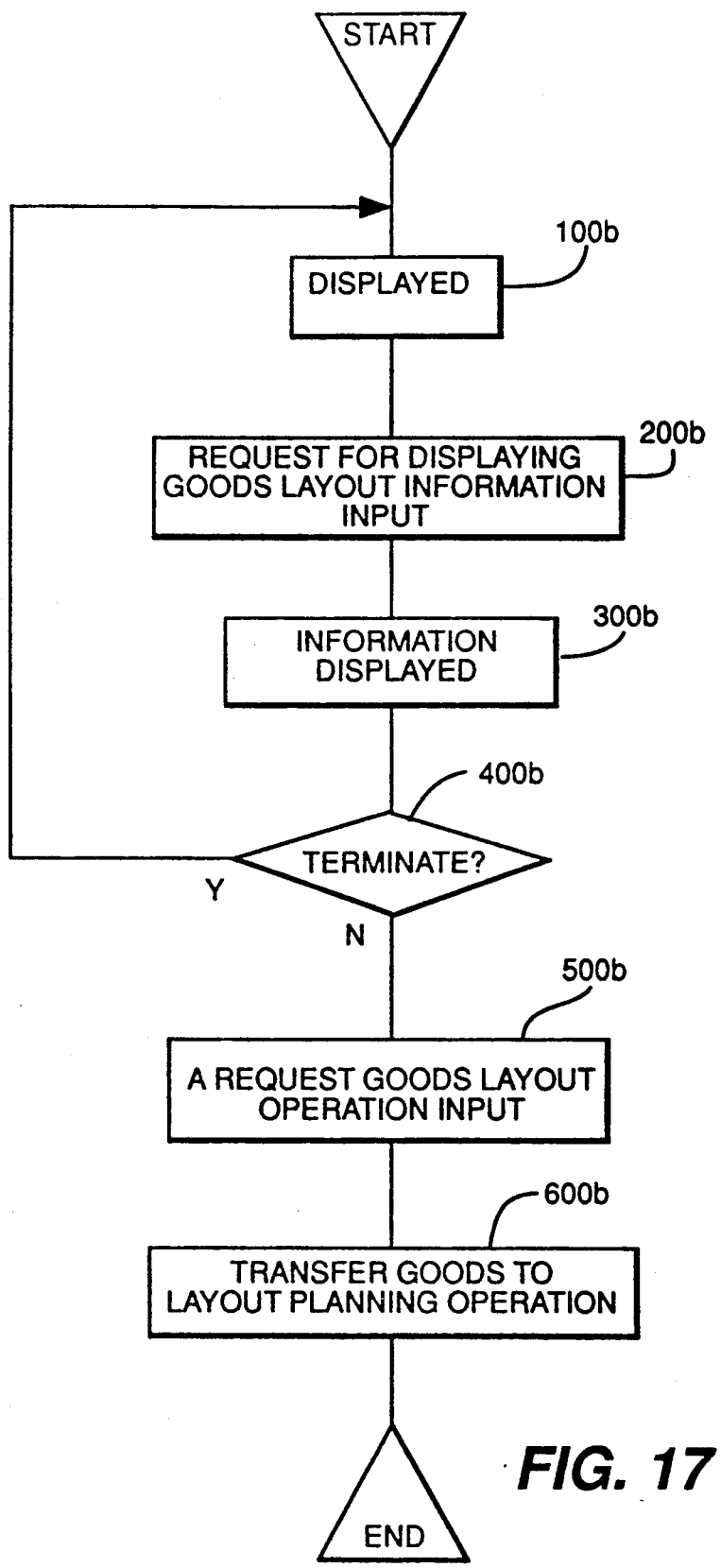
FIG. 17 is a flowchart showing the goods layout planning elemental operation.

FIG. 17 is a flowchart showing a method for supporting a goods layout planning elemental operation. In accordance with this flowchart, the method for supporting the goods layout planning elemental operation is described.

Step 100b: This step is the same as the step 100 in FIG. 1, and the description is omitted.

Figure 18:
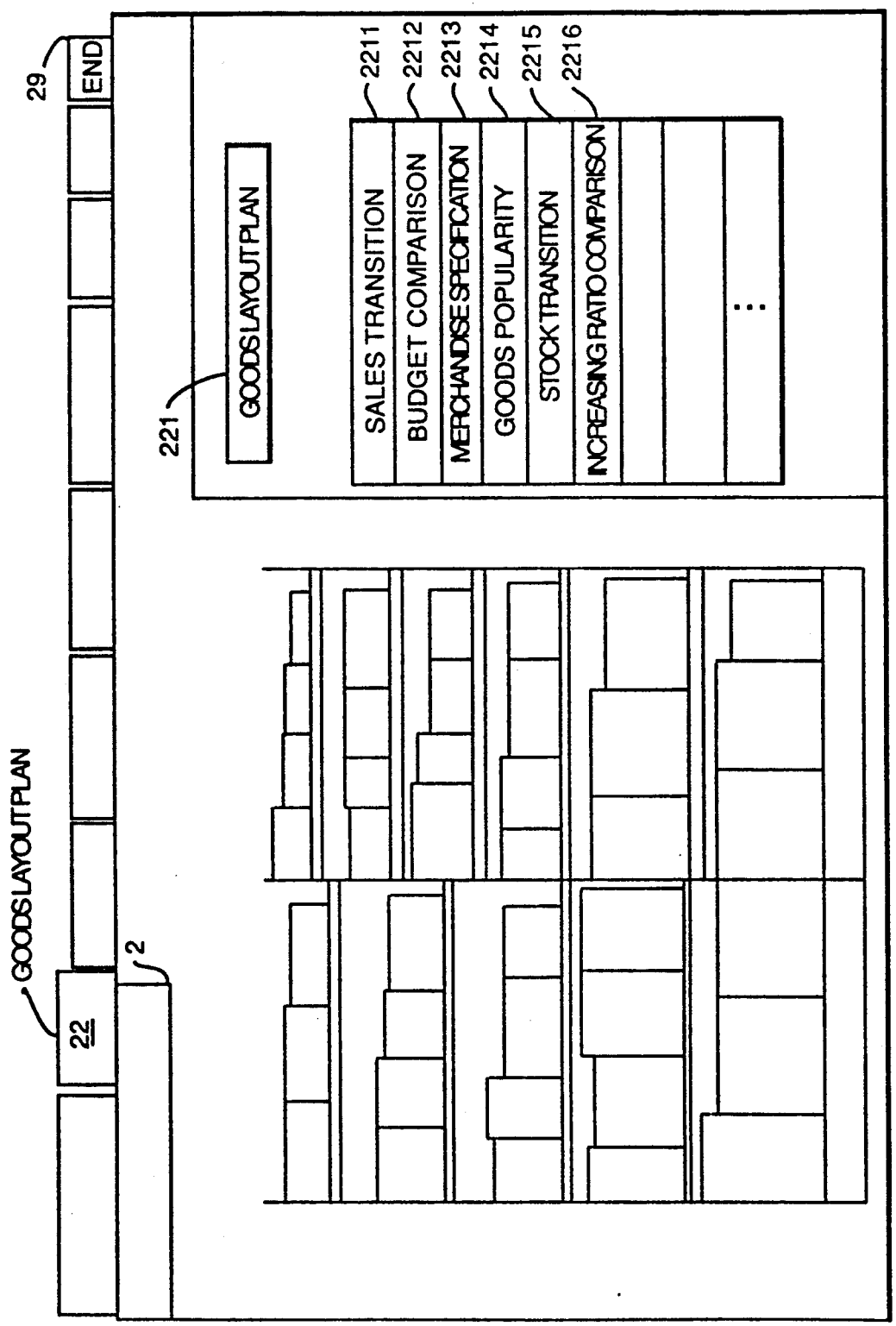
FIG. 18 is an example of the screen when a goods layout plan is selected by the user.

Step 200b: FIG. 18 illustrates a resultant screen shown when the user selects a goods layout planning 22 as an elemental operation. The information of this elemental operation is displayed in a form of table for the goods layout planning information 221. This table is stored in the memory 4 as a file of character strings shown in FIG. 16.

For the information items of the goods layout planning elemental operation, the information items given below are displayed: (1) a sales transition 2211 showing the sales transition of each goods, (2) a budget comparison 2212 showing the achievement state of the sales plan, (3) a merchandise specification 2213, (4) a goods popularity 2214, (5) a stock volume transition 2215 showing the transition of the stock volume of each goods, (6) an increase ratio 2216 showing the increase ratio of a management factor such as sales, profit, etc., and some others. The user can select a desired item of information using the input unit 3. This selection can be performed by menu selection method.

Figure 19:
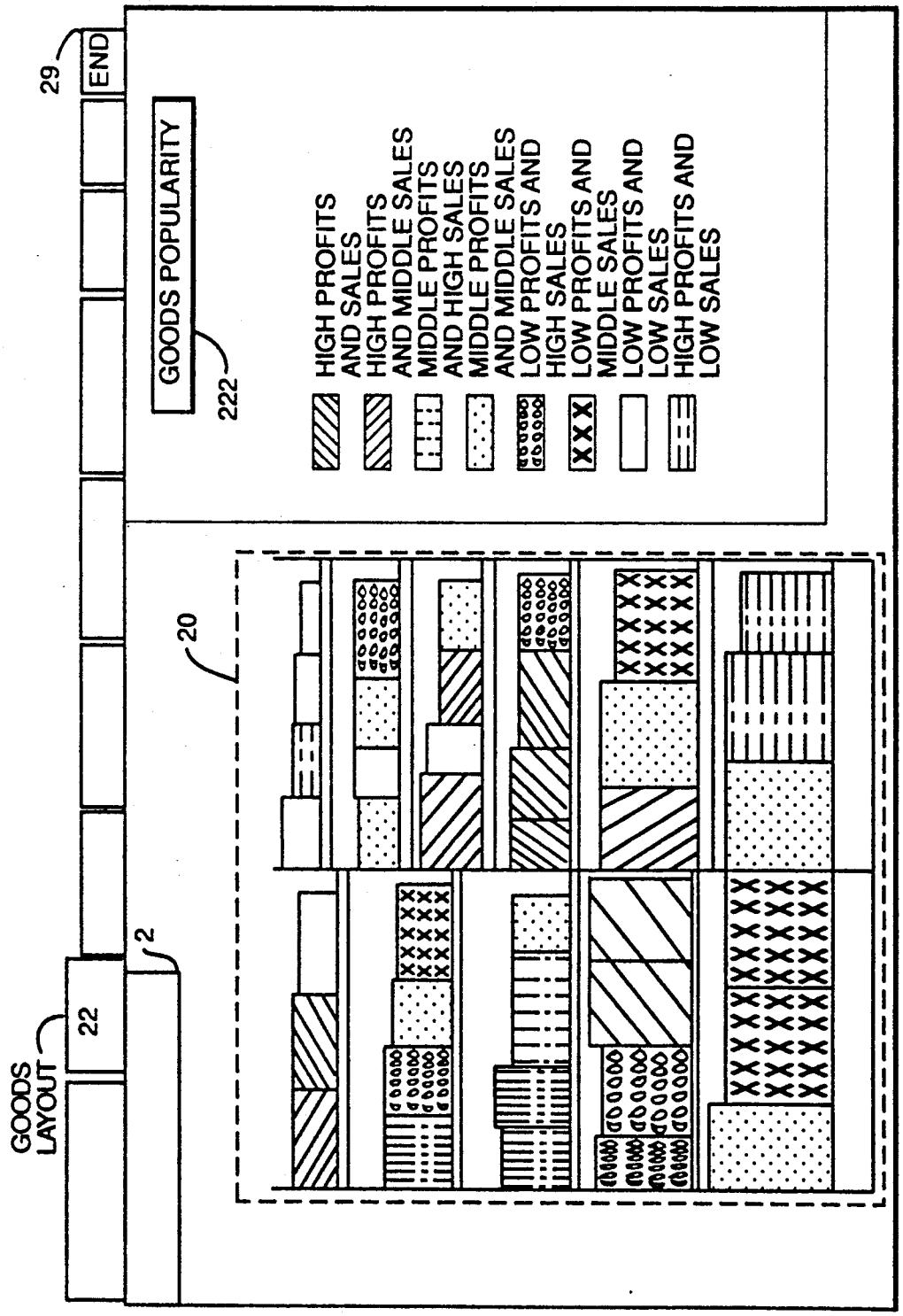
FIG. 19 is an example of the screen showing the sales characteristics of one of the good on a gondola.

Step 300b: FIG. 19 is a screen displaying the sales characteristics of the goods on each gondola on the goods layout map of a gondola 20 as a result of the goods popularity 2214 selected at the step 200b. The sales characteristics of a goods are not shown in terms of an absolute value such as sales, etc., but is displayed by the use of classification called a goods popularity. The sales of each goods is obtained by multiplying a standard price 4822 in the sales information 48 of the corresponding goods by the number 4825 of goods sold and the in description patterns it is shown in the goods popularity table 222. It is desirable to display the description patterns in different color. For this classification, a cross ABC analysis method is utilized. As the cross ABC analysis method is a well-known technique, the description is omitted.

Step 400b: Until a request is decided for the goods layout planning elemental operation, the information analysis by the above-mentioned three steps is repeated. In this example, until the user decides its request for the goods layout respectively of the sales transition, budget comparison, merchandise specification, goods popularity, stock transition, increase ratio comparison, etc. is repeated.

Figure 20:
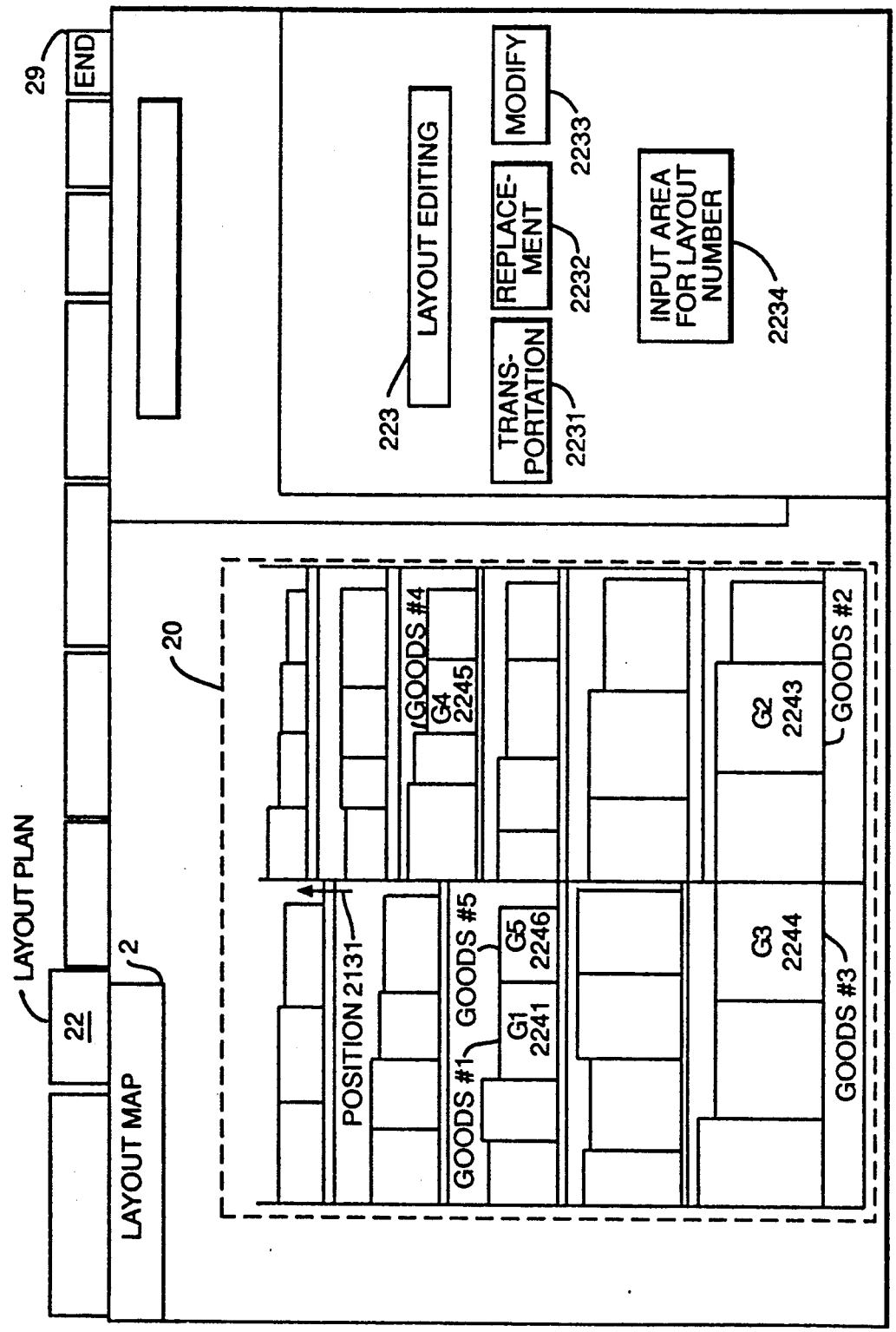
FIG. 20 is an example of the screen when the rearrangement of position of each of the goods on a gondola is instructed by the user in the goods layout planning elemental operation.

Step 500b: FIG. 20 illustrates a screen 223 displayed when a request instruction for the goods layout planning elemental operation is inputted from the input unit 3 as a "rearrangement of position of each goods on a gondola".

The rearrangement of position of each goods on a gondola provides the three varieties of editing functions given below, i.e., transportation 2231, replacement 2232, modification of the number of a goods arranged on a gondola. The user issues a request for a rearrangement of the position of each goods on a gondola on the goods layout map of a gondola 20. Subsequently, the method of request will be described for each of the editing functions.

A transportation of goods 2241 from its current position to a position 2242 is described. The user selects transportation 2231 by the input unit 3, selects the goods 2231 by the input unit 3, and further selects the goods 2241 and the position 2242 also by the input unit 3. Based on the above instruction for the selections, the shelf number 4222 in the goods layout position information 422 in a record of the goods layout information 42 for the name of a goods 421, which is G1, is shifted from [3] to [1]. Then the column number 4223 is shifted from [3] to [4]. The column number 4223 is given sequentially from the left facing the gondola shelf. As the G1 is transported, the column number 4223 in the goods layout information 42 for a goods G5 is shifted from [4] to [3].

The replacement of the layout positions for goods 2243 and goods 2244 is described. The user selects replacement 2232 by the input unit 3, and further selects the goods 2243 and the goods 2244 also by the input unit 3. In this system, the layout information 42 is selected for the name of a goods 421 of G2 and G3 respectively based on the above instructions for the selection. Then, the gondola number 4221 in the layout position information 422 of the layout information 42 for G2 is shifted from [2] to [1], the gondola shelf numbers 4222 is shifted from [6] to [5], and further, the column number 4223 is shifted from [2] to [3]. Also, the gondola number 4221 in the layout position information 422 in the layout information 42 of G3 is shifted from [1] to [2], the shelf number 4222 is shifted from [5] to [6], and further the column number 4223 is shifted from [3] to [2]. Here in this description, the gondola on the left facing the goods layout map of a gondola 20 in FIG. 20 is numbered [1] and its adjacent gondola is numbered [2]. The shelf number is counted from the top to the bottom.

The modifications of a number of goods 2245 from two to three is described. The user selects a modification of the number of goods arranged on a gondola 2233 by the input unit 3 and further the goods 2245, also by the input unit 3. Finally, the number (3) of the goods after modification is inputted to the layout number input columns 2234 by the input unit 3. In this system, the layout number 423 in the layout information 42 of the name of the goods 421 for G4 is modified to (3) based on the above instruction for the selections.

Step 600b: The request received at the step 500b is transferred to the layout planning elemental operation that is a system for supporting the layout planning elemental operation.

Figure 21:
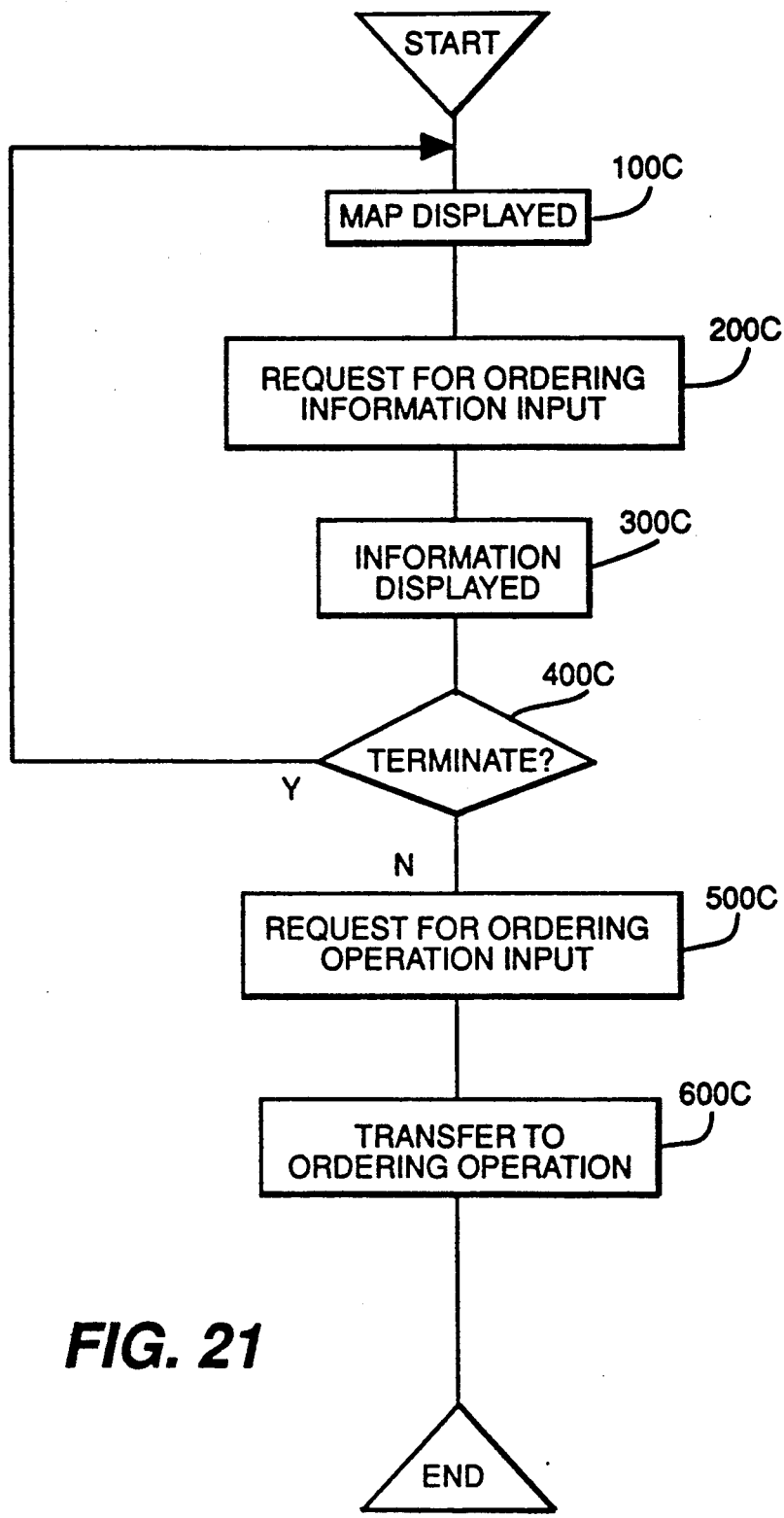
FIG. 21 is a flowchart showing the elemental operation of ordering.

FIG. 21 is a flowchart showing a method for supporting an ordering elemental operation. In accordance with this flowchart, the method for supporting the ordering elemental operation is described.

Step 100c: As this step is the same as the step 100 in FIG. 1, the description is omitted.

Figure 22:
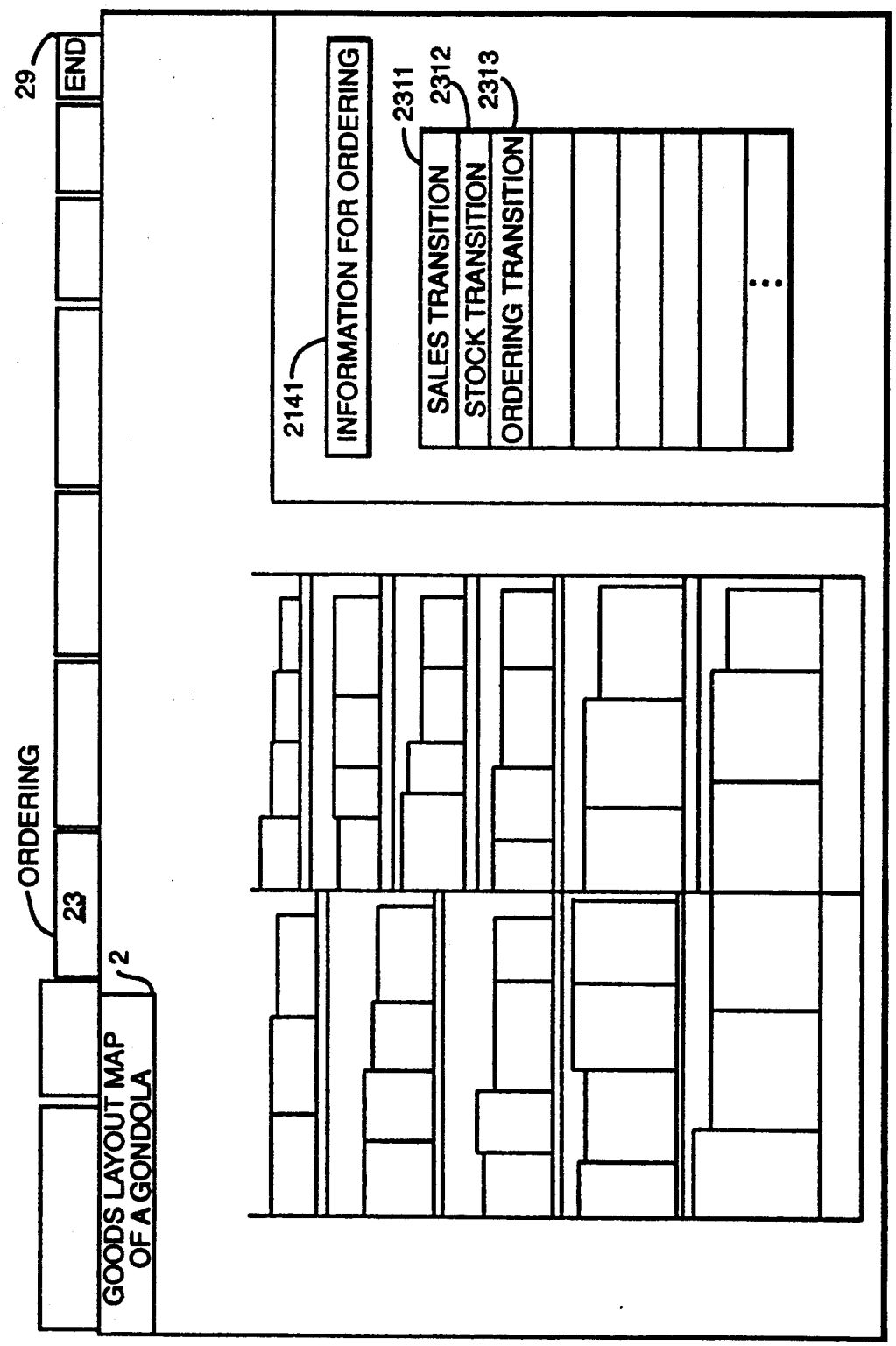
FIG. 22 is an example of the screen when the ordering elemental operation is selected by the user.

Step 200c: FIG. 22 illustrates a resultant screen selected by the user for an ordering elemental operation 23 as an elemental operation. The information for this elemental operation are displayed in the form of a table as an information for the ordering elemental operation 223. This table is stored in the memory 4 as a file of character string shown in FIG. 16.

For the items of the ordering elemental operation, the items given below are displayed: (1) a sales transition 2311 showing the sales transition of each goods, (2) a stock volume transition 2312 showing the stock volume of each goods, (3) an ordering transition 2313 showing the transition of the number ordered for each goods, etc.. The user selects desired items using the input unit 3. This selection is made by a menu selection method.

Figure 23:
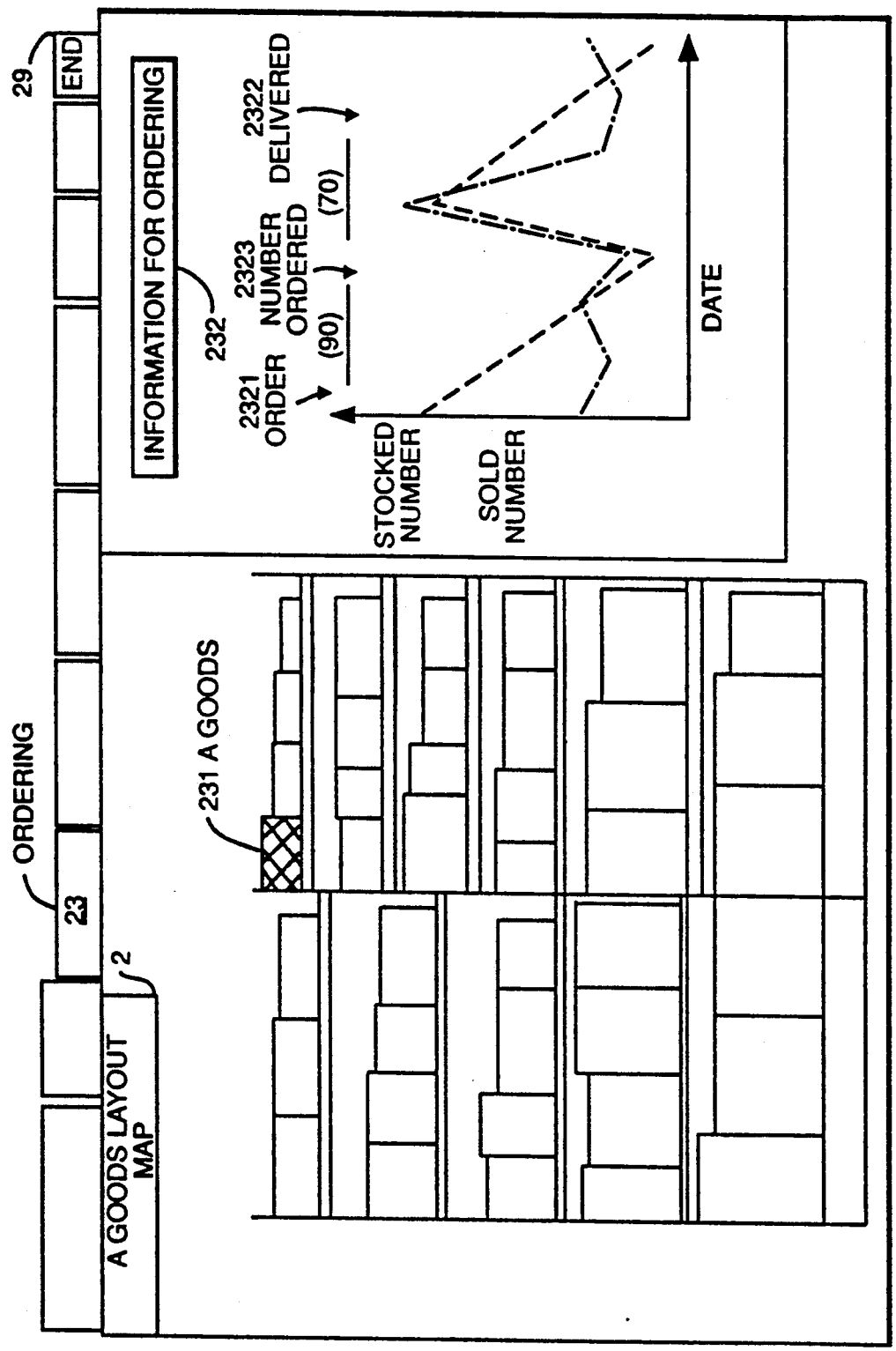
FIG. 23 is an example of the screen displaying an ordering transition of one of the goods shown on a goods layout map of a gondola.

Step 300c: FIG. 23 illustrates a screen 232 displaying the ordering transition of a certain goods on a goods layout map of a gondola 20 as a result of the selection of the ordering transition 2313 at the step 200c. On the screen 232, a blank triangle represents data of an order issued 2321, a black triangle represents the delivered date of the order 2322, and in parentheses is the number ordered 2323. Also, in order to support estimation of the time and number of an order to be issued, a graph showing the transition of the numbers of goods sold and stocked is displayed. For observing the ordering transition of goods 231, the user selects by the input unit 3 the goods 231 on the goods layout map of a gondola 20. The dashed line represents stock, while the dot dash line represents sales.

Step 400c: Until a request for the ordering, the information analysis by the above mentioned three steps is repeated. In this example, until the user decides the request for an ordering, the information analysis display of the sales transition, stock volume transition, ordering transition, etc. is repeated.

Figure 24:
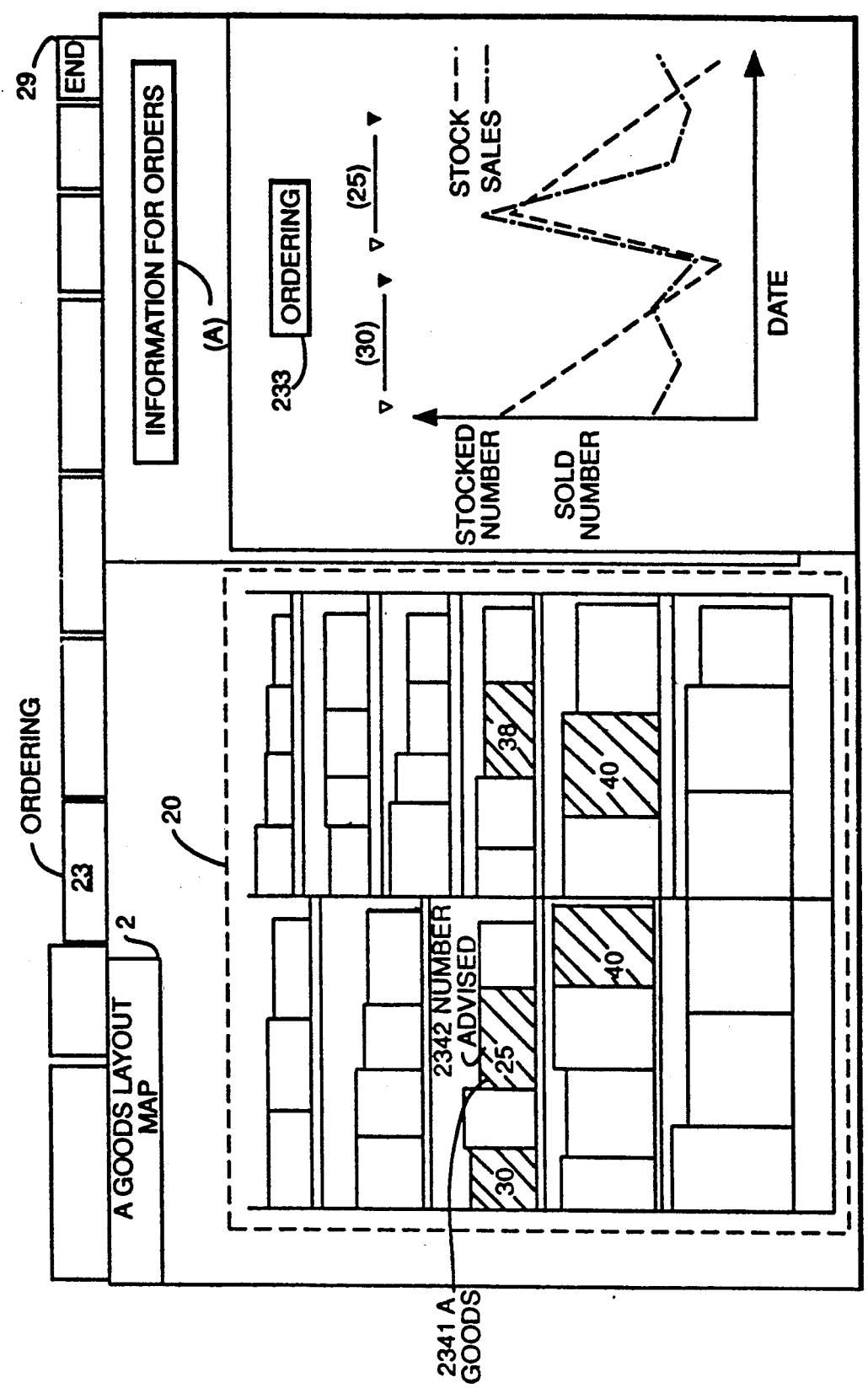
FIG. 24 is an example of the screen for the user to instruct ordering.

Step 500c: FIG. 24 illustrates a screen 233 for the user to instruct ordering. To instruct ordering, the user uses a goods layout map of a gondola 20. Subsequently, an instruction method for ordering will be described.

In this system, goods to be ordered and a number of the goods ordered are advised by an expert system using a knowledge base of the ordering information 43 and stock information 45. Specifically, the ordering information 43 and stock information of goods 2341 are examined to compare an ordering point 432 in the ordering informations 43 with a number in stock 4524 in the stock information 45. As a result of this comparison, if the value of a number 4524 of a goods in stock is lower than the value of an ordering point 432, the corresponding goods 2341 is considered to be a goods for which an order should be issued, and the difference between these two values is considered to be number 2342 for which an ordering should be advised, and these are shown on a goods layout map of a gondola 20. The user confirms whether or not the number 2342 of goods to be ordered is appropriate. To make this confirmation, the user uses screen 233 showing the ordering transition. The display on the screen 233 of the information of the actual result of goods ordered is decided by the user. If for example, an advised number 2342 is not satisfactory, the user selects the goods 2341 from the goods layout map of a gondola 20 using the input unit 3 to modify the advised number 2342 for the goods 2341 to an appropriate number for its ordering. This system stores the month, day and hour of the data of the order issued on a month 4332, day 4332 and hour 4333 for an actual number ordered 433 for goods in the ordering information 43 of the goods 2341. Also, in the ordered numbers 4334, the appropriate order number inputted by the use is stored. The above elemental operation is repeated for each goods.

Step 600c: The request received at step 500c is transferred to the ordering elemental operation of the system for supporting the ordering elemental operation.

Figure 25:
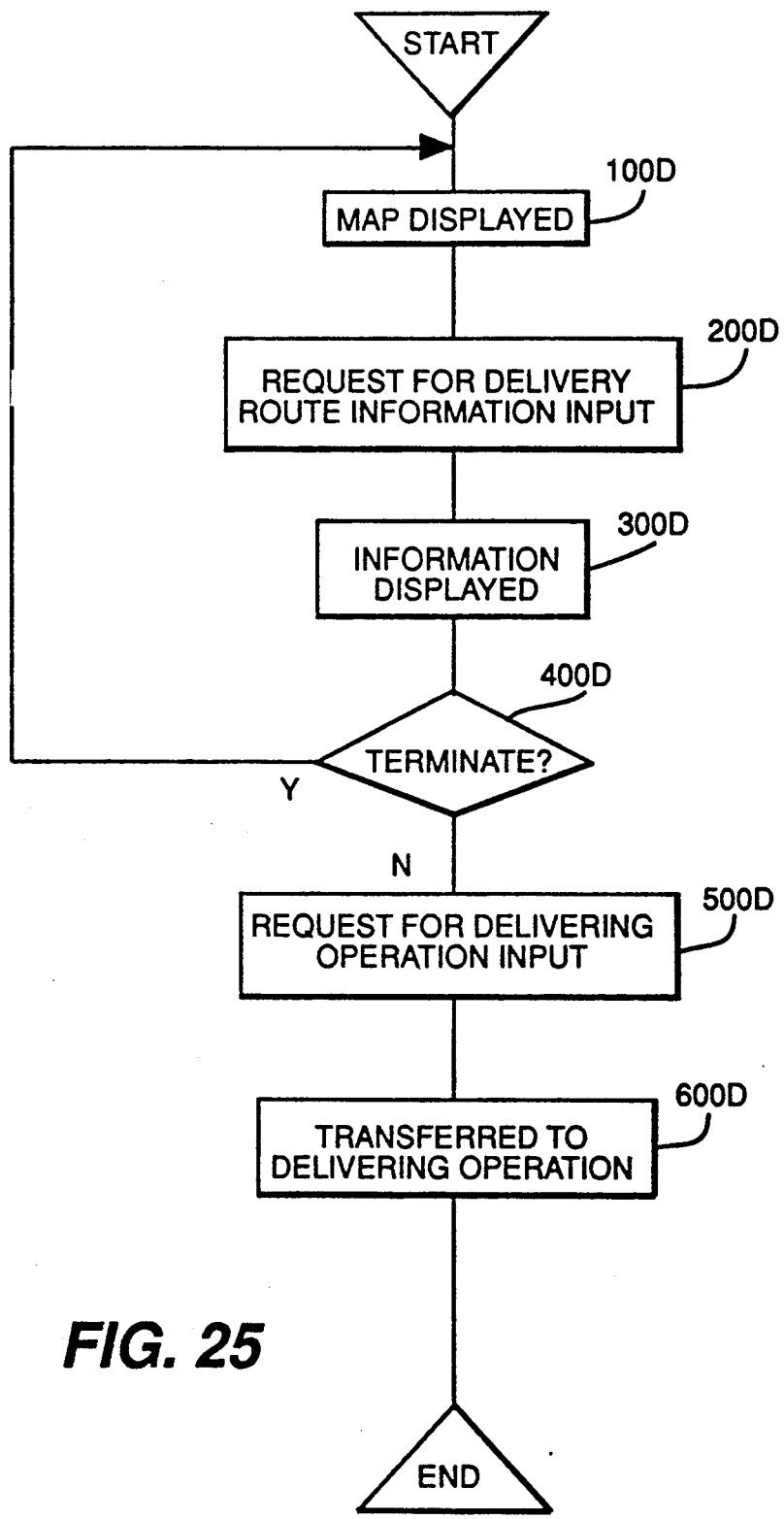
FIG. 25 is a flowchart showing a delivering elemental operation.

FIG. 25 is a flowchart showing a method supporting a delivering elemental operation.

Step 100d: As this step is the same as the step 100 in FIG. 1, the description is omitted.

Figure 26:
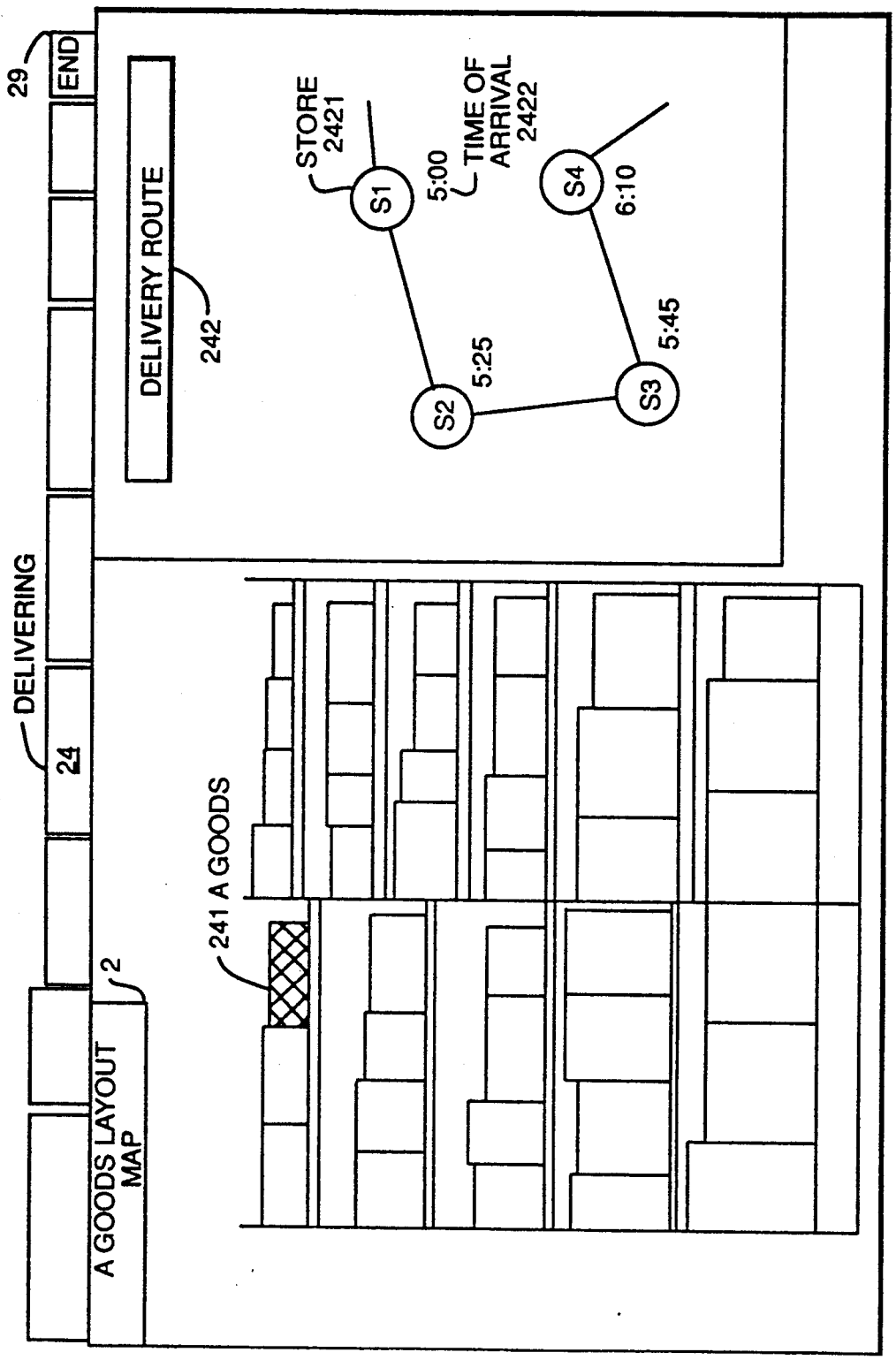
FIG. 26 is an example for the screen when the delivering elemental operation is selected by the user.

Step 200d: FIG. 26 illustrates a resultant screen shown when the user selects a delivering elemental operation 24. A delivery route information 242 is displayed together with a goods layout map of a gondola 20. In the delivery route information 242, a circle O represents a store 2421, a line with an arrow head represents the delivery route, and a value represents an arrival time 2422.

Step 300d: The user selects a goods 241 by the input unit 3 from a goods layout map of gondola 20 and observes the delivery route of the selected goods 241.

Step 400d: Until a request is decided for the delivering, the user repeats the information analysis by the above mentioned three steps.

Figure 27:
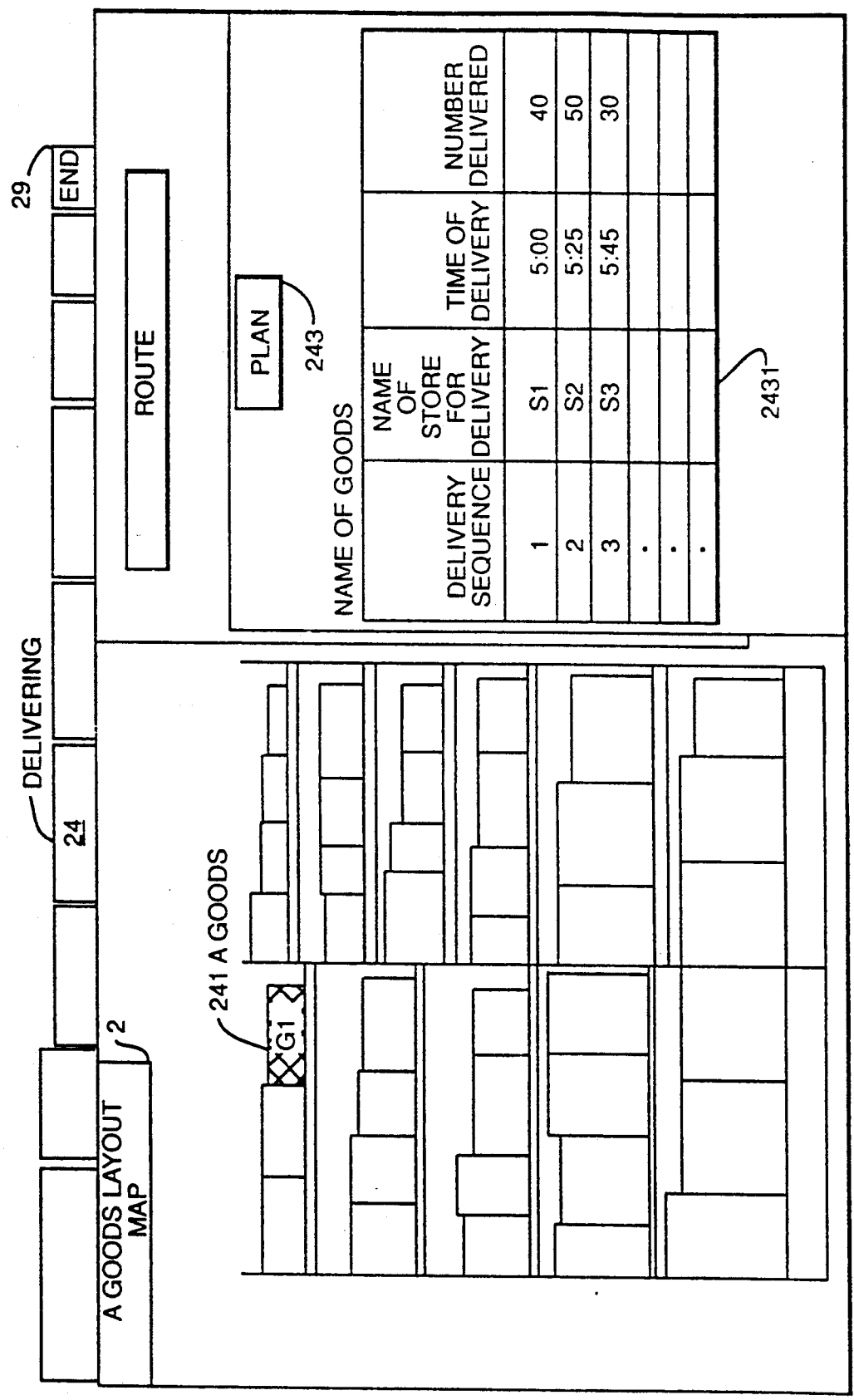
FIG. 27 is an example of the screen for the user to instruct modifying the delivery plan.

Step 500d: FIG. 27 illustrates a screen 243 for the user to request a modification of a delivery plan. The user uses a goods layout map of a gondola 20 to instruct the modification of a delivery plan. Subsequently, a method of modification instruction will be described.

In this system, using the input unit 3, the user selects, from a goods layout map of gondola 20, a goods 241 for which the delivery plan should be modified. Based on the user's selection, this system outputs a delivery plan table 2431 to the output unit 2. The user edits the delivery plan on the delivery plan table 2431 displayed. Any information on the delivery plan table 2431 can be edited. The user requests a position to be rearranged on the delivery table 2431 by the use of input unit 3, and then inputs the information after the rearrangement. The user is assumed to have inputted an instruction to reduce the delivery route of goods 241 to S1 store and S2 store, based on the expected delivery data 442 and an expected delivery data 443. It is assumed that in the expected delivery date 442, the information of the S1 store is stored, and that in the expected delivery date 443, the information of the S2 store is stored. Likewise, if the name of a store to which a delivery is made is modified from [S1] to [S4], the values of the name of that store 4425 is modified from [S1] to (S4). If the delivery time is shifted from [5:00] to [5:05], the value of the minute 4423 is rewritten from [00] to [05]. If a delivered number is modified from [40] to [30], the value of the delivered number 4425 is rewritten from [40] to [30]. This elemental operation is repeated for a goods of which the delivery plan is not satisfactory.

Step 600d: The request received at the step 500d is transferred to the delivery elemental operation of a system for supporting the delivery elemental operation.

Figure 28:
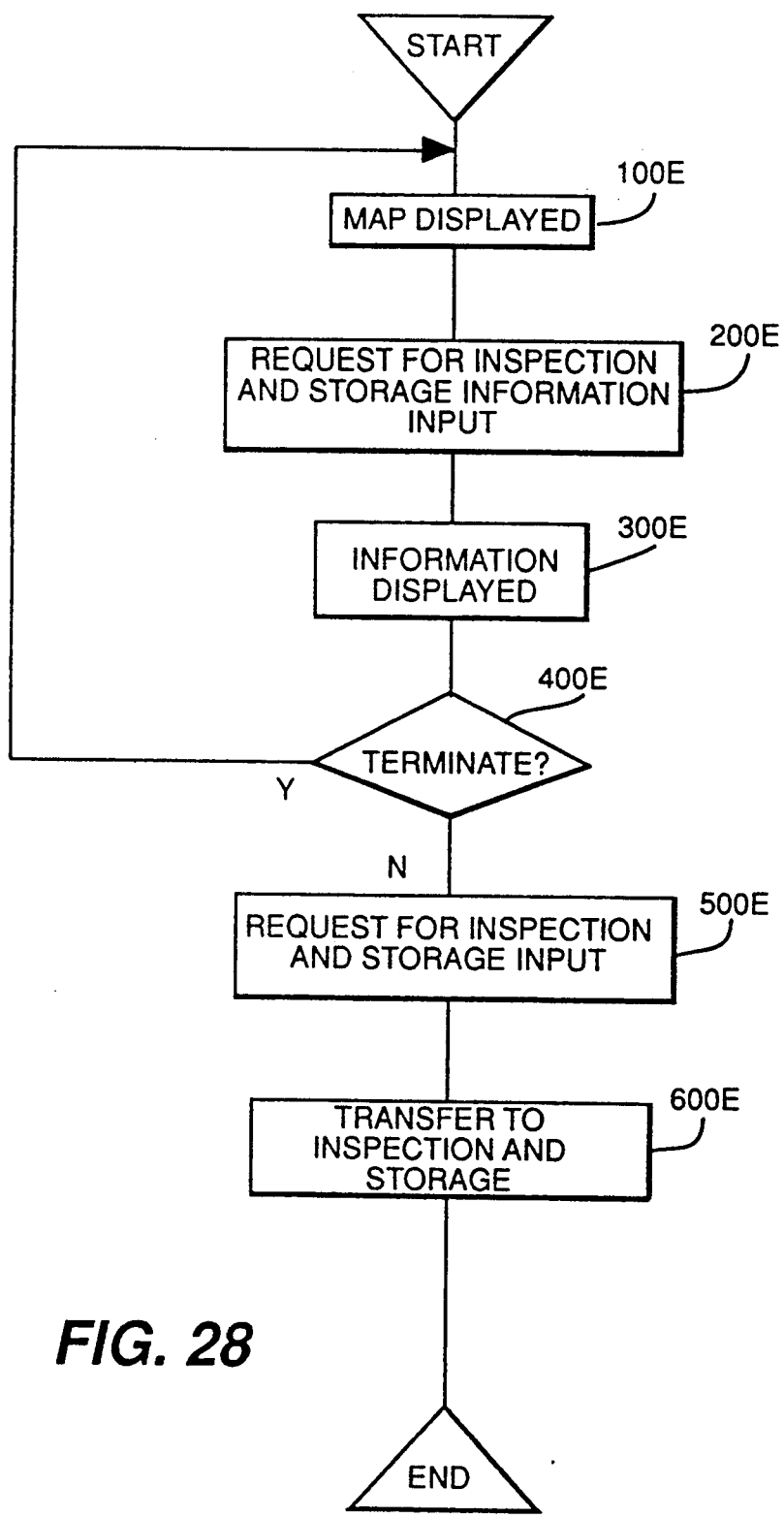
FIG. 28 is a flowchart showing the elemental operation of inspection and storage.

FIG. 28 is a flowchart showing a method for supporting an inspection and storage elemental operation. In accordance with this flowchart, the method for supporting the inspection and storage elemental operation is described.

Step 100e: As this step is the same as the step 100 in FIG. 1, the description is omitted.

Figure 29:
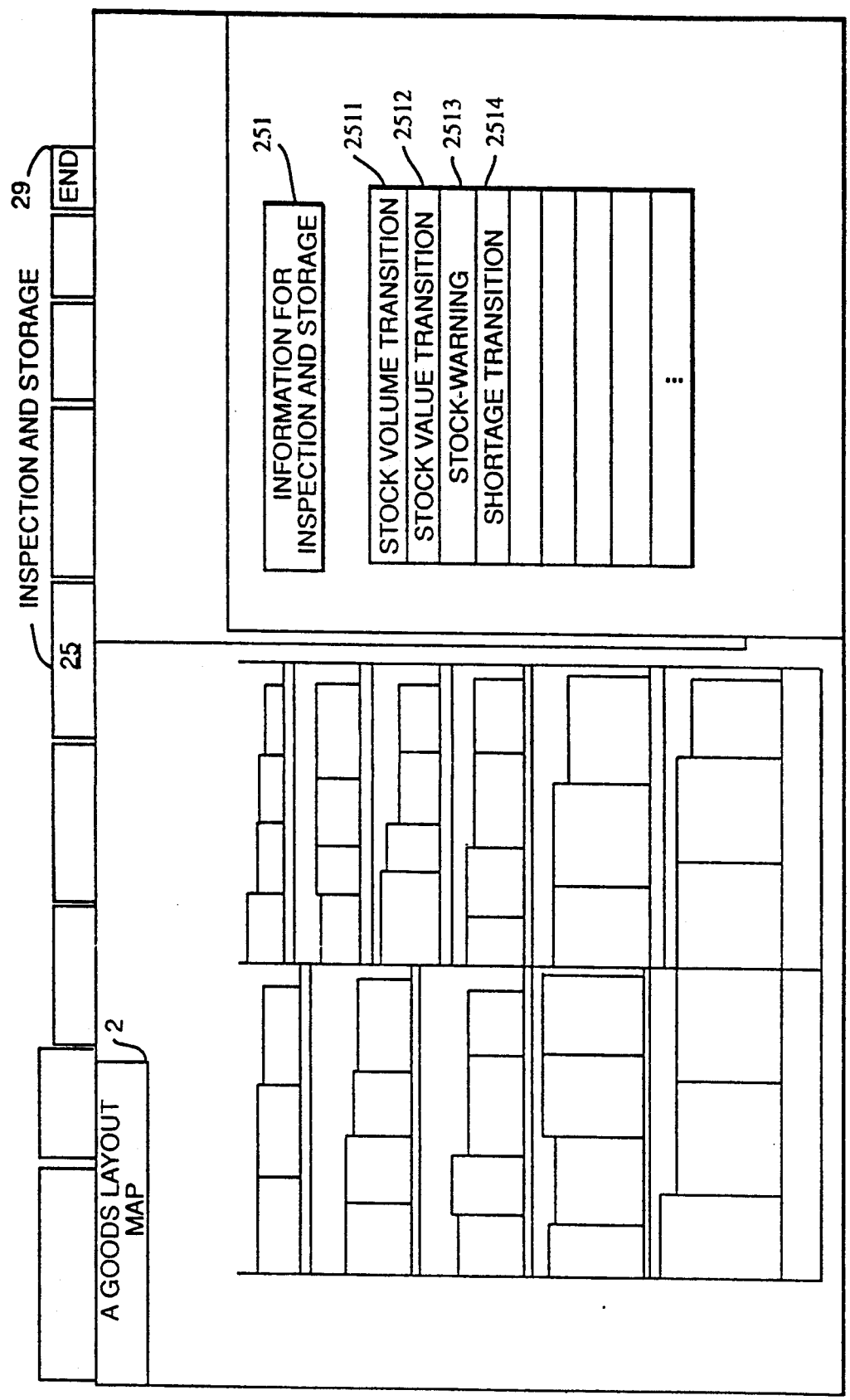
FIG. 29 is an example of the screen when the elemental operation of inspection and storage is selected by the user.

Step 200e: FIG. 29 is a resultant screen displayed when the user selects an inspection as a stage elemental operation 25. The information is displayed in the form of table as information 251 for the inspection and storage elemental operation. This table is stored in the memory 4 as a file of charter strings shown in FIG. 16.

For the items of the inspection and storage elemental operation, the information items given below are displayed: (1) a stock volumn transition showing the stock volume transition 2511 of each goods, (2) a stock value transition 2512 showing the stock value transition of each goods, (3) a stock-warning 2513 indicating the excess and deficiency of the stock volume of each goods, (4) a shortage transition 2514 showing the difference between the ordered volume and delivered volume of each goods, etc.. Using the input unit 3, the user selects desired information items. This selection is made by a menu selection method.

Figure 30:
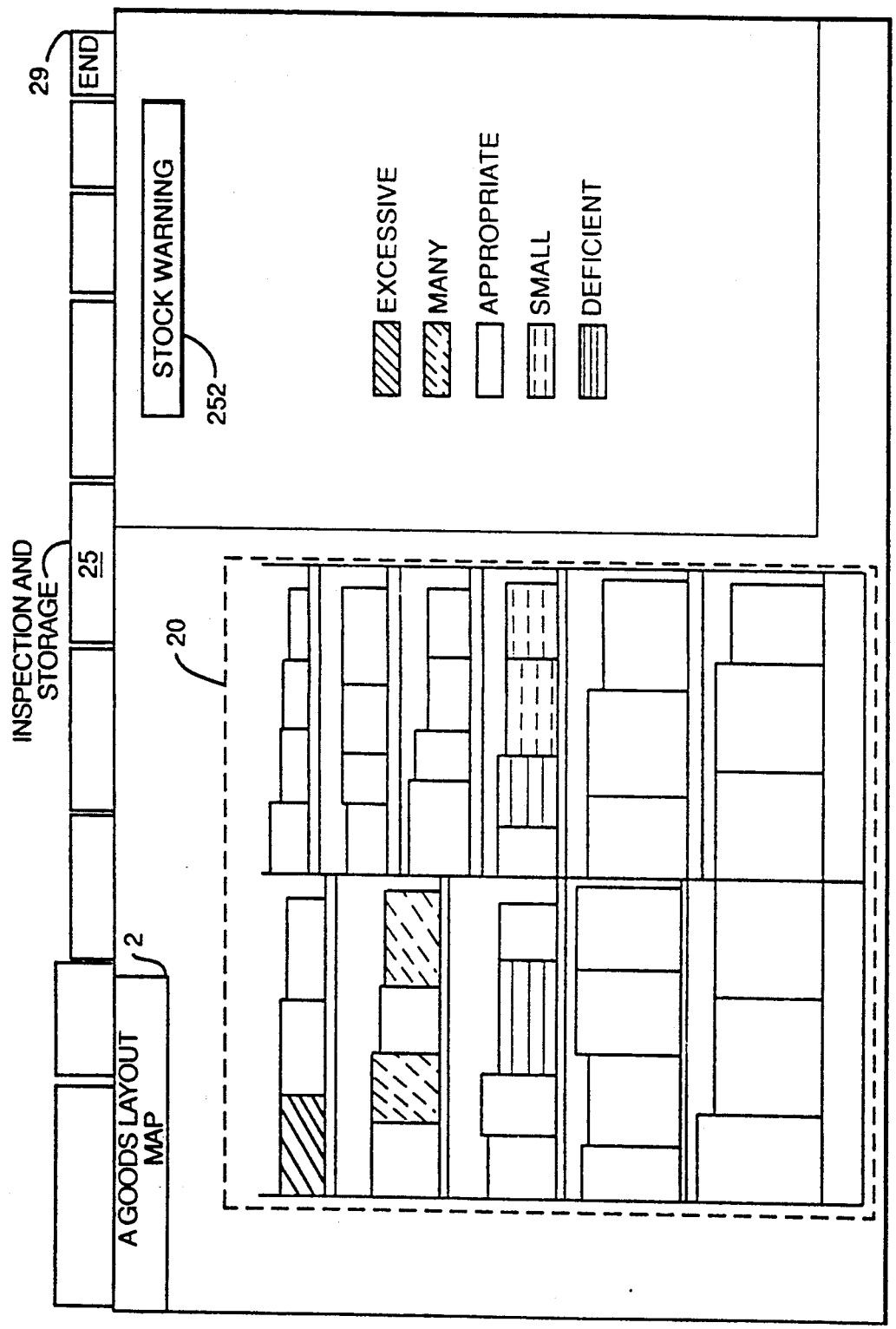
FIG. 30 is an example of the screen displaying the excess and deficiency of the stock of goods on a gondola shown on the goods layout map of a gondola for inspection and storage.

Step 300e: FIG. 30 is a screen displaying the excess and deficiency of the stock volume of a goods on a gondola shown on a goods layout map of a gondola 20 as a result of stock-warning 2513 being selected. This is not displayed in an absolute value of the goods, but by the five classifications given below, i.e., the state of excess of deficiency is displayed by the five classifications which are [excessive], [many], [appropriate], [small], and [deficient]. The relationship between the five classifications and the inscription patterns are shown in a explanatory notes displayed on the screen 252. It is desirable to show patterns in a different colors. The goods classified as [excessive] are those immediately requiring return bargain disposal, etc.. The goods classified as [deficient] are those immediately requiring a request of order or countermeasure.

Step 400e: Until the request for the inspection and storage is decided, the information analysis by the above-mentioned three steps is repeated. In this example, until a request for the inspection and storage is decided, the user repeats the information and analysis display of the stock volume transition, stock value transition, stockwarning, shortage transition, etc..

Figure 31:
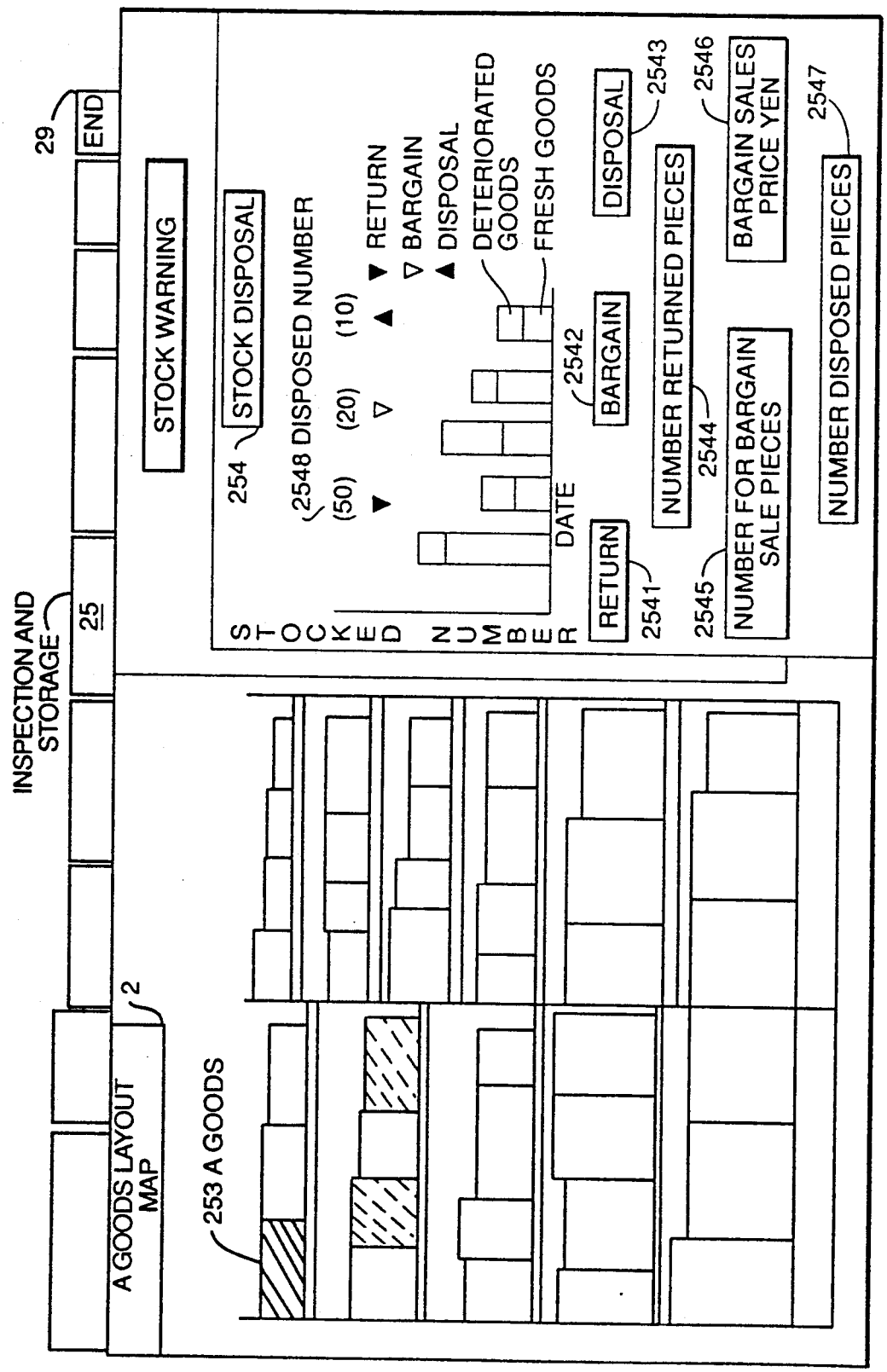
FIG. 31 is an example of the screen for the user to instruct stock disposal.

Step 500e: FIG. 31 illustrates a screen 254 for the user to instruct a stock disposal.

The stock disposal is executed by either one of the three kinds of disposal functions given below, i.e., a return 2541, a bargain sale 2542, and disposal 2543. Subsequently, an instruction method for each of the disposal functions will be described.

A return 2541 selected by the user is described. First, using the input unit 3, the user selects the result 2541 and further selects the goods to be returned 253 from a goods layout map of a gondola 20. Also, the user inputs the number of goods to be returned in the return number input column 2544. Based on the input by the user, the value of the number stocked 4524 in the stock information 45 of the goods 253 is subtracted by the number inputted by the user, and the difference thus arrived at is stored on the number stocked 4524.

A bargain sale 2542 selected by the user is described. First, using the input unit 3, the user selects the bargain sale 2542, and further selects a goods for the bargain sale 253 from a goods layout map of a gondola 20. Also, the user inputs a number of the goods for the bargain sale in the bargain sale number input column 2545 and discount price in the disposal price input column 2546. Based on the input by the user, a discount price instructed by the user is stored in the special price 4823 in the sales information 48 for the goods 253, and the bargain sale number instructed by the user is stored in the number planned for a special sale 4824. Furthermore, the mark (yes) showing that there is a special sale is given to the special sale indication 4826.

A disposal 2543 selected by the user is described. First, using the input unit 3, the user selects the disposal 2543 and further selects a goods to be disposed 253 from a goods layout map of a gondola 20. Also, the user inputs the disposal number in the disposal number input column 2547. Based on the input by the user, the value of the stocked number 4524 in the stock information 45 for the goods 253 is subtracted by the disposal number instructed by the user, and the difference thus arrived at is stored in the stocked number 4524.

Furthermore, in this system, the information given below is displayed on the output unit 2 in order to support the deciding of a goods disposition method such as return, bargain sale, and disposal. First, the goods classified as [excessive] or [many] are shown on a goods layout map of a gondola 20. It is assumed that using the input unit 3, the user selects a goods 253 from those classified as [excessive] or [many]. Based on this user's selection, the stock transition of the goods 253 is displayed on a screen 254. In the stock transition, a blank triangle represents the date of return, an inverted blank triangle represents the date of bargain sale, and a triangle in black represents the date of disposal. The disposed number of a goods 2348 by means of return, bargain sale and disposal is shown in parentheses. In the upper section of bar graph, a stocked number of a goods whose freshness is deteriorated is indicated and at the lower section, a stocked number of a goods which are extremely fresh or a goods whose freshness is less deteriorated is indicated.

Step 600e: When the request is received the request of the step 500e is transferred to the inspection and storage elemental operation of a system for supporting the inspection and storage elemental operation.

Figure 32:
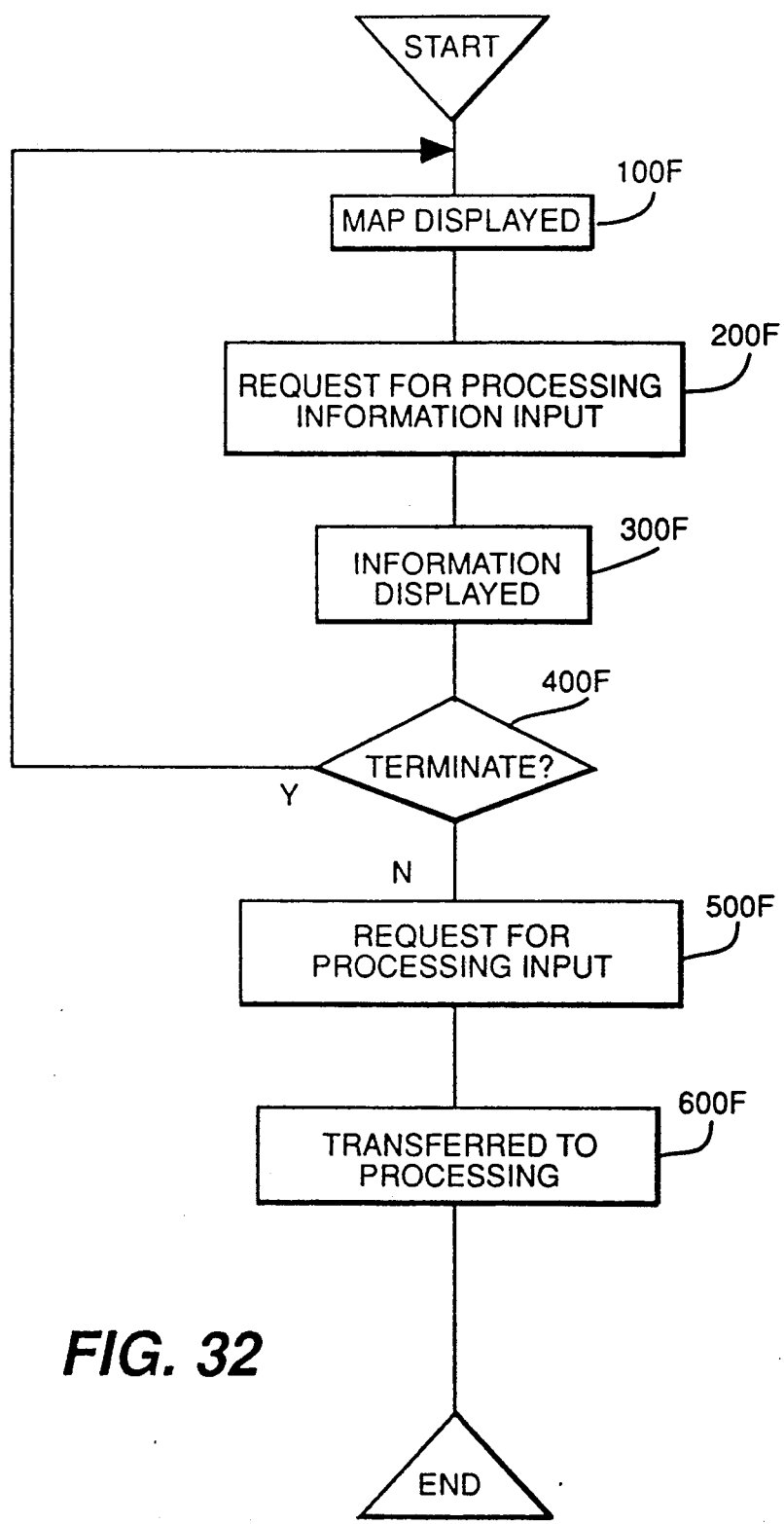
FIG. 32 is a flowchart showing an elemental operation of processing goods.

FIG. 32 is a flowchart showing a method for supporting a processing elemental operation. In accordance with this flowchart, the method for supporting the processing elemental operation will be as described.

Step 100f: As this step is the same as the step 100 in FIG. 12, the description is omitted.

Step 200f: when a processing 26 is selected by the user, a processing schedule for each goods is displayed as the information items of the processing elemental operation.

Figure 33:
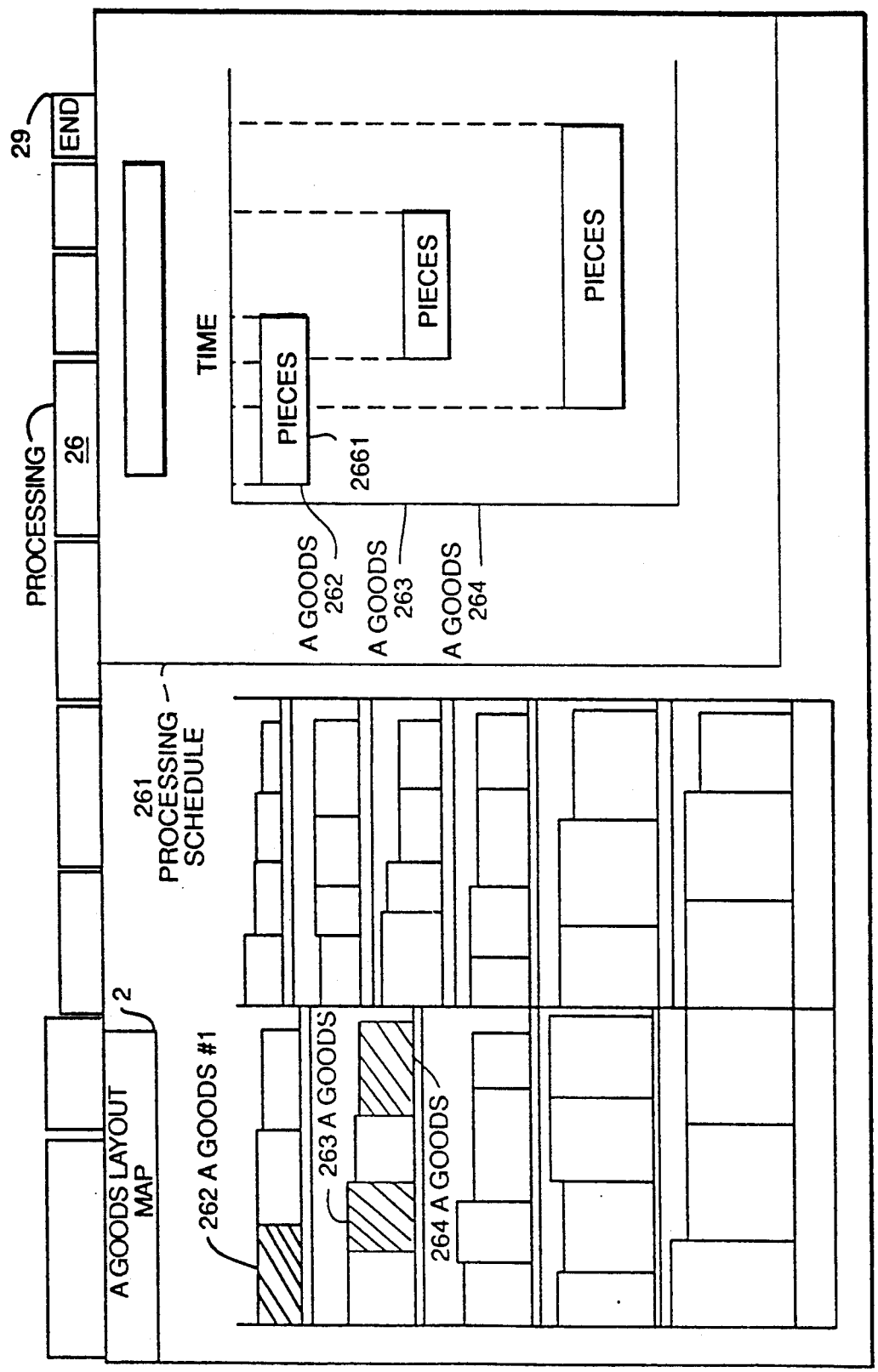
FIG. 33 is an example of the screen showing the processing schedule for the goods in accordance with the goods layout map of a gondola.

Step 300f: FIG. 33 illustrates a screen displaying a processing schedule for each goods 261 in accordance with a goods layout map of a gondola 20. In order to check the processing schedule information of the goods 262, 263, 264, the user selects the goods 262, 263 and 264 on a goods layout map of a gondola 20 by the use of the input unit 3. Based on the user's selection of the goods, this system displays the processing schedule for the selected goods on a Gantt chart as a screen 261. On the Gantt chart, the processing schedule (time) and processing volume 2661 are shown for each of the selected goods 262, 263 and 264.

Step 400f: Until a request is decided for the processing elemental operation, the user repeats the information analyses of the processing schedule of each goods.

Figure 34:
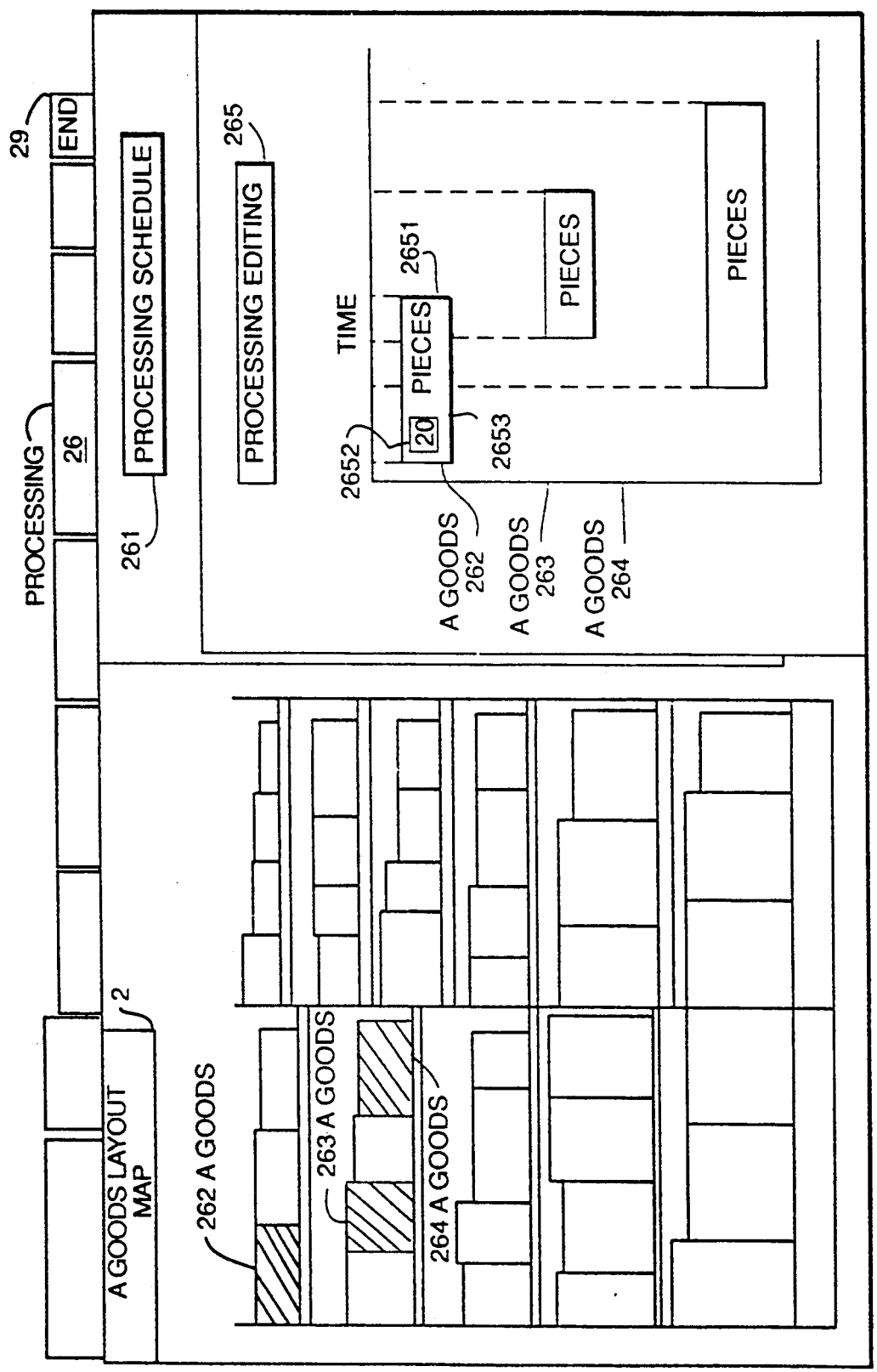
FIG. 34 is an example of the screen when a modification of the processing plan is instructed by the user.

Step 500f: FIG. 34 illustrates a screen 265 displayed when the user instructs a modification of a processing plan using the input unit 3. When displayed, this screen is overlapped with the screen 261. Using the input unit 3, the user selects the goods 262, 263 and 264 requiring the processing modification from the goods layout map of a gondola 20. Based on the user's selection, this system displays the processing schedule for the goods 262, 263 and 254 on a processing plan editing screen 265. The processing plan is edited using each of the three functions given below, i.e., the modification of a stating time, modification of an ending time and modification of processing number, respectively. Subsequently, each of the editing functions will be described.

The modification of a stating time for a goods 262 is described. Using the input unit 3, the user selects the display position 2655 of the current starting time for the goods 262, and then the user selects the position of the starting time after the modification. Based on the user's instruction for the processing starting time modification, this system rewrites the value of the processing starting time 4621 in the processing information 46 of the goods 262 to that of the starting time after modification instructed by the user. To modify the ending time for the goods 262, the elemental operation is the same as the modification of the starting time. Therefore, the description is omitted.

The modification of a processing number of a goods 262 is described. Using the input unit 3, the user selects on the screen 265 the processing number 2652 of the goods 262, and then rewrites it to the processing number after modification by the use of the input unit 3. Based on the user's instructions, this system rewrites the value of the schedules processing number 4623 in the processing information 46 of the goods 262 to that of the processing number after the modification instructed by the user.

Step 600f: The user's request received at the step 500f is transferred to the processing elemental operation or to a system for supporting the processing elemental operation.

Figure 35:
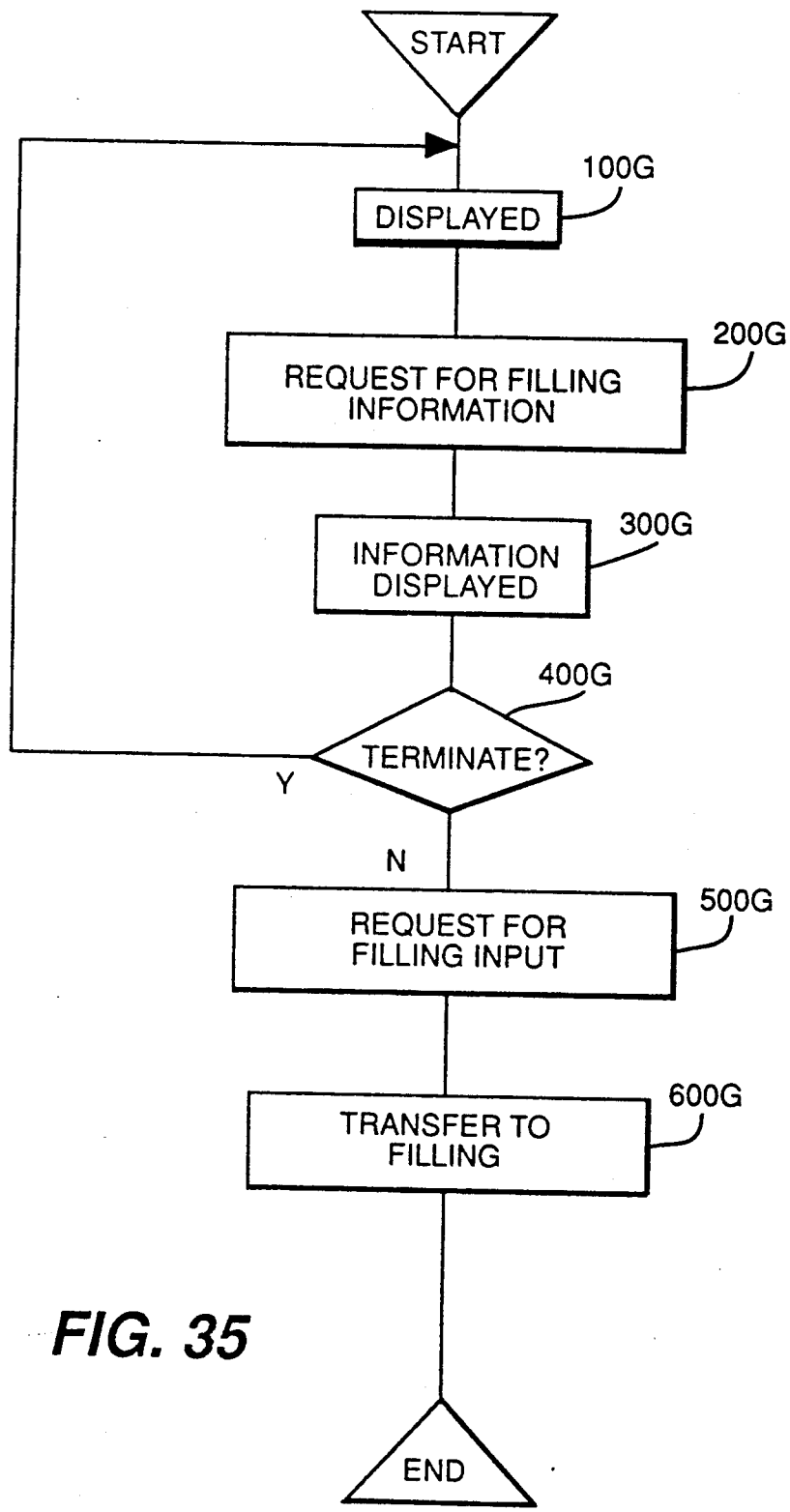
FIG. 35 is a flowchart showing the gondola filling elemental operation.

FIG. 35 is a flowchart showing a method for supporting a gondola filling elemental operation. In accordance with this flowchart, the method for supporting the gondola filling elemental operation will be described.

Step 100g: As this step is the same as the step 200 in FIG. 21, the description is omitted.

Figure 36:
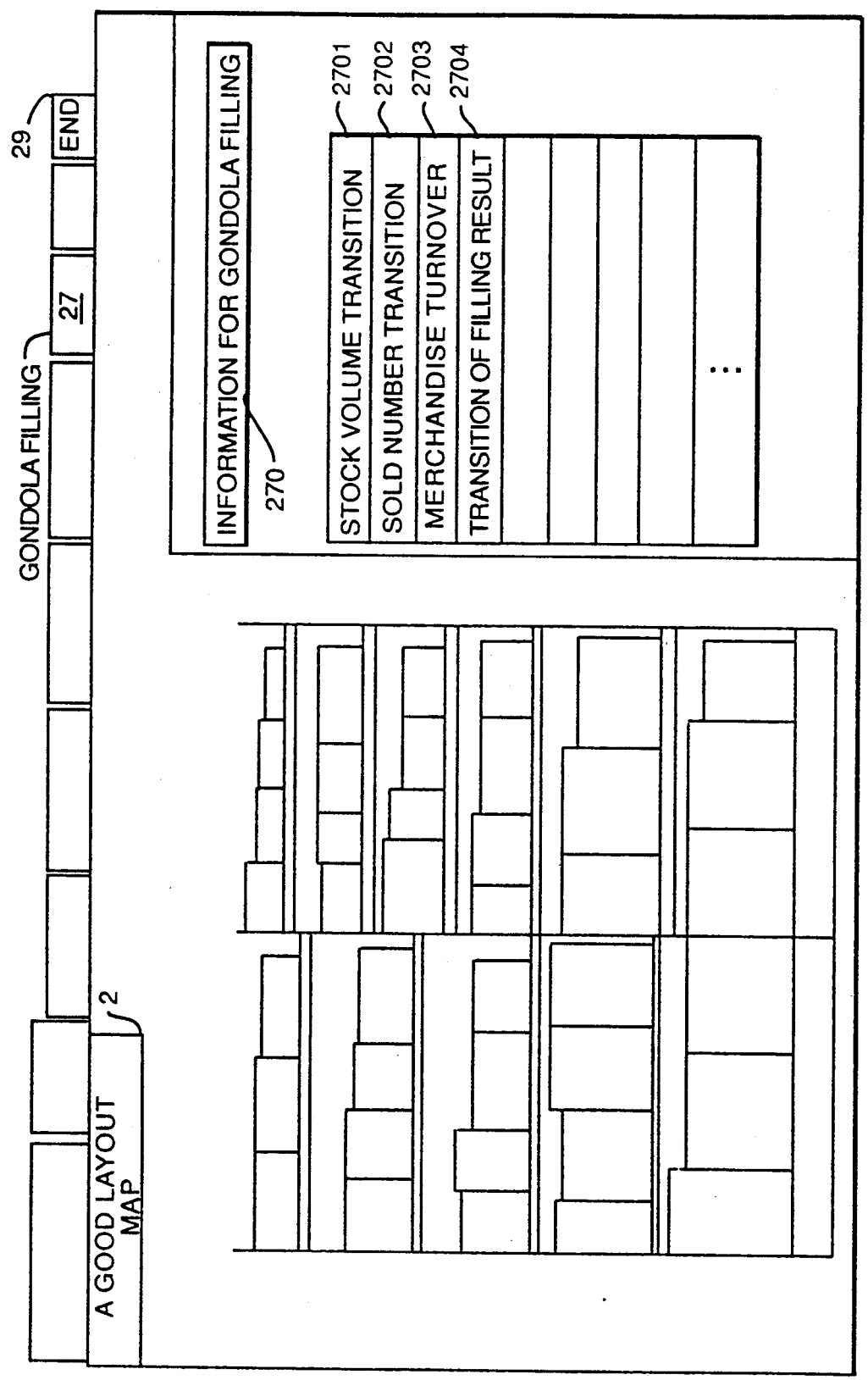
FIG. 36 is an example of the screen when the gondola filling elemental operation is selected by the user.

Step 200g: FIG. 36 illustrates a resultant screen of the user's selection of a gondola filling 27 as an elemental operation. The information for this elemental operation is displayed in the form of table of information of the gondola filing elemental operation. This table is stored in the memory 4 as a file of character strings shown in FIG. 16.

For the information items of the gondola filling elemental operation, the information items given below are displayed, i.e., (1) a stock volume transition 2701 showing the transition of the stock volume of each goods, (2) a sale number of transition 2702 showing the transition of the sale number of each goods, (3) a merchandise turnover 2703 of each goods (merchandise turnover (%)=sales volume/number arranged on a gondola ×100), (4) the transition of actual elemental operation result 2704 showing the transition of the actual result of the gondola filling for each goods, etc.. Using the input unit 3, the user selects desired items. This selection is made by a menu selection method.

Figure 37:
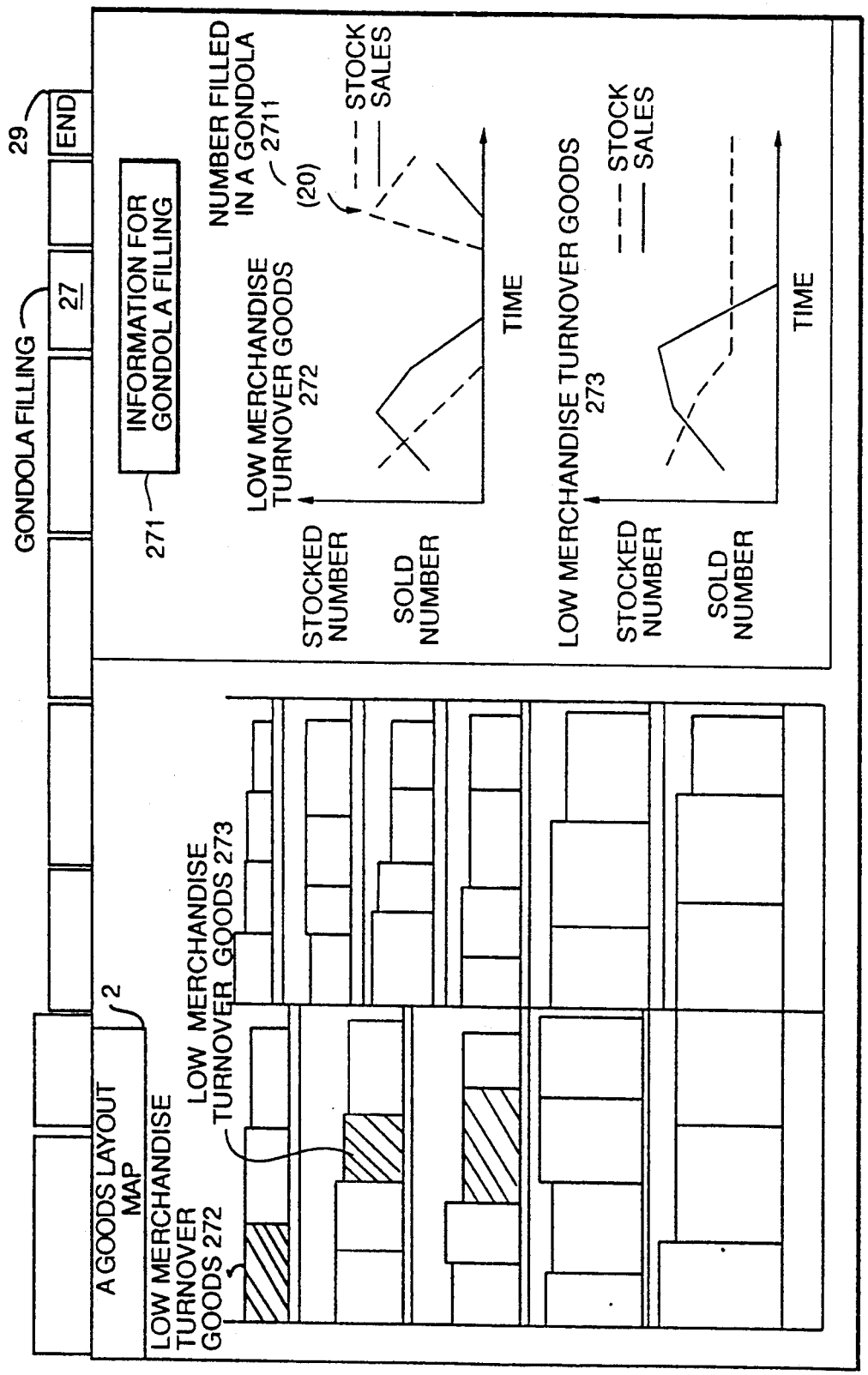
FIG. 37 is an example of the screen showing merchandise turnover with a goods layout map of a gondola.

Step 300g: FIG. 37 is a screen 271 displaying the merchandise turnover of each good with a goods layout map of a gondola 20 as a result of the user's selection of a merchandise turnover as the step 200g. A goods of a high merchandise turnover is the goods which has achieved a high sales volume by an appropriate gondola filling performed to prevent any shortage thereof. On the contrary, a goods of a low merchandise turnover is the goods which seems either to be short due to an improper gondola filling or to an unattractive display of goods. Here, therefore, only goods of a low merchandise turnover is shown on a goods layout map of a gondola 20.

The observation on the transition of actual result of elemental operation for the low merchandise turnover goods 272 and 273 by the user is described. Using the input unit 3, the user selects the low merchandise turnover goods 272 and 273 from a goods layout map of a gondola 20. Based on the user's selection, this system displays on a screen 271 the transition of the actual results of elemental operation for the goods 272 and 273 as graphs. A graph on the upper section represents the transition of the actual result of elemental operation for the goods 272, and a graph in the lower section, the transition of the actual result of elemental operation for the goods 273. A black triangle represents a time for gondola filling. The parentheses ( ) contains the number for gondola filling 2711. According to the graph in the upper section, the goods 272 is out of stock before the time of gondola filling, and it is readily seen that this goods becomes short and unavailable. According to the graph in the lower section, it is readily seen that the goods 273 is not attractive, and for that matter, its sold number is not increased. Therefore, it is necessary to correct the gondola filling elemental operation for the goods 272 while a stock disposition measure should be taken for the goods 273.

Step 400g: Until a request for a gondola filling is decided, the information analysis by the above-mentioned three steps is repeated. In this example, until the request for the gondola filling is decided, the user repeats the information analysis display of the transition of stock number, transition of sold number, merchandise turnover, transition of actual results of elemental operation, etc..

Figure 38:
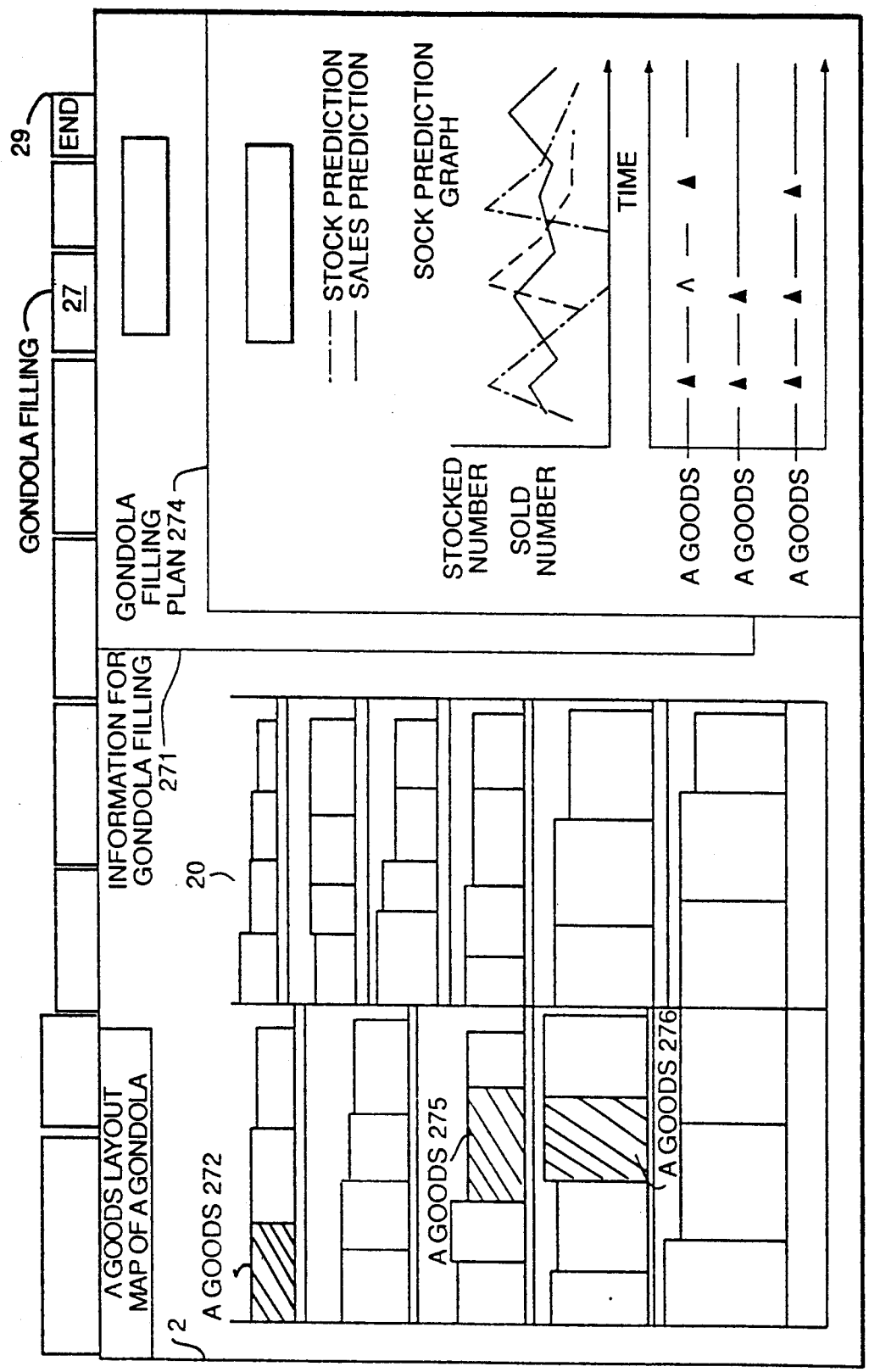
FIG. 38 is an example of the screen when a rearrangement of the gondola filling elemental operation plan is instructed by the user.

Step 500g: FIG. 38 illustrates a screen 274 displayed when the user instructs an edit of a gondola filling plan. The user edits the gondola filling elemental operation on a goods layout map of a gondola 20. Using the input unit 3, the user selects from the goods layout map of a gondola 20 the goods 272, 275 and 276 for which the gondola filling operations should be modified. Based on the user's instruction, this system displays on the screen 274 the gondola filling schedule for the goods 272, 275 and 276. The gondola filling schedule is edited by the use of a function for the gondola filling starting time modification. Subsequently, an editing method will be described.

A modification of a gondola filling starting time for a goods 272 is described. Using the input unit 3, the user instructs the position 277 of the current starting time, and then, instructs the position of the starting time after the modification. This system rewrites the values of a day 4721, hour 4722 and minute 4723 of a gondola filling plan and result 472 in the gondola filling information 47 for the goods 272 to those of the time after modification instructed by the user.

Furthermore, this system displays on the screen 274 the predicted values of the stocked number and sold number of a goods in order to support deciding on the gondola filling starting time. Then, in accordance with the modified starting time, the predicted value of the stocked number is modified at all times. For example, if the user is assumed to have modified a gondola filling starting time 277 to a time t, then this system shifts the predicted value of the stocked number indicated by a dashed graph to the broken line graph. With this it is possible to make a gondola filling elemental operation without a shortage.

Step 600g. The user's request received at the step 500g is transferred to a gondola filling elemental operation of a system for supporting the gondola filling elemental operation.

Figure 39:
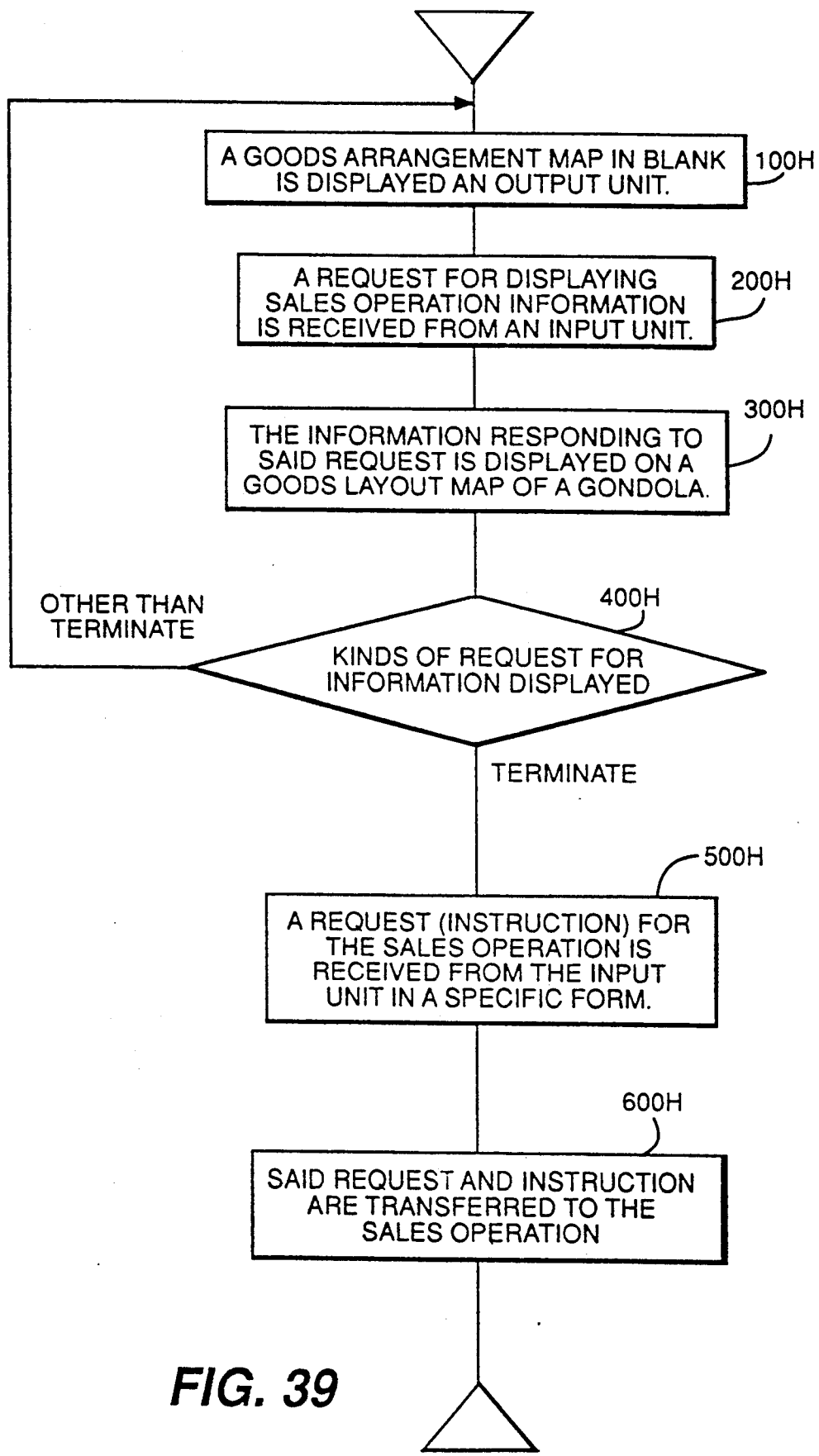
FIG. 39 is a flowchart for the sales elemental operation.

FIG. 39 is a flowchart showing a method for supporting a sales elemental operation. In accordance with this flowchart, the method for supporting the sales elemental operation will be described.

Step 100h: As this step is the same as the step 100 in FIG. 1, the description is omitted.

Figure 40:
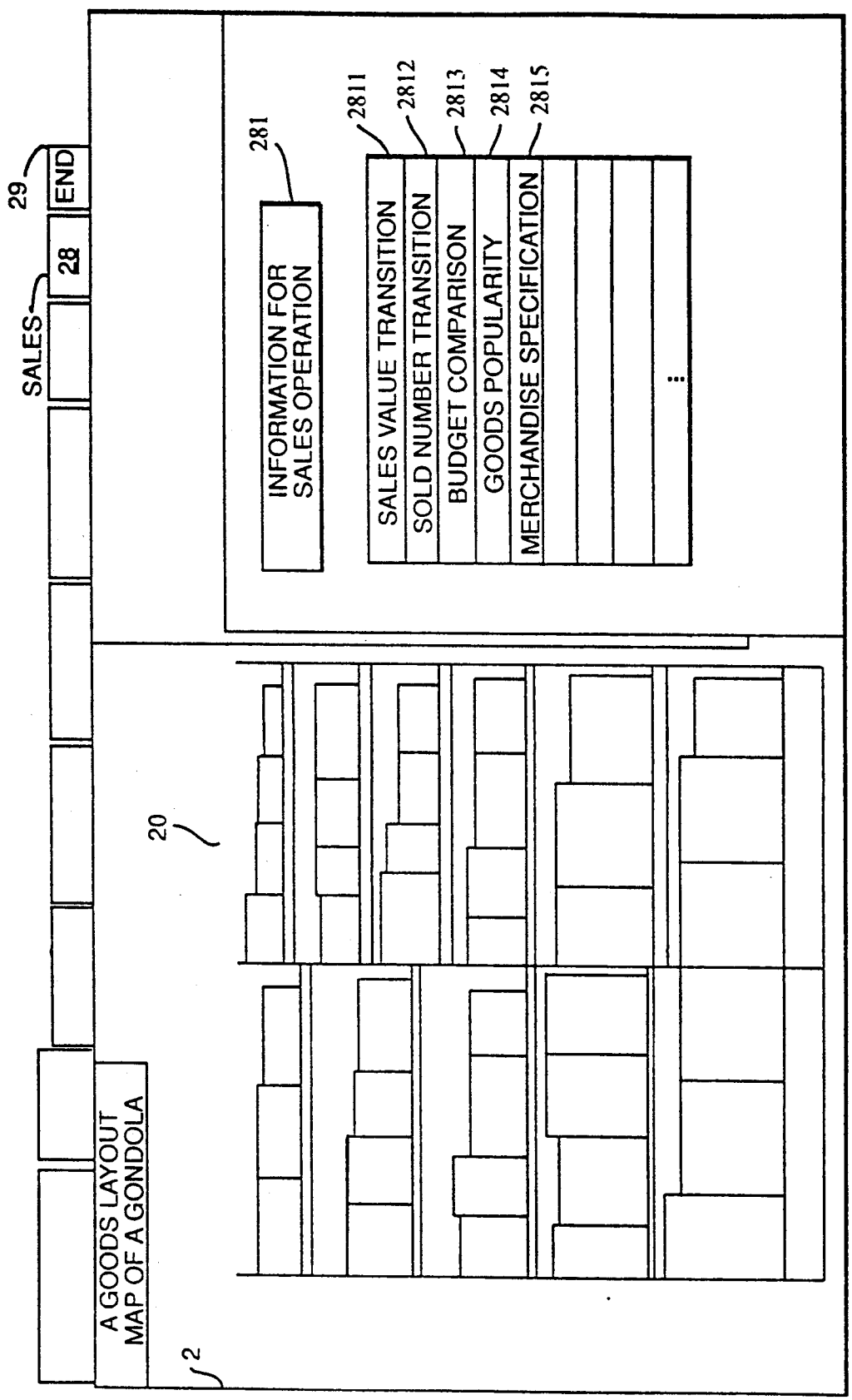
FIG. 40 is an example of the screen when the sales elemental operation is selected by the user.

Step 200h: FIG. 40 illustrates a screen displayed when the user selects a sales 28. The information for this elemental operation is displayed in the form of a table for information 281 for the sales elemental operation. This table is stored in the memory 4 as a file of character strings shown in FIG. 16.

For the information items of the sales elemental operation, the information items given below are displayed, i.e., (1) a sales value transition 2811 showing the transition of the sales value for each goods, (2) a sales volume transition 2812 showing the transition of the sold number of each goods, (3) a budget comparison 2813 showing the achievement state of a sales plan, (4) a goods popularity 2814 of each goods, (5) a merchandise specification 2815 showing the characteristic information of each goods, etc.. Using the input unit 3, the user selects the desired items. This selection is made by a menu selection method.

Figure 41:
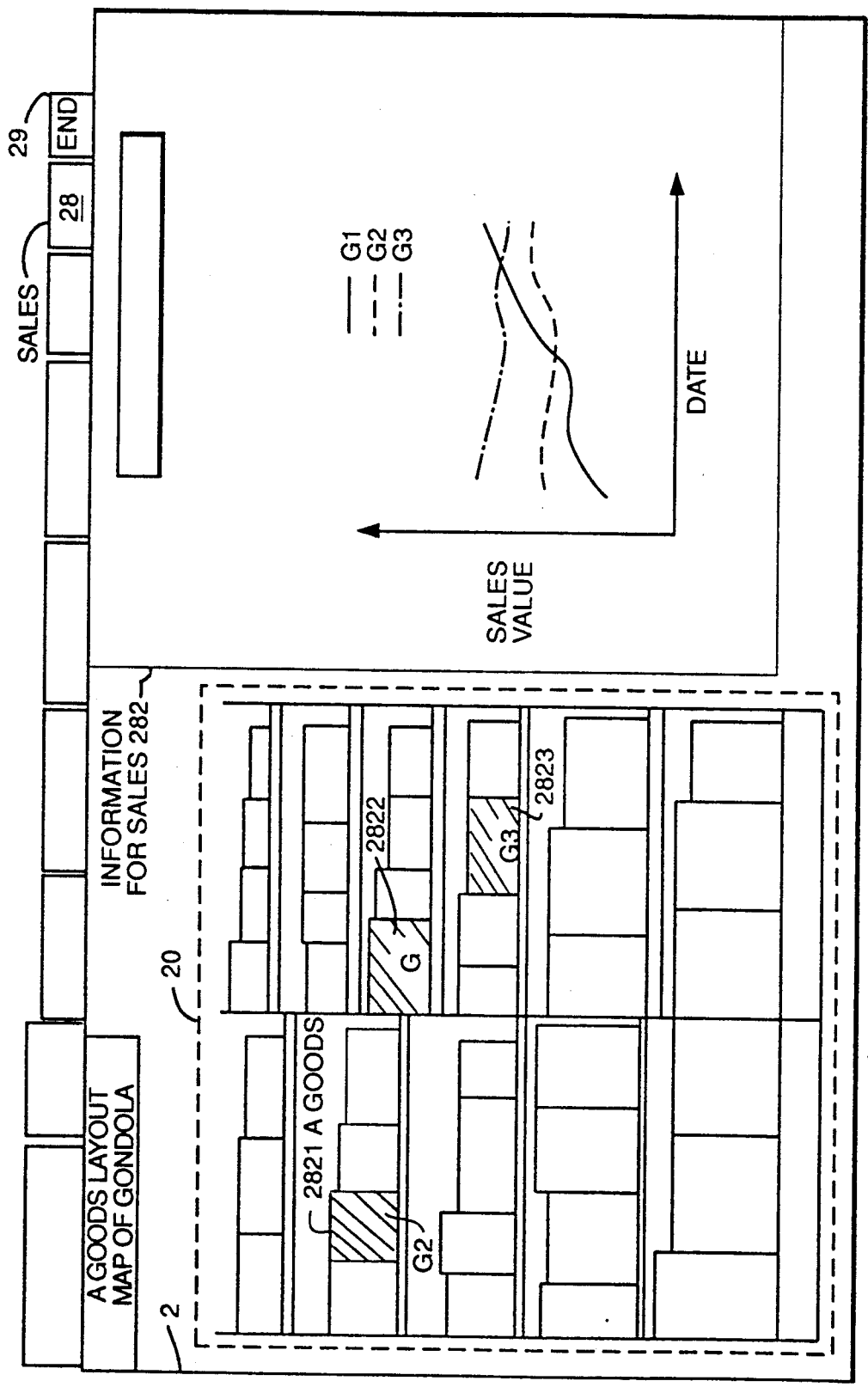
FIG. 41 is an example of the screen displaying the goods popularity shown on the goods layout map of a gondola.

Step 300h: FIG. 41 illustrates a screen displaying the goods popularity of each goods on a goods layout map of a gondola 20 as a result of the user's selection of the goods popularity 2814 at the step 200h. When the sales value transition for each goods 2821, 2822 and 2823 is observed, the user selects these goods from the goods layout map of a gondola 20 by the use of the input unit 3. This system displays the sales value transition of these goods 2821, 2822 and 2823 on the screen as graphs.

Step 400h: Until a request for the sales elemental operation is decided, the information analysis by the above-mentioned three steps is repeated. In this example, until the request is decided, the user repeats the information analysis display of the sales value transition, sold number transition, budget comparison, goods popularity, merchandise specification, etc..

Figure 42:
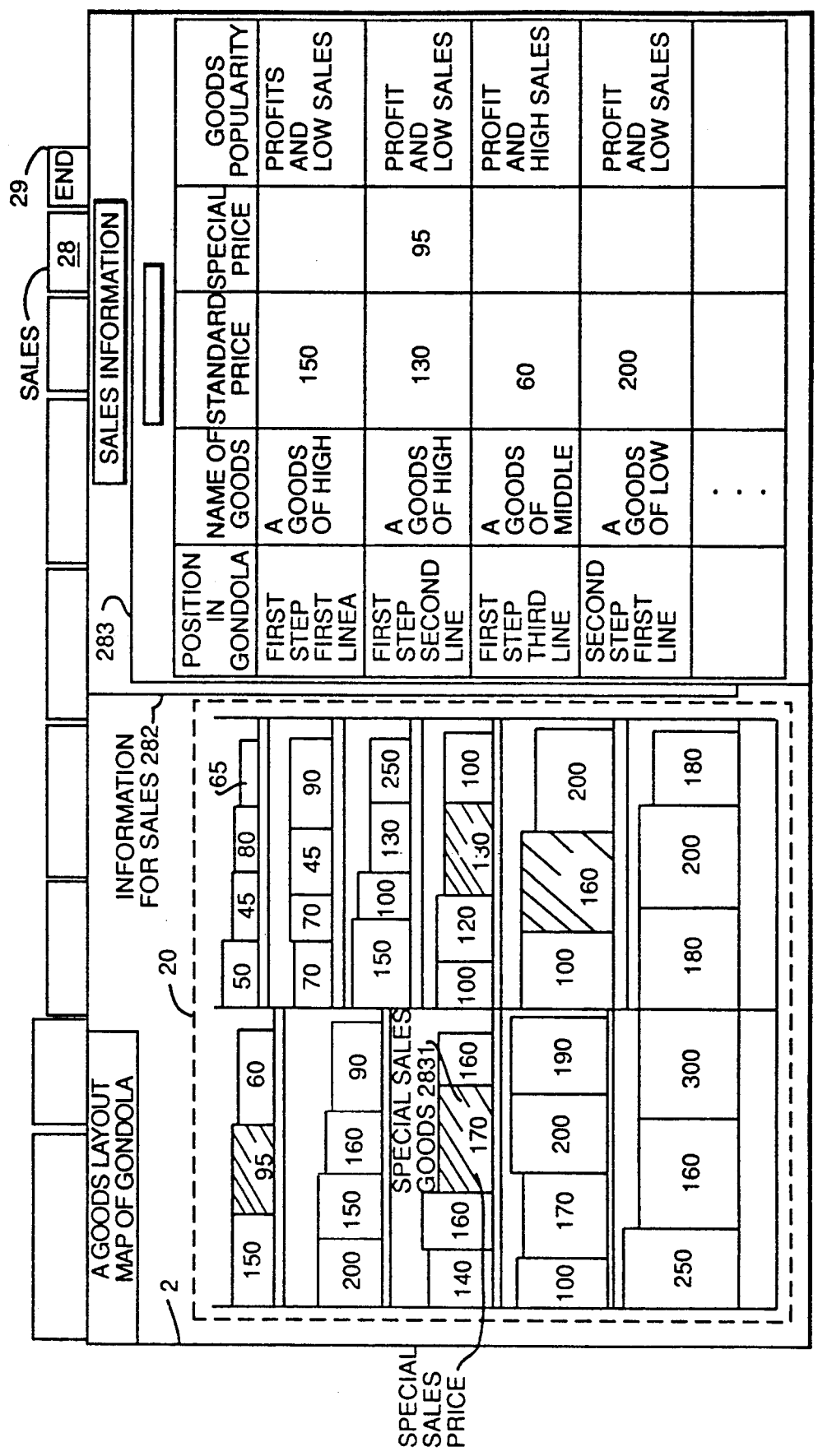
FIG. 42 is an example of the screen when a rearrangement of the sales plan as instructed by the user.

Step 500h: FIG. 42 illustrates a screen 283 displayed when the user instructs the edit of a sales plan by the use of the input unit 3. The user edits the sales plan on a goods layout map of a gondola 20. Subsequently, an editing method will be described. First, this system displays on the goods layout map of a gondola 20 the sales price of each goods in the sales and actual result information 48 (for a special sale goods, a special sale price 4823 is displayed, and for the other goods, standard sales prices 4822 is displayed). Furthermore, the special sale goods are displayed in a manner different from the others. It is desirable to show them with a pattern or in different color, for example. The sales plan is edited by the two functions given below, i.e., the establishment and modification of a special sale goods, and the modification of the sales price. The user edits the sales plan on a goods layout map of a gondola 20. Subsequently, a request method will be described for each editing function.

The establishment and modification of a special sale goods are described. Using the input unit 3, the user selects from a goods layout map of a gondola 20 a goods 2831 which should be sold as a new special sale goods. Based on the user's selection, this system rewrites the indication of a special sale 4826 as [yes] in the sales plan and actual result 482 in the sales information 48 of the goods 2831.

The modification of sales price is described. Using the input unit 3, the user inputs the special sales price 2832 for the goods 2831. This system writes the special sales price 2832 inputted by the user in a special sales price 3823 in the sales information 48.

Furthermore, this system displays on the screen, 283 a table comprising the goods layout position, name, standard price, special price for special sale, a goods popularity of each goods in order to support editing a sales plan. These contents of the tables are modified as the sales plan is edited.

Step 600h: The user's request received at the step 500h is transferred to the sales elemental operation of a system for supporting the sales elemental operation.

As the above describes, the merchandising cycle comprising the elemental operations of goods assortment, goods layout, ordering, delivering, inspection and storage, processing, gondola filling and sales that can be integrally managed with a goods layout map of a gondola 20 as an overall common interface between the system and the user according to this embodiment.

Figure 43:
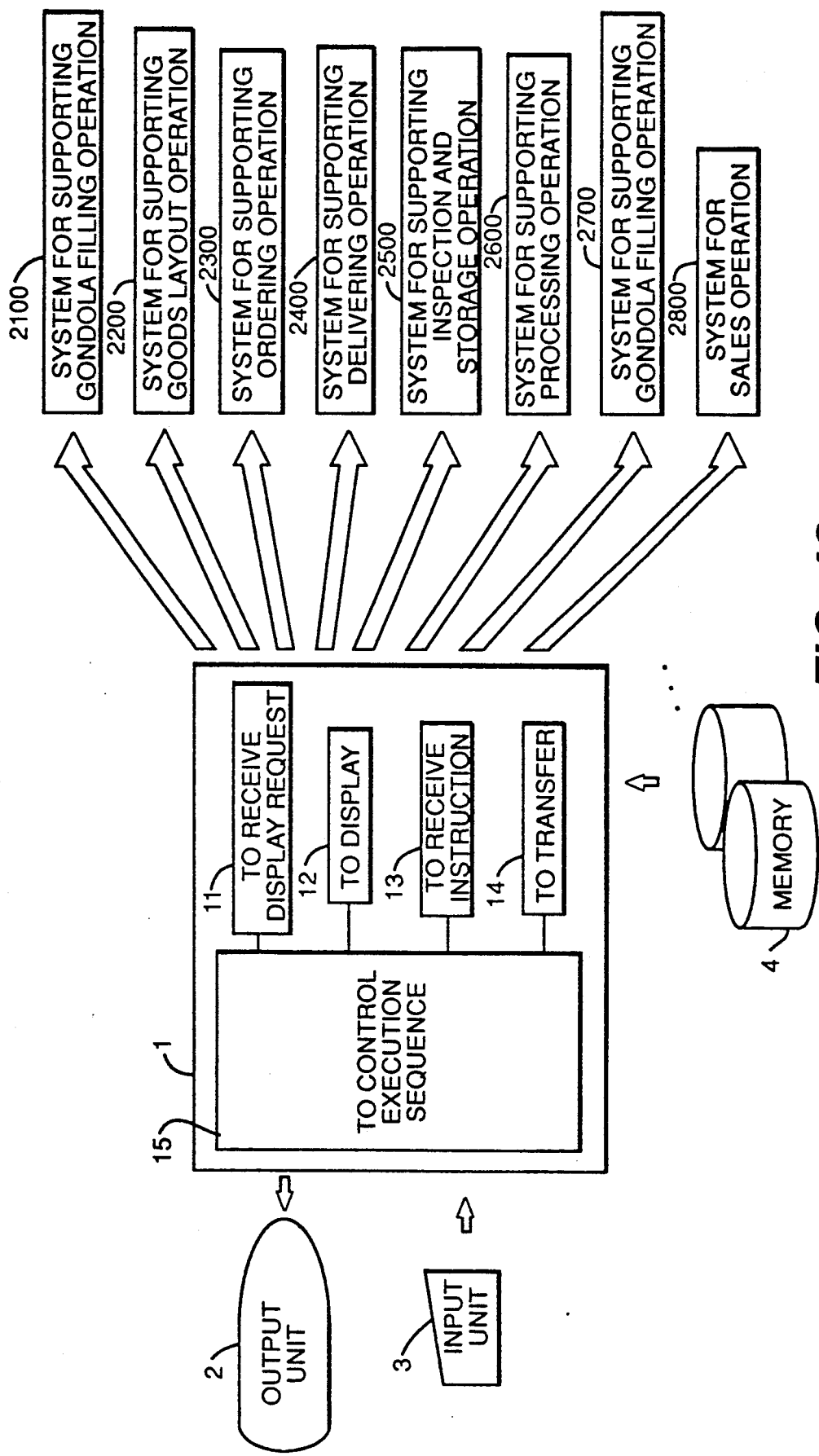
FIG. 43 illustrates the system for merchandise management and the respective systems for each elemental operation.

FIG. 43 illustrates the overall structure showing the relationship between a system and a system for merchandising management elemental operation and a system for supporting each of the operations which construct a merchandise management according to the present invention. As shown in each figure, the system for supporting each of the operations which construct a merchandise management is a system for supporting a goods assortment planning elemental operation 2100, system for supporting a goods layout planning elemental operation 2200, system for supporting an ordering elemental operation 2300, system for supporting a delivering elemental operation 2400, system for supporting an inspection and storage elemental operation 2500, system for supporting a processing elemental operation 2600, system for supporting a gondola filling elemental operation 2700, and system for supporting a sales elemental operation 2800. The functions and operations of these operation supporting systems are referred to in many references. Thus the descriptions are omitted. In this regard, the disclosure of U.S. Pat. No. 4,947,322 is incorporated herein by reference.

Figure 44:
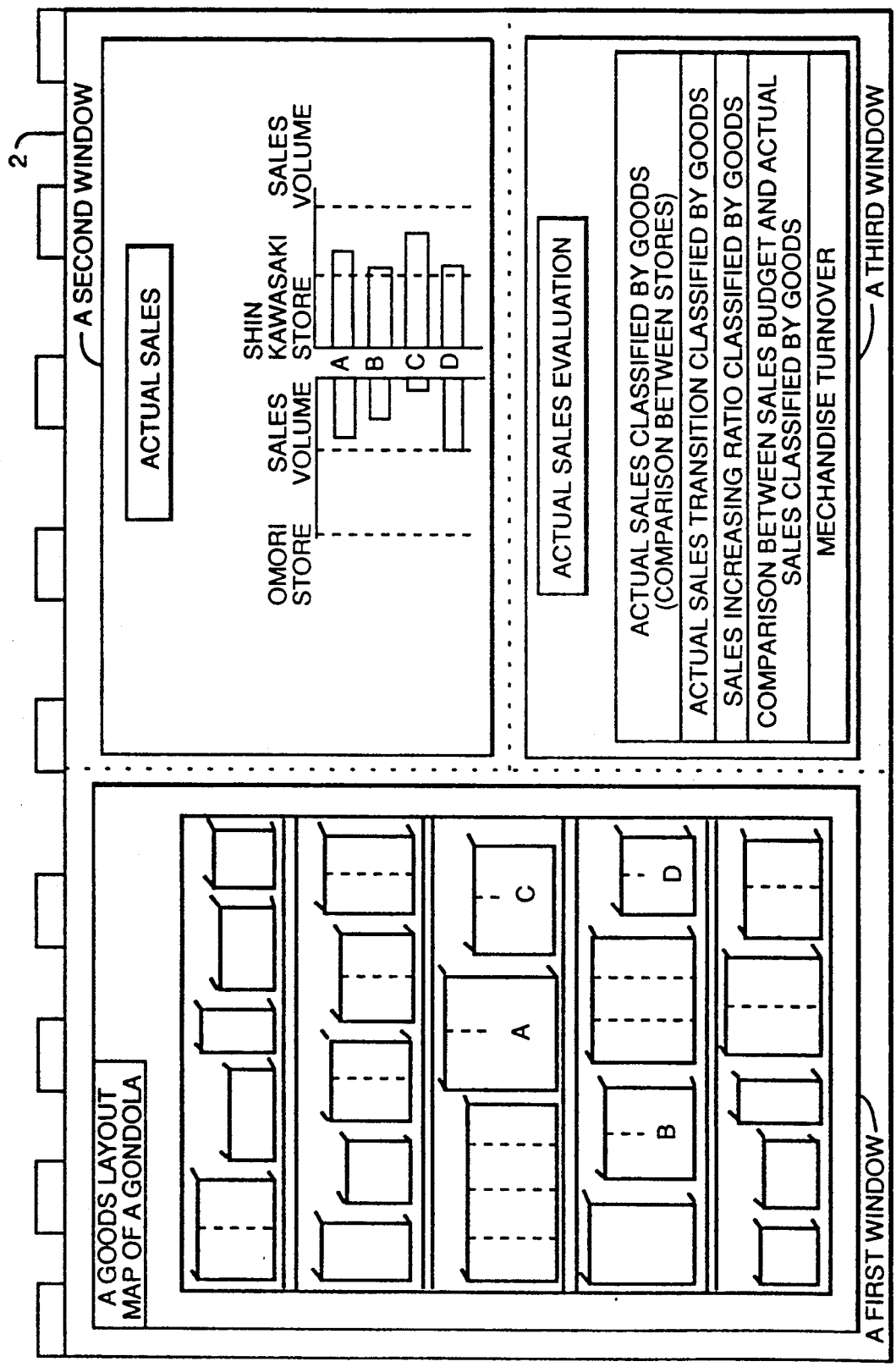
FIG. 44 is an example of the screen showing multi-window displaying of a variety of information required for the merchandise management.

It is possible to further improve the user's elemental operation by making the display screen output in the output unit 2 -of the embodiment mentioned above a display screen, as shown in FIG. 44, which comprises a first window outputting a goods layout map of a gondola thereby showing information required for the merchandise management elemental operation, a second window outputting the information which the user finds more conveniently is displayed in a form other than the goods layout map of a gondola, and a third window outputting each of the elemental operations constructing the merchandise management with the names of the information systems for supporting the operations which construct the merchandise management.

In the embodiment mentioned above, the description is made with a man-machine interface as its center. In order to support a merchandise management operation by the above-mentioned embodiment, it is necessary to acquire the information of the goods sold at a store, the information of the gondola required for a layout of such goods, and the information of the customers who purchase such goods. Subsequently, an embodiment of a method for collecting and managing those pieces of information, i.e., the merchandise information, gondola information, customer information, will be described.

Figure 45:
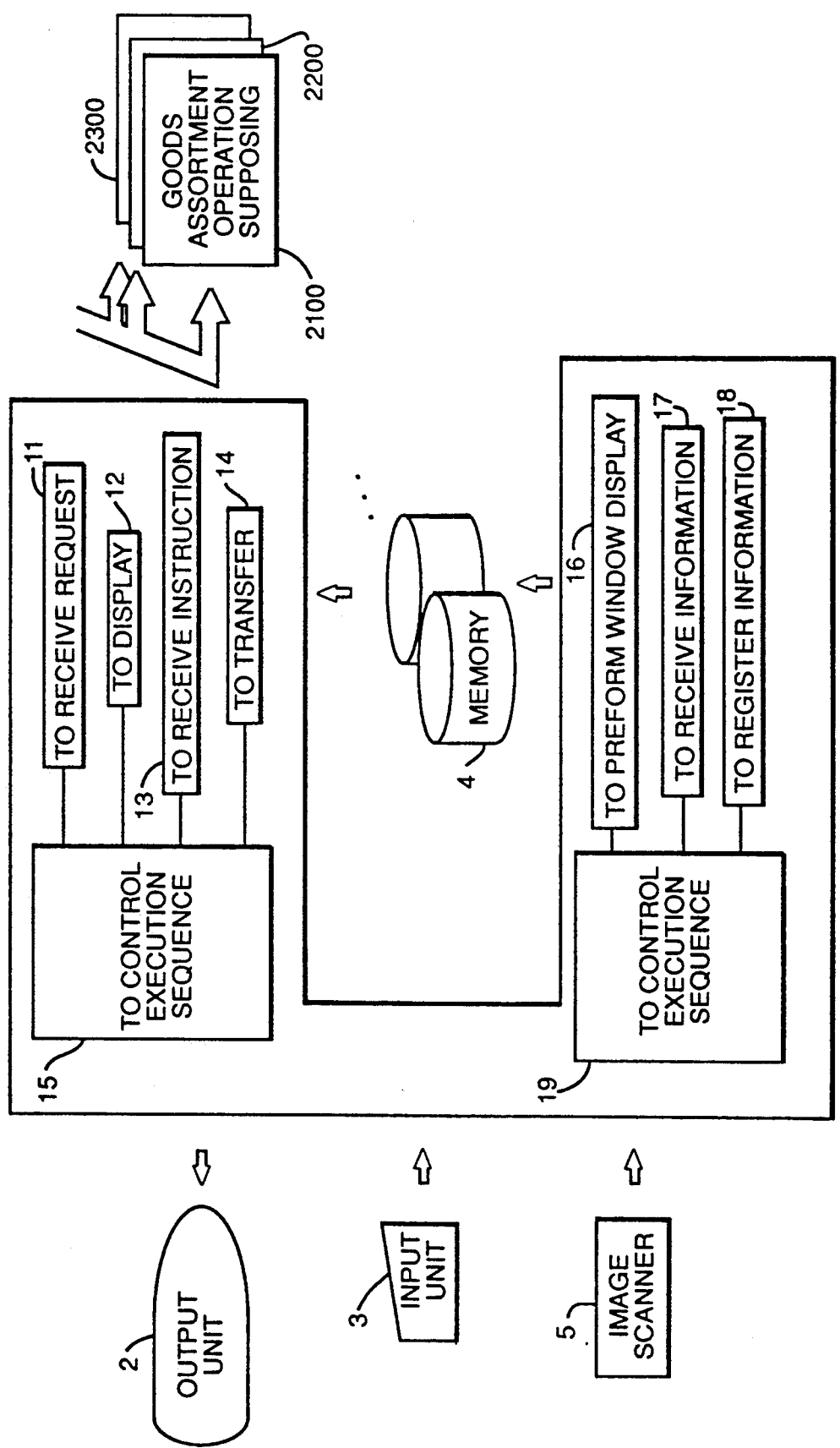
FIG. 45 illustrates the structure of a system for merchandise management with a function for collecting the merchandise information, gondola information, and customer information.

FIG. 45 illustrates the configuration of a system for supporting a merchandise management operation according to the present invention comprising a mechanism for collecting the merchandise information, gondola information, and customer information. With reference to this drawing, the system configuration for collecting the merchandise information, gondola information, and customer information will be described.

This system comprises an image input unit 5, such as an image scanner, video terminal, etc. in addition to a computer 1, an output unit 2, input unit 3, memory 4, and each of the systems for supporting operations which construct a merchandise management 2100, 2200, 2300... described above.

In the above-mentioned embodiment, it is described that the computer 1 comprises the five functions for supporting merchandise management operation, i.e., a function 11 to receive a request for the information display, a function 12 to display the information for the request received on a goods layout map of a gondola, a function 13 to receive a request for each elemental operation or system for supporting the elemental operation which constructs a merchandise management, a function 14 to transfer the request received to the corresponding elemental operation or a system for supporting the elemental operation, and a function 15 to control the execution sequence of these four functions. The computer 1 comprises the four functions given below for collecting the merchandise information, gondola information and customer information in addition to said five functions. First is window display function 16 to display on the output unit 2 a receiving screen for receiving each of the merchandise information, gondola information and customer information. Second is an information receiving function 17 to receive each information. Each information is inputted by the input unit 3 or image input unit 5. Third is an information registering function 18 to store each information received in the execution sequence of these four functions. Each function is performed by a program executed by the computer 1. The details of each function and elemental operation will be described later.

The output unit 2 displays on a screen the information output by the computer 1. On the screen, there are a screen to show the merchandise information, a screen to show the gondola information, and a screen to show the customer information. Each of the screens will be described when said function and operational flow are explained.

The input unit 3 is a keyboard, mouse, etc.

The memory 4 stores various kinds of information required for the merchandise management operation. The information handled by the memory 4 has been described in the above-mentioned embodiment, thus the description is omitted.

The image input unit 5 inputs the pictorial information for each of the merchandise, gondola and customer information.

Sequentially, an information collection and management method by utilizing these units and functions will be described.

Figure 46:
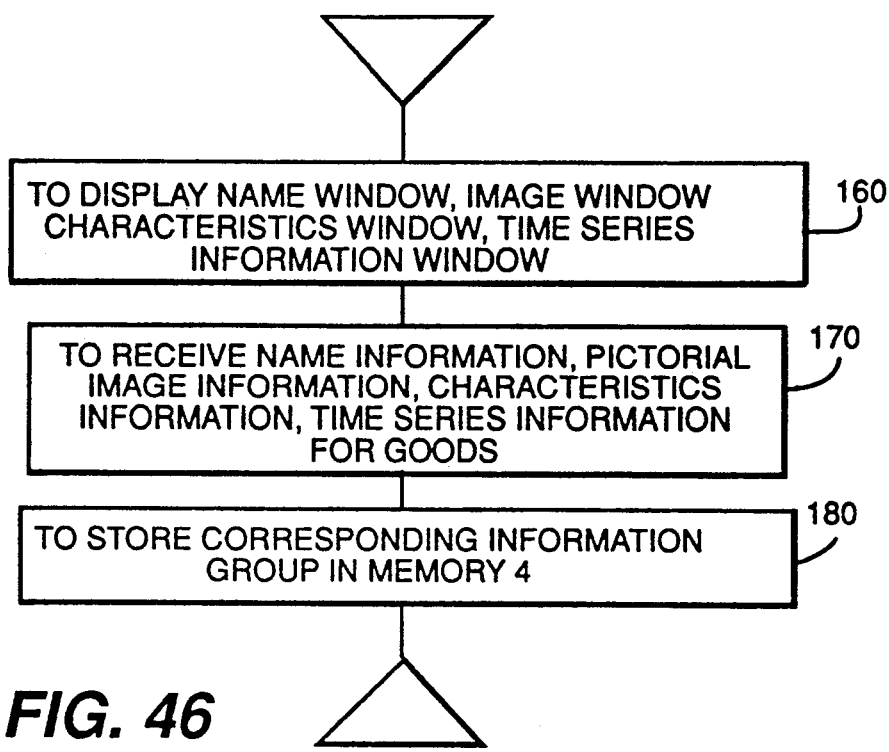
FIG. 46 is a flowchart showing the collection and arrangement of the merchandise information.

FIG. 46 is a flowchart showing a method for collecting and managing the merchandise information. In accordance with this flowchart, the system for collecting and managing the merchandise information will be described.

Figure 47:
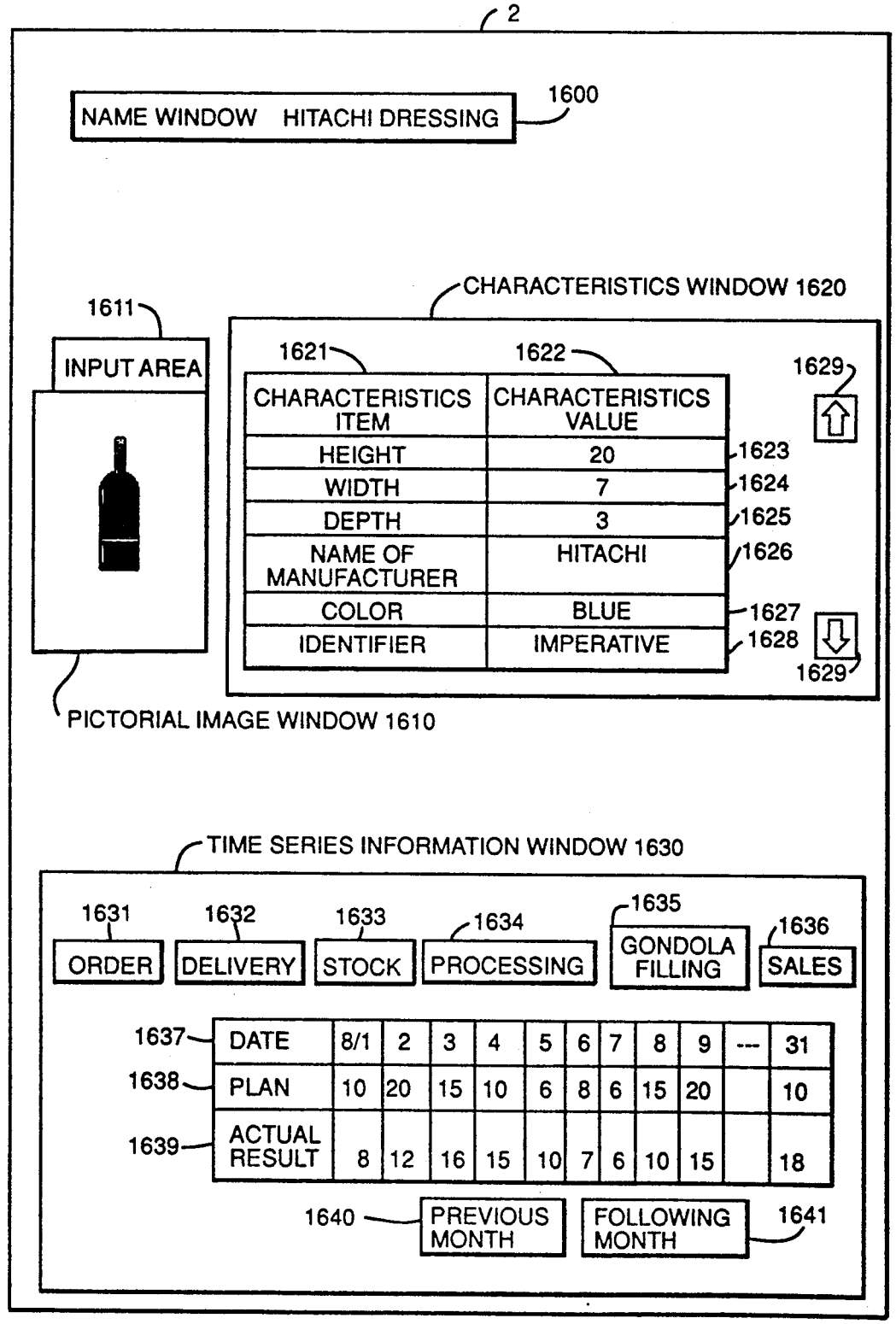
FIG. 47 is an example of the screen showing multi-window displaying of a variety of information required for the collection and management of the merchandise information.

Step 160: As shown in FIG. 47, four kinds of windows are displayed in the output unit 2. First is a name window 1600 to receive the name information of a goods. Second is an image window 1610 to receive a pictorial image information of the corresponding goods. Here the pictorial image information means a pictorial image information of the package of goods. Third is a characteristics window 1620 to show the characteristics information of the corresponding goods. The characteristics information means the height, width and depth dimensions, and the name of manufacturer, color and identifier for goods layout on each gondola. Fourth is a time series information window to receive the time series information of the corresponding goods. The time series information means the history of sold number, history of stocked number and history of ordered number of the corresponding goods.

Subsequently, using an output example shown in FIG. 47, the structure of each window will be described.

The name window 1600 displays its output at a position on the upper left side of the output screen of the output unit 2.

The image window 1610 displays its output below an output of the name window. An output 1611 is an area for the user to instruct the image input unit 5 to start its actuation.

The characteristics window 1620 displays its output on the right side of the image window. Window 1620 displays a table comprising the two columns given below. First is the characteristics item column 1621 to output the kind of items for the information to be collected. Second is the characteristics value column 1622 to receive the characteristics value of each information item. The items of information to be collected include the height of a goods 1623, width of the goods 1624, depth of the goods 1625, the name of manufacturer 1626, the color of the goods 1627, an identifier 1628, etc. In the output example shown in FIG. 47, eight kinds of the characteristics item are output. However, the characteristics of a goods are not mentioned above. There are many more characteristics attached to a goods, such as taste, objective customer, etc. Hence an area 1629 is displayed to enable the user to instruct a scrolling in the direction of the column in the table. An upward arrow is an area for the user to instruct the upward scroll. A downward arrow is an area for the user to instruct the downward scroll.

The time series window 1630 displays its output at the bottom. The window for collecting from the user the order history, delivery and inspection histories, storage history, processing history, gondola filling history, and sales history of the corresponding goods. The window comprises two kinds of area. A first area is the area for the user to instruct one kind of the time series information. Specifically, the first area is provided for each of the order 1631, delivery 1632, stock 1633, processing 1634, gondola filling 1635, and sales 1636. A second area is the area for collecting each history information. This area outputs a table comprising the three columns given below. A first column is for a date 1637 showing the day information is obtained. A second column is for a plan 1638 showing the history of planning values. A third column is for an actual result 1639 showing the history of actual values. Each column displays input area for the user to input each history for a period of one month. Furthermore, in order that the user can input the history information for period of several months, a scrolling of the corresponding month is provided for the user to instruct the previous month 1640 and the following month 1641. For example, the previous month 1640 is an area to instruct a scrolling in the decreasing direction, such as from August to July, June . . . The following month 1641 is an area to instruct scrolling from August to September, October, . . . In this respect, it should be understood that the position of each window and the structure of each window are taken for the preferred description and that these do not necessarily delimit the scope of the application of the present invention.

Step 170: The merchandise information is received from the input unit 3 and the image input unit 5 through each window output at the step 160.

First, the name of a goods "Hitachi Dressing" for example, is received through the name window 1600. The pictorial information of a package is received from the image input unit 5 through the image window 1610. Then the "input 1611" is picked up by the mouse, the image input unit 5 is actuated. Next, the characteristics information of the corresponding goods is received through the characteristics window 1620. Specifically, the height of the corresponding goods is received through the height dimension 1623. The width thereof is received through the width dimension 1624. The depth thereof is received through the depth dimension 1625. A name of manufacturer is received through the manufacturer's name 1626. A color of the goods is received through the color of a goods 1627. A usage is received through the usage 1628. In order to input any other characteristics information, the scrolling instruction area 1629 (upward arrow or downward arrow) is picked up to scroll the corresponding table for inputting as required. Finally, the time series information of the corresponding goods is received through the time series information window 1630. First an indication of the kind of information to be inputted is received from the input unit 2. Specifically, the receipt is performed by picking up either on the ordering 1631, delivering 1632, storing 1633, processing 1634, gondola filling 1635 and sales 1636. Then, the plan and actual result of the corresponding information for a period of one month are received through the date 1637, plan 1638, and actual result 1639. In order to input the history information for another month, the previous month 1640 or the following month 1641 is picked up to scroll the history table for the corresponding month for input. The operations mentioned above are repeated for each time series information from the ordering to the sales.

The above-mentioned operations are performed for each of the different kind of goods.

Step 180: Each merchandise information received at the step 170 is stored in the corresponding record (FIG. 3–FIG. 10) of the goods assortment information 41, goods layout information 42, ordering information 43, delivering information 44, storing information 45, processing information 46, gondola filling information 47 and sales information 48, in the memory 4. The relationship between the information items received at the above-mentioned step 170 and the information items on each record is easily understandable so that a more specific description thereof is omitted.

With references to the merchandise information, a method for collecting and managing the information by this system has been described as above. The step 160 is performed by the window display function 16. The step 170 is performed by the information receiving function 17. The step 180 is performed by the information registration function 18. The control of the execution sequence of each step is performed by the function 19 to control the execution sequence of those four functions.

Subsequently, a method for collecting and managing the gondola information will be described.

Figure 48:
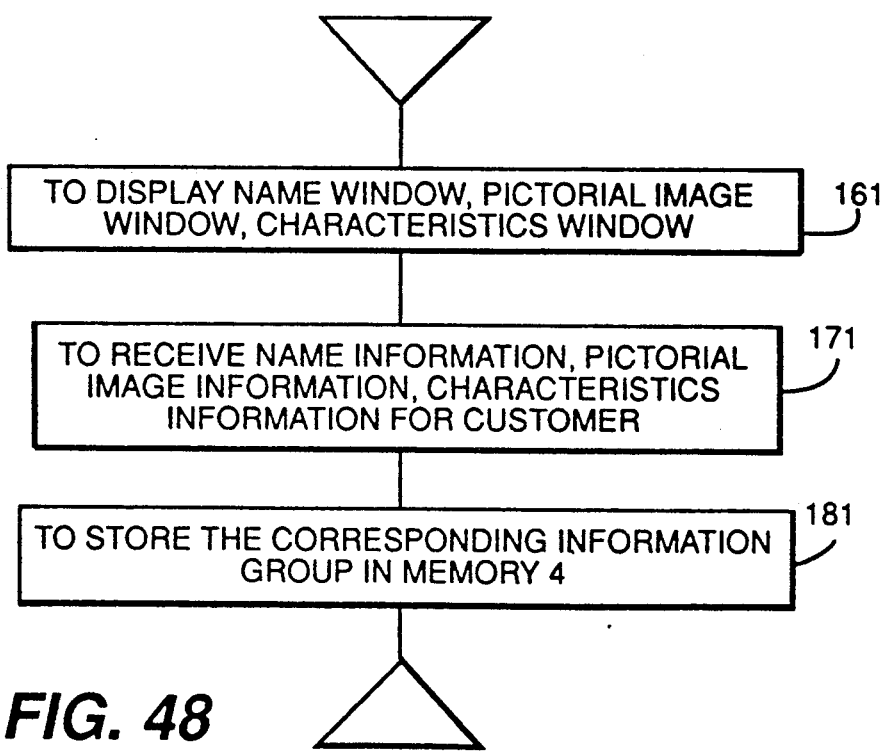
FIG. 48 is a flowchart showing collection and management of the gondola information.

FIG. 48 is a flowchart choosing a method for collecting and managing the gondola information. In accordance with this flowchart, the method for collecting and managing the gondola information will be described.

Figure 49:
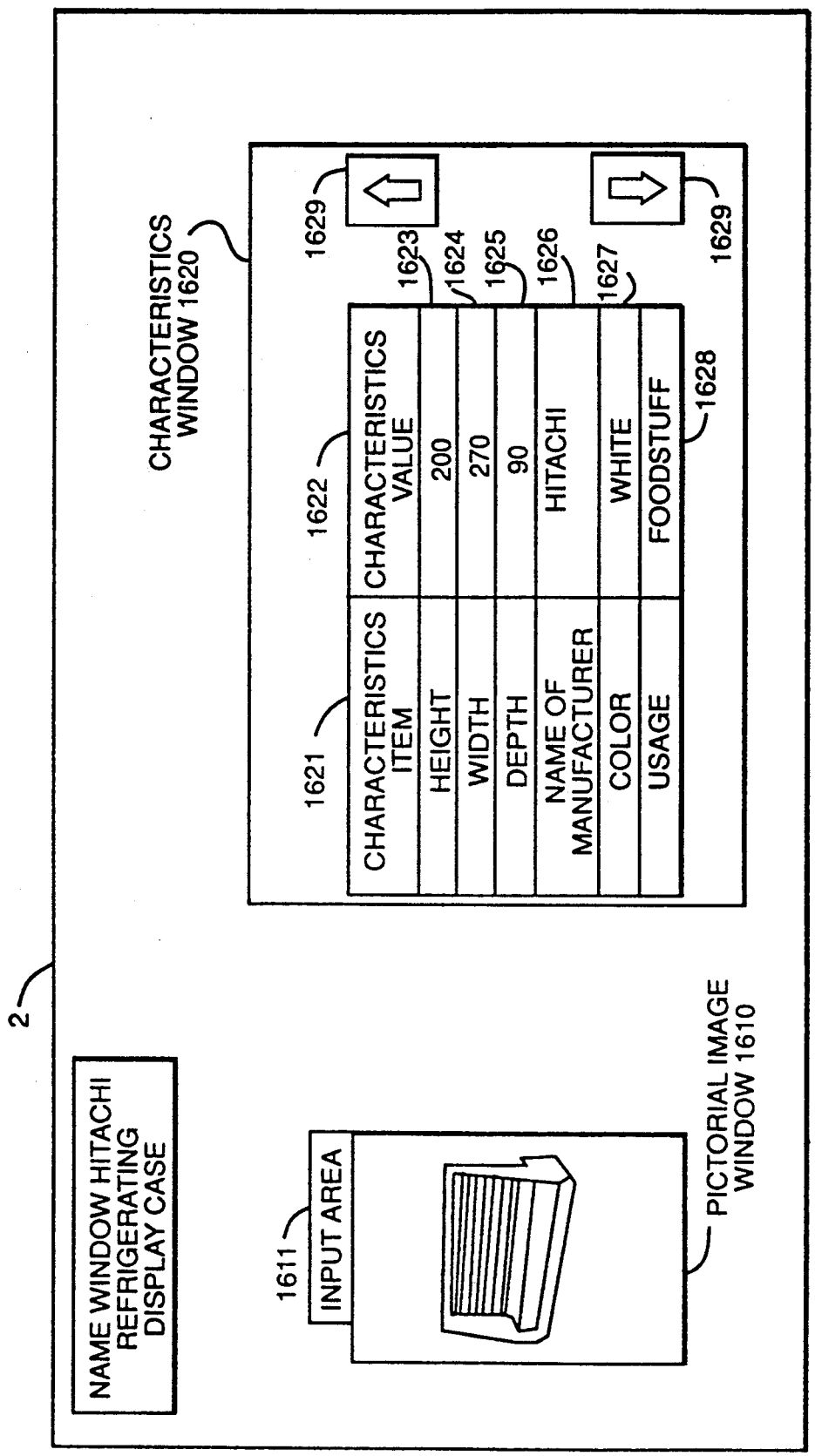
FIG. 49 is an example of the screen showing multi-window displaying of a variety of information required for the collection and management of the gondola information.

Step 161: As shown in FIG. 49, three kinds of windows are displayed on the output unit 2. First is a name window 1600 to receive the name information of a gondola. Second is an image window 1610 to receive the package information of the corresponding goods. Third is characteristics window 1620 to receive the characteristics information of the corresponding gondola. The characteristics information means the height width, depth dimensions, color, name of manufacturer, etc. of a gondola. Since the arrangement and structure of each window are the same as in the case of the merchandise information shown in FIG. 47, the detailed description thereof is omitted.

Step 171: the gondola information is received from the input unit 2 and the image input unit 5 through each window output at the step 161. The method for receiving the gondola information through each window is the same as in the case of the merchandise information. Thus the detailed description thereof is omitted here.

Step 181: The gondola information received at the step 171 is stored in the corresponding record (FIG. 3–FIG. 10) in the goods assortment information 41, goods layout information 42, ordering information 43, delivering information 44, storing information 45, processing information 46, gondola filling information 47 and sales information 48, in the memory 4. The relationship between the information items received, step 171 mentioned above, and the information items on each record is easily understandable from the descriptions hitherto made. Thus the description thereof is omitted.

Subsequently, a method for collecting and managing will be described.

Figure 50:
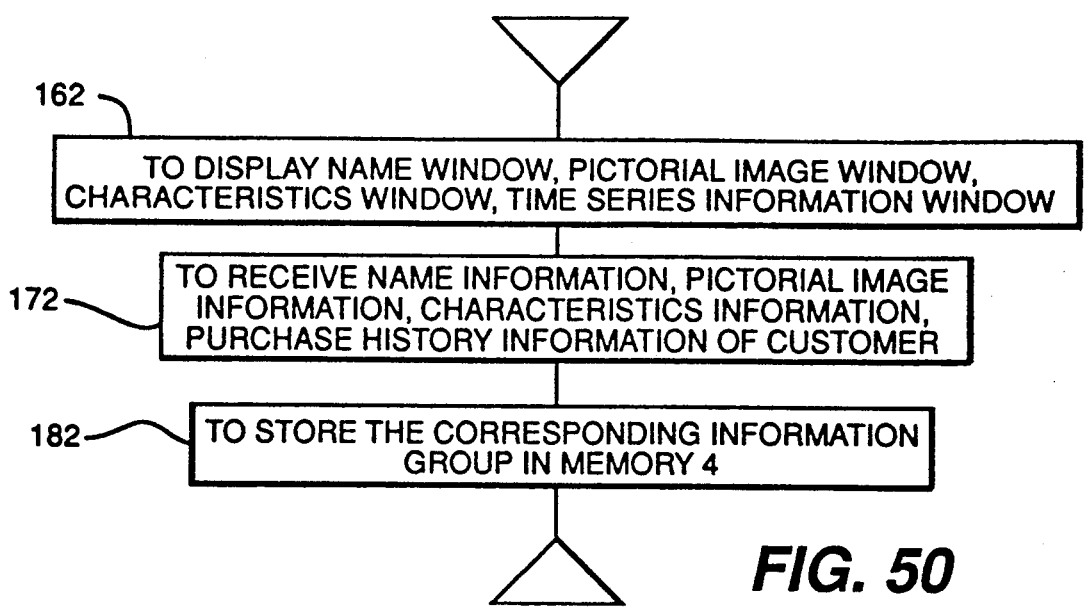
FIG. 50 is a flowchart showing the collection and management of the custom information.

FIG. 50 is a flowchart showing a method for collecting and managing the customer information. The customer information is also put into practice with three steps the same as in the cases of the merchandise information and the gondola information. In accordance with this flowchart, the method for collecting and managing the customer information will be described.

Figure 51:
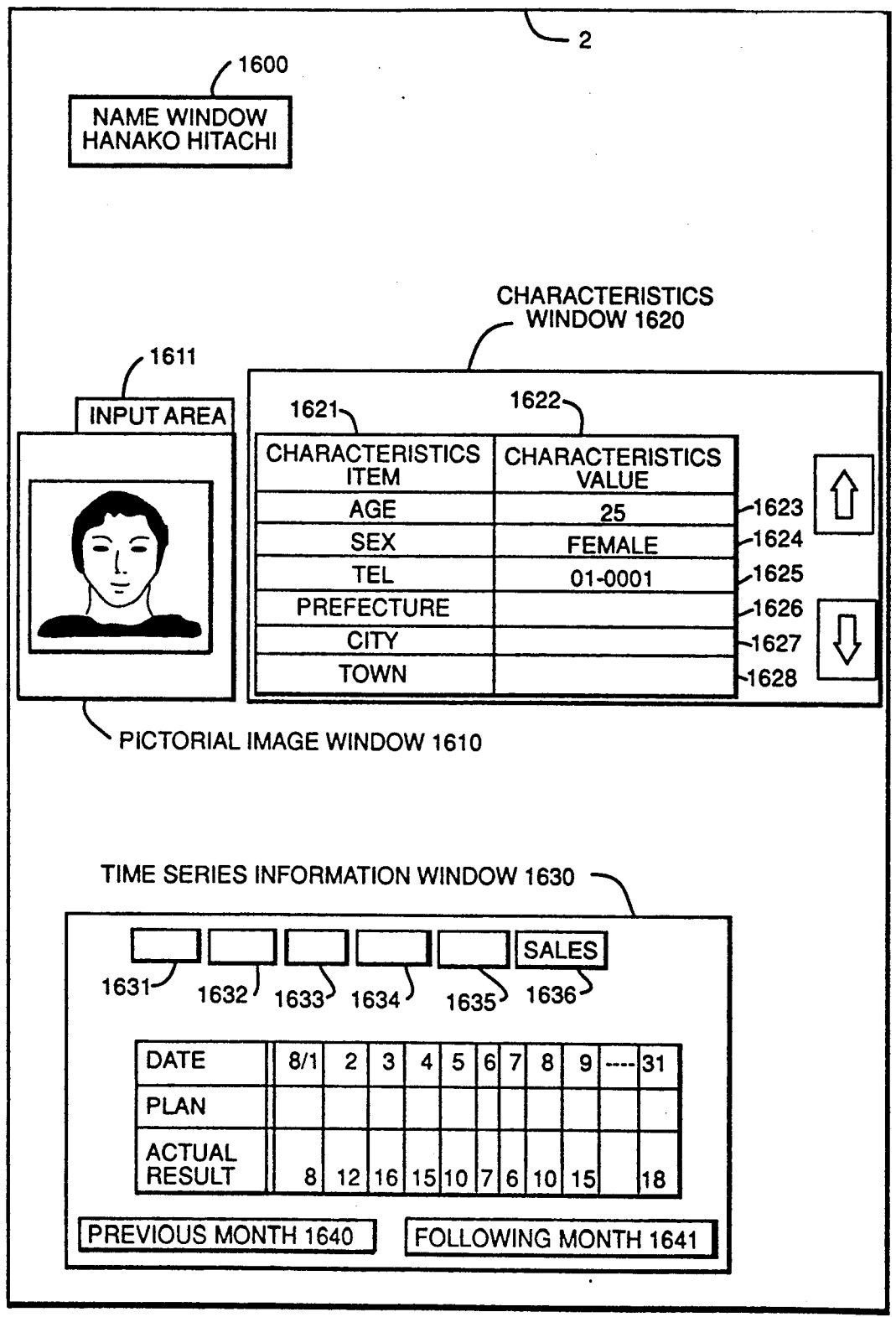
FIG. 51 is an example of the screen showing multi-window displaying of a variety of information required for the collection and management.

Step 162: As shown in FIG. 51, four kinds of windows are displayed on the output unit 3. First is a name window 1600 to receive the name of a customer. Second is an image window 1610 to receive the pictorial information of the corresponding customer. Third is a characteristics information window 1620 to receive the characteristics information of the corresponding customer. The characteristics information includes the age, sex, town, etc. The arrangement and structure of each window are similar to those in the cases of the merchandise information and gondola information. Thus the detailed description thereof is omitted here.

Step 172: The customer information is received from the input unit 2 and image input unit 5 through each window output at the step 162. The method for receiving the customer information through each window is similar to that in the cases of the merchandise information and gondola information. Thus detailed description thereof is omitted.

Step 182: The customer information received at the step 172 is stored in the corresponding record (FIG. 3-FIG. 10) in the goods assortment information 41, goods layout information 42, ordering information 43, delivering information 44, storing information 45, processing information 46, gondola filling information 47, and sales information 48 in the memory 4. The storage method and storage format for the information is easily understandable from the description hitherto made. Thus the descriptions thereof are omitted.

The method for inputting the merchandise information, gondola information, and customer information for the input unit 3 and the image input unit 5 has been described above. By this method, the user can manage the information for each unit, such as merchandise, gondola and customer, for each elemental operation for the merchandise management, and the user can separate the elemental operation system from the information management system. As a result, there is no need of modifying the information management system even when a modification is performed in the elemental operation system. In this respect, it should be understood that this system is taken only for the preferred description of this embodiment and that it does not necessarily limit the scope of the application of the present invention. This can also be materialized by a method for transferring the corresponding information to the memory 4 from a group of memories utilized for each of the various information processing systems including the system for supporting each of the operations which construct a merchandise management.

Figure 52:
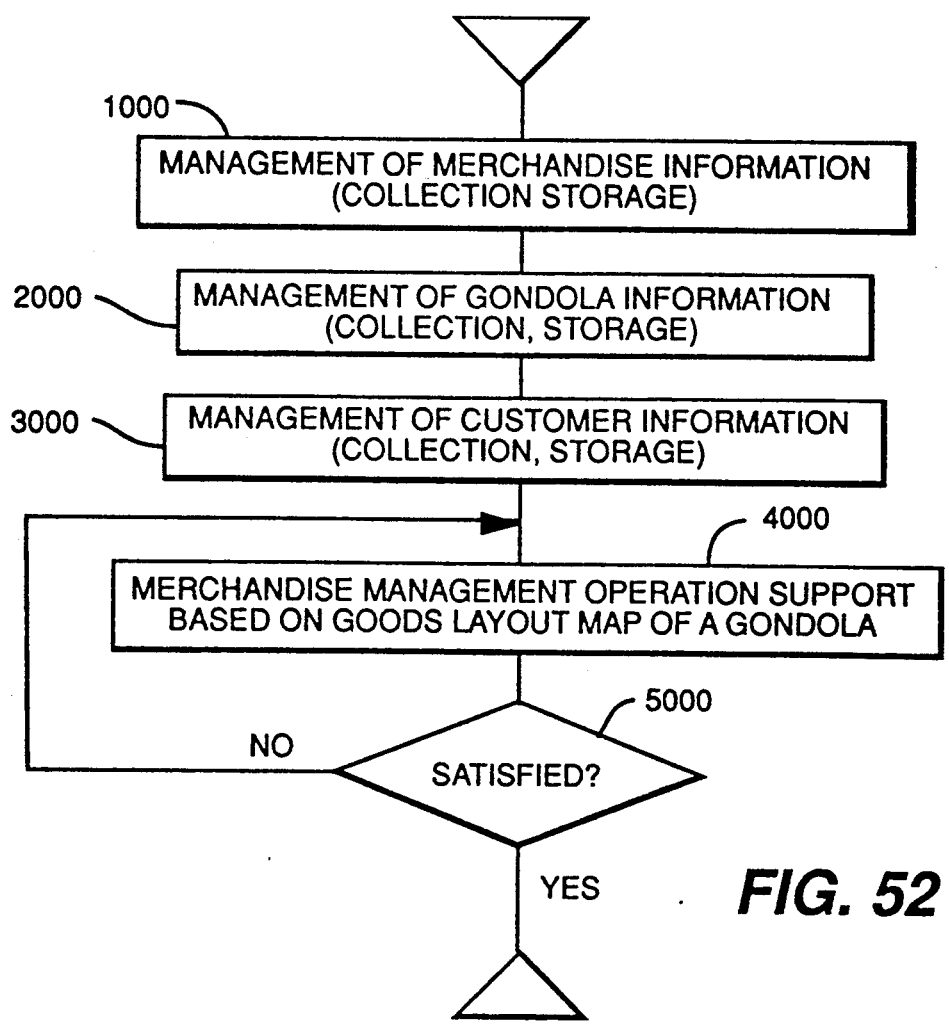
FIG. 52 is a flowchart showing the information management for management substance based on the goods layout map of a gondola.

By combining the systems and operations described above, a complete method for supporting merchandise management operations integrally based on a goods layout map of a gondola can be materialized. FIG. 52 is a flowchart showing this method.

Step 1000: Using steps 160-180 for collecting and managing the merchandise information, the collection of the merchandise information and the storage of the merchandise information to the memory 4 are executed to manage the merchandise information.

Step 2000: Using steps 161-181 for collecting and managing the gondola information, the collection of the gondola information and the storage of the gondola information to the memory 4 are executed to manage the gondola information.

Step 3000: Using steps 162-182 for collecting and managing the customer information, the collection of the customer information and storage of the customer information in the memory 4 are executed to manage the customer information.

Step 4000: By steps 100-600 for supporting merchandise management operation, a merchandise management operation is supported on the basis of a goods layout of a gondola.

Step 5000: The step 4000 is repeated until an actual result of satisfactorily sales is obtained.

In the above, the description has been made for the merchandise management operation based on a goods layout map of a gondola. However, the present invention can be applied to a department arrangement map for a department layout plan, department arrangement plan, etc. Furthermore, the present invention can also be applied to a merchandise management for an analysis on the difference in trading areas caused by the environmental changes in an area. The method can be put in practice with ease by replacing the goods layout map of a gondola in the above-mentioned embodiment with a department arrangement map or a residential area map.

As clearly seen in the descriptions set forth above, the overall merchandising cycle can integrally be managed by a system for merchandise management which is easy to operate according to the present invention, so that the accuracy of the merchandise management operation and the efficiency thereof can be achieved effectively.

While a preferred embodiment has been set forth along with modifications and variations to show specific advantageous details of the present invention, further embodiments, modifications and variations are contemplated within the broader aspects of the present invention, all as set forth by the spirit and scope of the following claims.

We claim:

1. A computer implemented method for retail store merchandise management for a merchandise management cycle comprising a plurality of elemental operations, including:
   displaying on a computer screen a blank goods layout map of a goods holding gondola showing different kinds of goods by contours as objects of management;
   receiving in memory a user entered information request for displaying on the computer screen information required for the merchandise management;
   displaying on the computer screen a plurality of choices of the elemental operations and the information responding to the information request in accordance with the goods layout map of the gondola;
   receiving in memory a user entered selection request of an elemental operation from among the plurality of displayed choices of elemental operations; and
   executing in the computer system the elemental operation of the selected request.

2. A method according to claim 1, wherein when the request is for a specific kind of goods, the specific kind of goods in the goods layout map is designated using an input unit and the contour of the goods on the layout map.

3. A method according to claim 2, wherein the specific kind of goods in the goods layout map of a gondola is output in a manner different from the other goods.

4. A method according to claim 3, wherein the elemental operations comprising the merchandising cycle are goods assortment planning to select goods to be sold, goods layout planning to select goods to be arranged on a gondola, ordering to appropriately control the stock volume of goods, inspection and storage operation to control and maintain the quality of goods, processing to manage the processing schedule of goods, gondola filling to manage the goods layout on each gondola, and sales to manage the sales of goods.

5. A method according to claim 4, wherein the goods layout map of a gondola is in a first window of a display, and the information is displayed in the first window and a second window.

6. A method according to claim 5, wherein said step of receiving a user entered information request involves physically selecting one of the contours of the relevant goods as an icon and changing
the icon to distinguish it from the other contours.

7. A method according to claim 6, wherein each contour is only an outline of the area occupied by all the goods of a specific kind of goods, for each separate kind of goods; and
wherein said executing executes all elemental operations of an entire merchandising cycle with a common man-machine interface.

8. A method according to claim 7, wherein said executing further includes analyzing data and selections input by the user in accordance with an expert knowledge base and outputting computer selected recommendations for the user; and
receiving a user selection to override the computer recommendation for further execution of at least some of the elemental operations.

9. A method according to claim 3, wherein said executing for each elemental operation includes displaying the goods layout map of a gondola modified to show additional information specific to the selected elemental operation.

10. A method according to claim 1, wherein the elemental operations comprising the merchandising cycle are goods assortment planning to select goods to be sold, goods layout planning to select goods to be arranged on a gondola, ordering to appropriately control the stock volume of goods, inspection and storage operation to control and maintain the quality of goods, processing to manage the processing schedule of goods, gondola filling to manage the goods layout on each gondola, and sales to manage the sales of goods.

11. A method according to claim 1, wherein the goods layout map of a gondola is in a first window of a display, and the information is displayed in the first window and a second window.

12. A method according to claim 11, wherein the name of an elemental operation is output in the first window; and
wherein the name of the elemental operation is output in a second window.

13. A method according to claim 12, wherein the information in the second window is pictorial information.

14. A method according to claim 11, wherein the information in the second window is pictorial information.

15. A method according to claim 1, wherein said executing for each elemental operation includes displaying the goods layout map of a gondola modified to show additional information specific to the selected elemental operation.

16. A method according to claim 15, including executing each of said steps of displaying and receiving according to the same basic process flow.

17. A method according to claim 1, wherein said executing for at least some of the elemental operations uses an expert knowledge base.

18. A method according to claim 1, wherein said executing includes scanning in image data for at least some of the elemental operations.

19. A method according to claim 1, wherein said first mentioned displaying further displays a selection icon representing each of the elemental operations; and
said last mentioned step of receiving involving user physically selecting one of the icons for requesting execution of one of the elemental operations.

20. A method according to claim 1, wherein said first mentioned step of receiving involves physically selecting one of the contours of the relevant goods as an icon.

21. A method according to claim 20, wherein said physically selecting changes the icon of the one of the contours to distinguish it from the other contours.

22. A method according to claim 1, wherein each contour is only an outline of the area occupied by all the goods of a specific kind of goods, for each separate kind of goods.

23. A method according to claim 22, wherein said first mentioned displaying displays each contour as a rectangle encompassing therein the area to be occupied by the respective different kind of goods, including height and width.

24. A method according to claim 1, wherein said executing the elemental operation displays information and menu choices necessary for the elemental operation and a window separate from simultaneously displayed on a single screen with the layout map, for each of the elemental operations.

25. A method according to claim 1, wherein said executing displays the layout map on a screen simultaneously with displaying the information and selection menus relevant to the elemental operation being executed.

26. A method according to claim 1, wherein said executing executes all elemental operations of an entire merchandising cycle with a common man-machine interface.

27. A method according to claim 26, wherein the man-machine interface is an image plane on a display screen to provide a visual representation for the user in guiding selections and input of information by the user.

28. A method according to claim 1, wherein said executing includes analyzing data and selections input by the user in accordance with an expert knowledge base and outputting computer selected recommendations for the user; and
receiving a user selection to override the computer recommendation for further execution of at least some of the elemental operations.

29. A method according to claim 1, wherein the elemental operations include a goods assortment plan, a goods layout plan, goods ordering, goods inspection and storage, goods processing, gondola filling with goods, and goods sales.

30. A method according to claim 29, wherein said executing includes displaying a first window with the goods layout map of the gondola and information required for the elemental operation being executed, a second window outputting information which the user may find more conveniently displayed in a form other than on the goods layout map of a gondola, and the third window outputting each of the elemental operation steps to be performed requiring user interface to execute the elemental operation; and simultaneously displaying each of the three windows in a multiwindows environment on a single display to the user.

31. A method according to claim 29, wherein said executing includes displaying a first window with the layout map and information required for the elemental operation being executed, a second window outputting information which the user may find more conveniently displayed in a form other than on the layout map, and a third window outputting each of the elemental operation steps to be performed requiring user interface to execute the elemental operation; and simultaneously displaying each of the three windows in a multiwindows environment on a single display to the user.

32. A method according to claim 1, wherein said executing includes displaying a first window with the goods layout map of the gondola and information required for the elemental operation being executed, a second window outputting information which the user may find more conveniently displayed in a form other than on the goods layout map of a gondola, and a third window outputting each of the elemental operation steps to be performed requiring user interface to execute the elemental operation; and simultaneously displaying each of the three windows in a multiwindows environment on a single display to the user.

33. A computer implemented method for retail store merchandise management comprising a plurality of elemental operations, including:

displaying on a computer screen a blank layout map having different kinds of contours as objects of management;

receiving in memory entered information request for displaying on the computer screen information required for the merchandise management;

displaying on the computer screen the information responding to the information request in accordance with the layout map;

receiving in memory a user entered selection request of one of the elemental operations from among a plurality of displayed choices of the elemental operations; and executing in the computer system the elemental operation of the selection request.

34. A method according to claim 33, wherein said first mentioned step of displaying displays the physical layout map as a retail store department layout plan showing different gondolas for display of goods.

35. A method according to claim 33, wherein said first mentioned displaying displays the layout map as a retail store department arrangement plan.

36. A method according to claim 33, wherein said steps of displaying further displays a selection icon representing each of the elemental operations; and said second mentioned step of receiving selecting one of the icons for requesting execution of a corresponding one of the elemental operations.

37. A method according to claim 36, wherein said executing all elemental operations with a common man-machine interface.

38. A method according to claim 37, wherein the man-machine interface is an image plane on a display screen to provide a visual representation for the user in guiding selections and input of information by the user.

39. A method according to claim 38, wherein said executing includes analyzing data and selections input by the user in accordance with an expert knowledge base and outputting computer selected recommendations for the user; and receiving a user selection to override the computer for further execution of at least some of the elemental operations.

* * * * *